(12) United States Patent  
Lalvani

(10) Patent No.: US 7,805,387 B2  
(45) Date of Patent: Sep. 28, 2010

(54) MORPHOLOGICAL GENOME FOR DESIGN APPLICATIONS

(76) Inventor: Haresh Lalvani, 164 Bank St., Apt. 2B, New York, NY (US) 10014

(*) Notice: Subject to any disclaimer, the term of this patent is extended or adjusted under 35 U.S.C. 154(b) by 780 days.

(21) Appl. No.: 11/355,369

(22) Filed: Feb. 15, 2006

(65) Prior Publication Data

US 2007/0188489 A1    Aug. 16, 2007

(51) Int. Cl.
    G06F 15/18    (2006.01)
    G06N 3/12     (2006.01)
    G09G 5/00     (2006.01)
    G06T 17/00    (2006.01)
    G06T 17/40    (2006.01)
    G06T 15/10    (2006.01)

(52) U.S. Cl. .......................... 706/13; 706/11; 345/419; 345/427; 345/649; 345/653; 345/654; 345/655; 345/646; 345/645; 345/643

(58) Field of Classification Search .................. 706/13
    See application file for complete search history.

(56) References Cited

U.S. PATENT DOCUMENTS 5,211,692 A    5/1993    Lalvani
5,575,125 A    11/1996   Lalvani

OTHER PUBLICATIONS

Lalvani, "Genomic Architecture" in The Organic Approach to Architecture eds. Gans and Kuz, 2003.*
Lalvani, Higher Dimensions and Architecture, 1994.*
Haresh Lalvani, Structures on Hyper Structures, N.Y. 1982.
Haresh Lalvani, Patterns in Hyper-Spaces, N.Y. 1982.
Haresh Lalvani, In: Abstracts, Symmetry of Structure, Hungary 1989.
H. Lalvani, In: International Journal of Space Structures, vols. 5, Nos. 3 & 4, 1990, U.K.
H. Lalvani, In: Hyper Space Journal, vol. 3, No. 1., Japan, 1994.
H. Lalvani, In: Extended Abstracts, Katachi U Symmetry, Symposium, Univ. of Tsukuka, Japan, 1994.
H. Lalvani, In: Int'l Journal of Space Structures, vol. II, Nos. 1 & 2 1996, U.K.
H. Lalvani, In: Beyond the Cube, ed. Francois Gabriel, John Wiley & Sons, 1997.
H. Lalvani, In: Organic Approach to Architecture, ed. D. Gans & Z. Kuz, Wiley Academy, 2003.

* cited by examiner

Primary Examiner—Donald Sparks
Assistant Examiner—Nathan H Brown, Jr.

(57) ABSTRACT

This invention deals with a morphological genome for design applications. This genome encodes all forms. It comprises a finite set of morphological genes, where each gene specifies a distinct group of morphological transformations defined by a group of independent topological, geometric or other parameters. The morph genes and their parameters are mapped within an integrated higher-dimensional framework with each parameter represented along an independent vector in higher-dimensional Euclidean space. Each distinct number associated with a parameter or a group of parameters is represented by a distinct point in this space referenced by its higher-dimensional Cartesian co-ordinates which represent the genetic code for the specific form being mapped. The morph genome can be used as an interactive design tool to generate known and new forms for applications in all design fields as well as for fabricating these forms when linked with digital fabrication devices within an integrated computational environment.

10 Claims, 48 Drawing Sheets

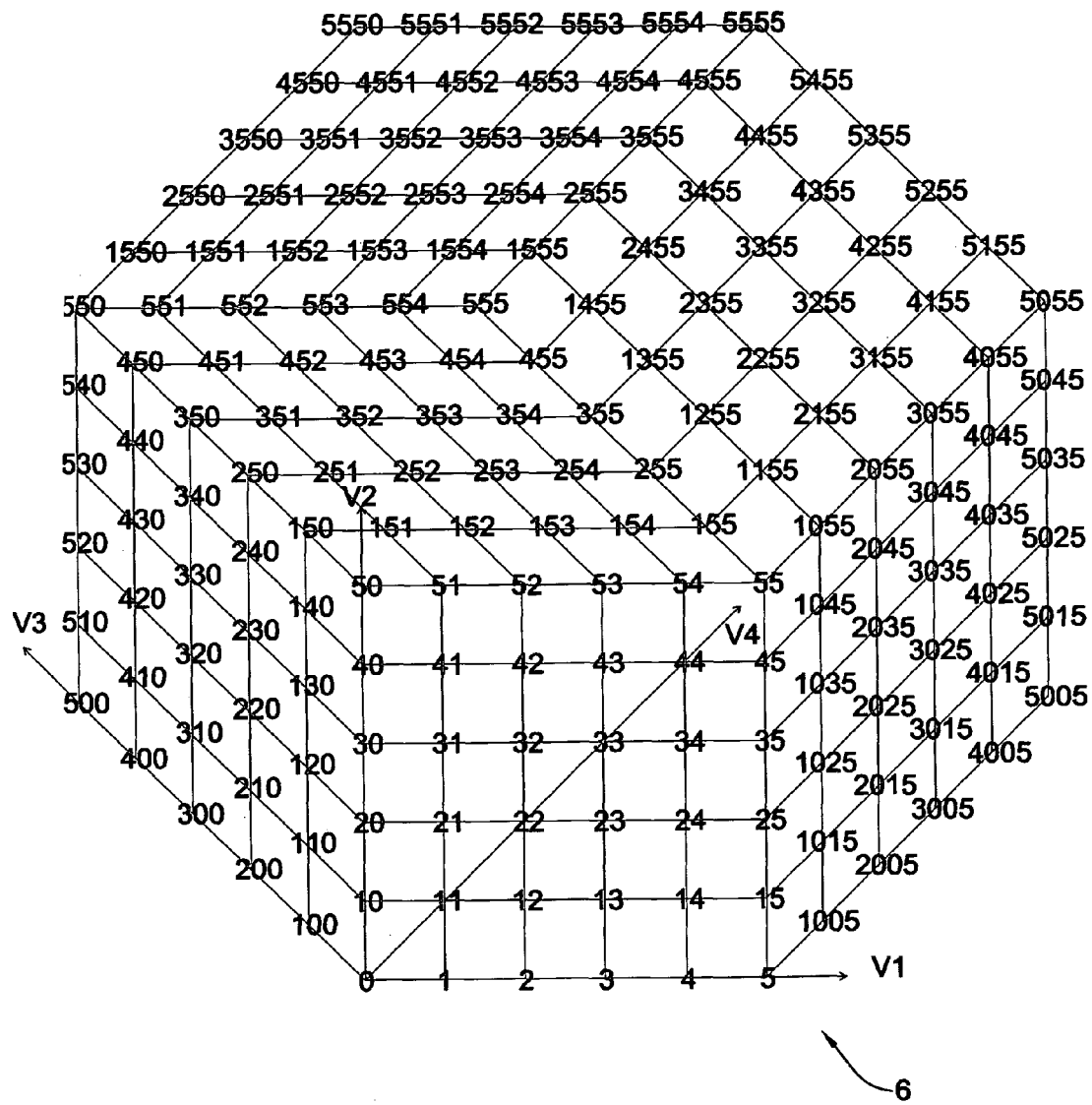
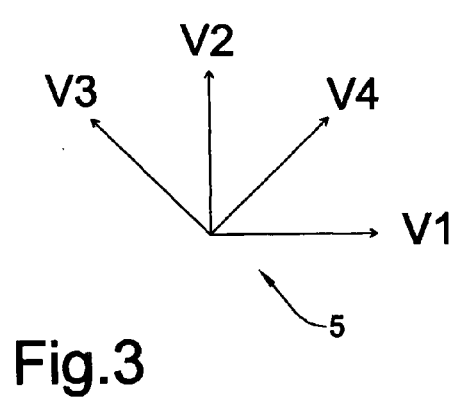
Fig.3

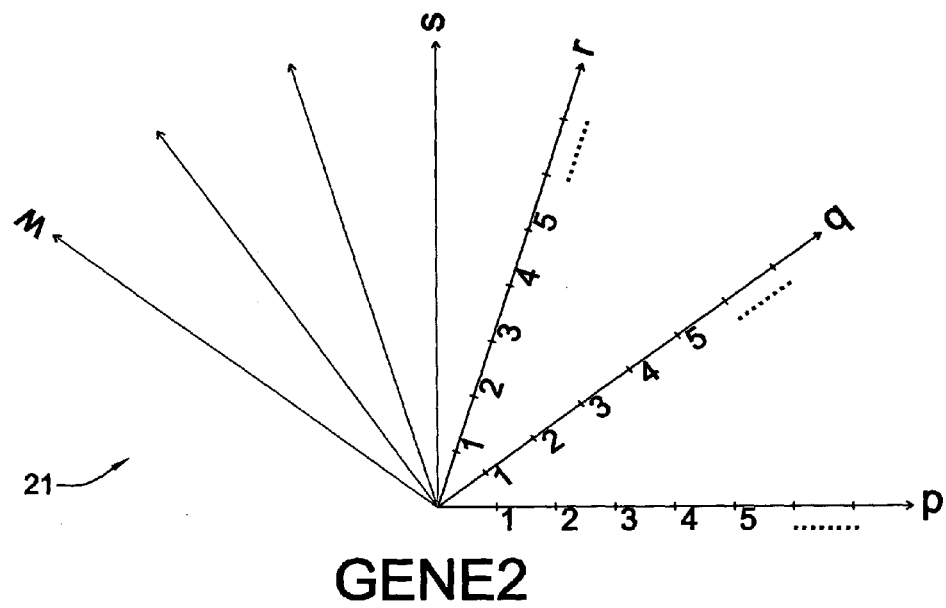
GENE2
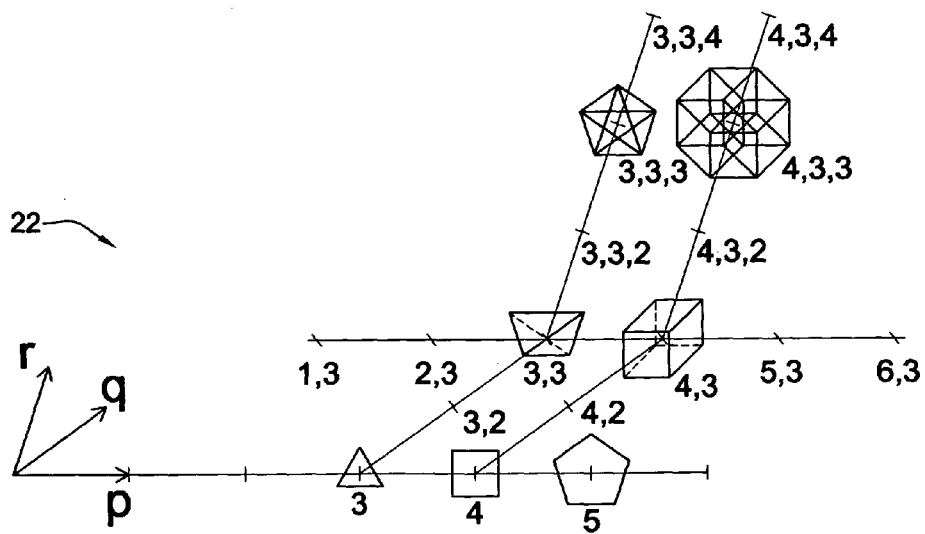
Fig.8

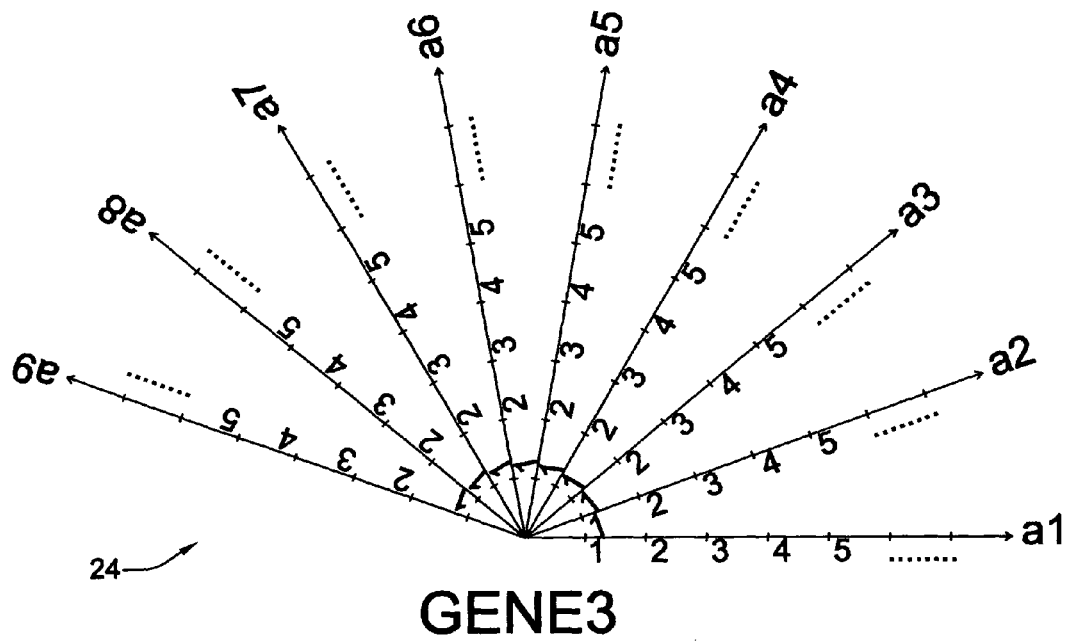
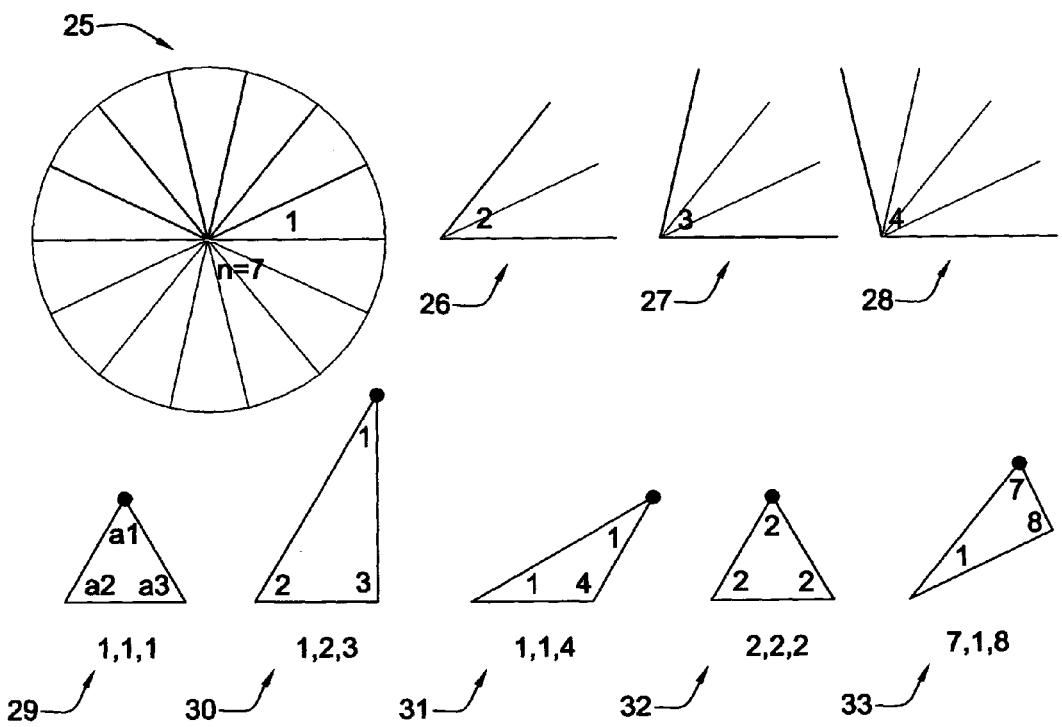
Fig.10

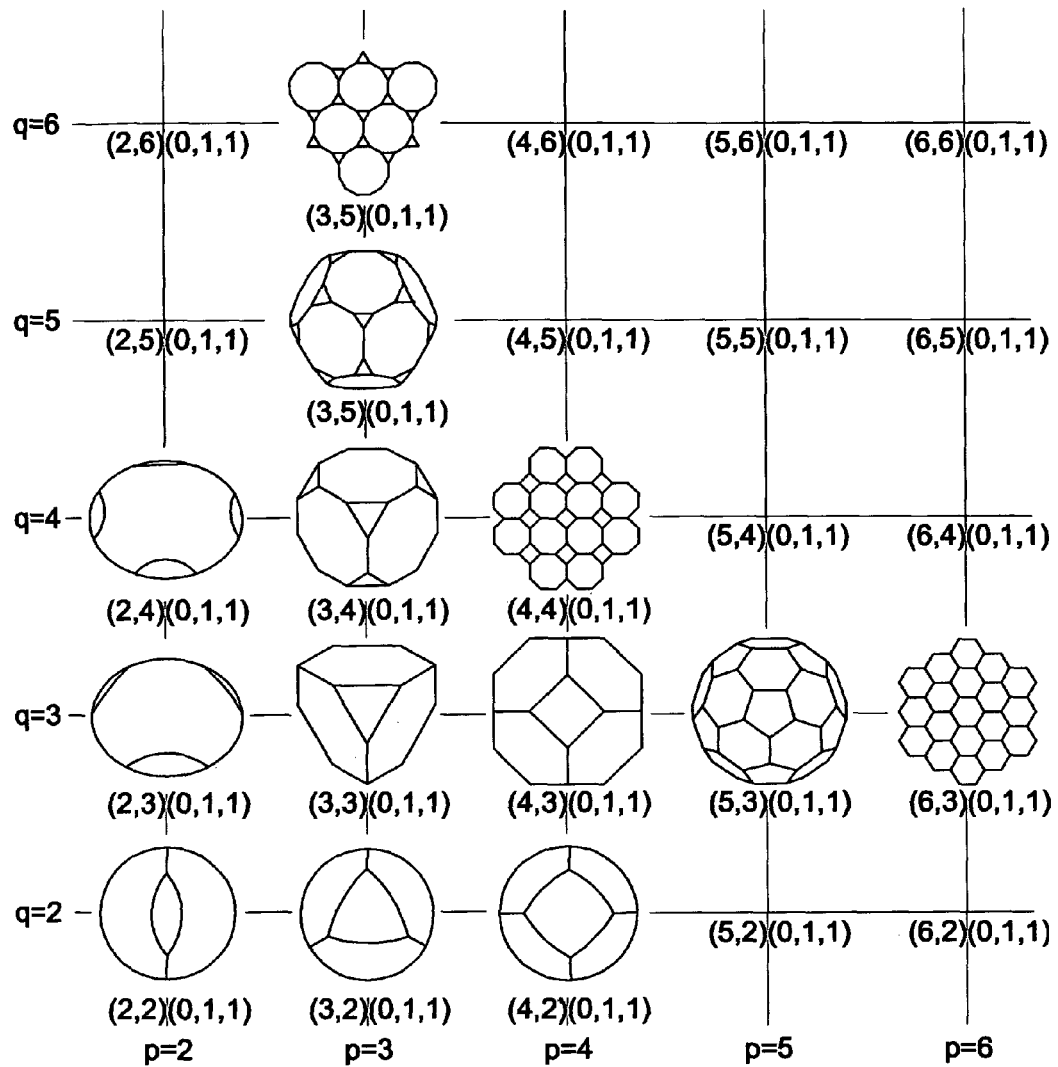
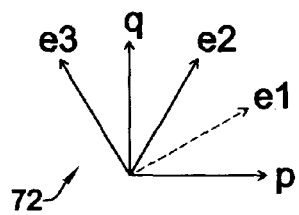
Fig.17

Fig.37 GENE11 (Wolfram's rules)

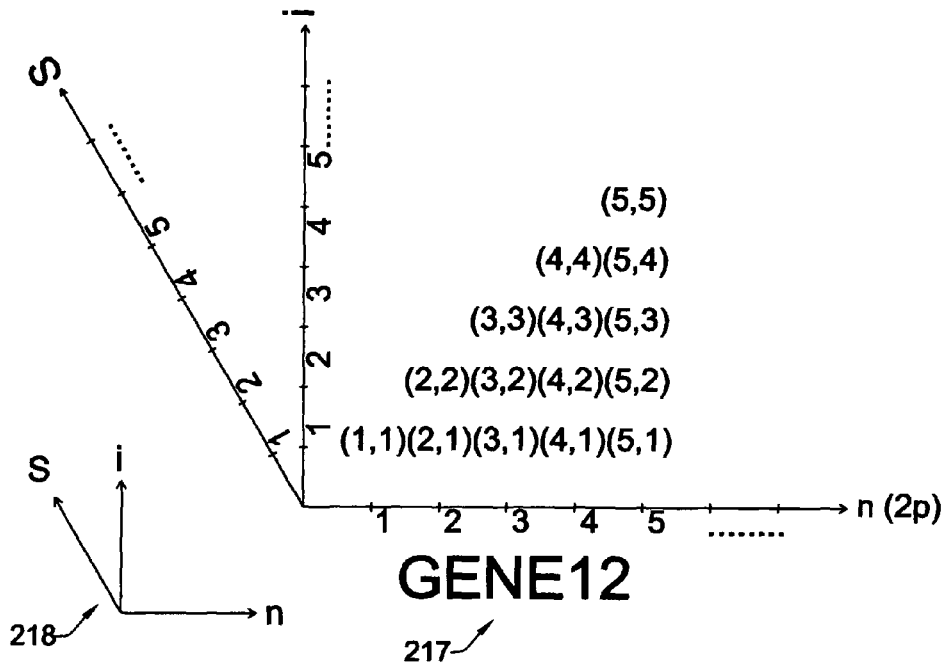
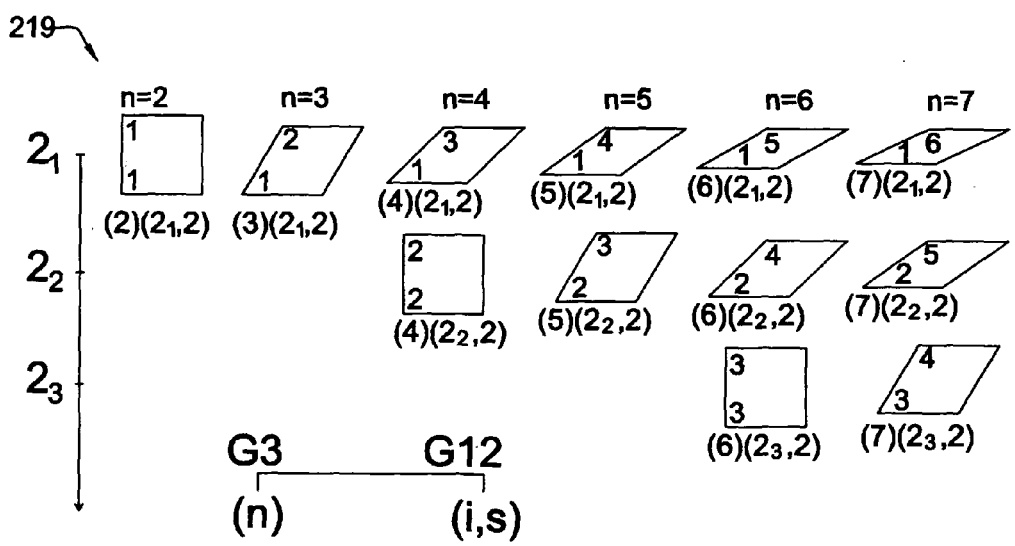
Fig.39

GENE14

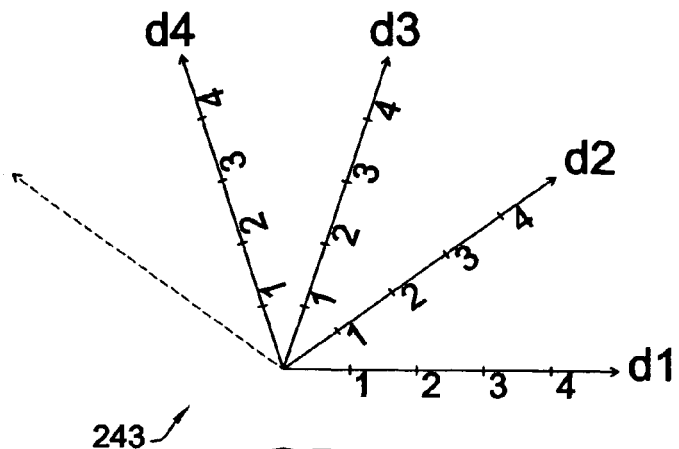
GENE15
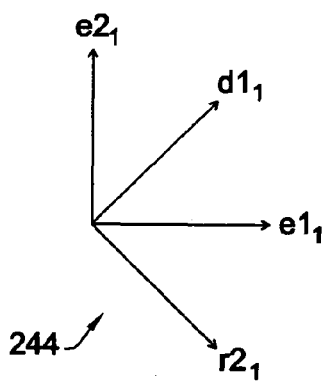
$(e1_1, e2_1, d1_1, r2_1)$
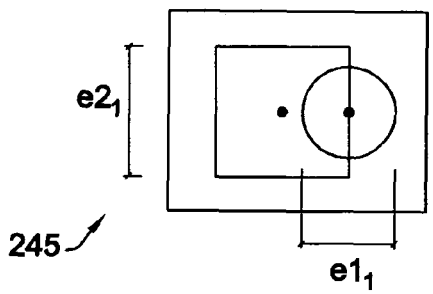
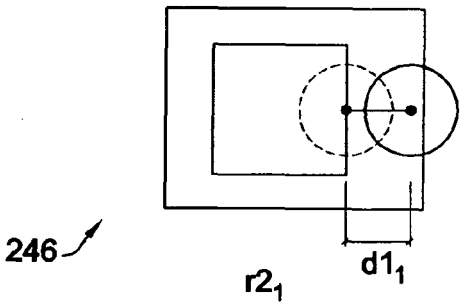
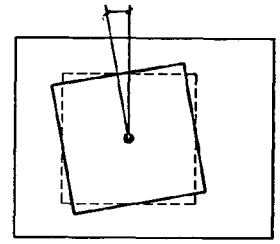
| | G2 | G10A | G13 | G15 |
|---|---|---|---|---|
| 249 | $(\infty)$ | $(r1_1)$ | $(e1_1)$ | $(d1_1)$ |
| 250 | $(4)$ | $(r2_1)$ | $(e2_1)$ | $(d2_1)$ |
248
Fig.44

MORPHOLOGICAL GENOME FOR DESIGN APPLICATIONS

FIELD OF INVENTION

This invention deals with a morphological system, herein called a morphological genome, for design, especially in the building arts including architecture, product design, sculpture, engineering structures, etc. The system can be used to describe existing morphologies (shapes, forms, structures), discover new morphologies, invent new structures, morph (change) known morphologies to others. It can be used within or without computational environments as a conceptual device for discovery, invention and generation of new forms and designs. The model used for the morph genome can also be applied to other fields of knowledge for organizing and creating new concepts, structures, designs, taxonomies and information. Other applications include a pedagogical tool for design, a graphic code for encryption, and a system for representing numbers.

BACKGROUND OF THE INVENTION AND PRIOR ART

Design, the art of creating new inventions for addressing human needs, is a fundamental human drive that underpins our civilization and distinguishes us from other biological creatures. This drive has led to the invention of buildings, cities, clothes, food, technology and every artifact we make and use. Throughout history, there have been attempts to formalize a method of design so artifacts can be systematically invented. This type of thinking has led to formal systems in design. In architecture, we speak of the Greek 'orders', Alberti's system of proportions, Le Corbusier's 'modulor' or Matila Ghyka's use of the golden mean as the basis for the "geometry of art and life" (to name one of several such examples). These examples in art and architecture are the precursors of rule-based thinking as the logical next step in the evolution of design to the digital. Currently used rule-based form-generation techniques include fractals, L-systems based on Aristid Lindenmeyer's work on shape grammars for biological form like plants, cellular automata (especially John Conway's 'game of life' and Stephen Wolfram's 'new kind of science'), and the artificial life (A-life) paradigm for generating evolution of form as an example of a digital model for how nature works.

Parallel to these form-generating systems, there have been examples of using morphology as a conceptual device for discovery and invention. Raymond Lull, the $12^{th}$ century Catalan thinker used diagrams and constructions like concentric wheels which could be turned independently for deriving new combinations of concepts and information being represented in spokes or pie-segments of the wheel. The astrophysicist Fritz Zwicky in the 1960s used a cube to map entities along the 3 directions of space to combine the represented entities in new innovative ways as the mind zig-zagged its way through the cube. The designer William Katavolos, also in the 1960s, used 2- and 3 dimensional cubic matrices as a conceptual tool to invent new designs for products. The paleontologist David Raup, in 1965, used a 3-dimensional cube to define the space of all spiral forms of sea-shells including known ones and new fictitious ones. Haresh Lalvani, the author of the present invention, used higher-dimensional cubes for organizing and generating a variety of space structures like polyhedra, tilings, patterns and other structures.

SUMMARY OF THE INVENTION

This invention builds on the previous work of Lalvani by providing an integrated framework for earlier work and extending that work into new areas. More significantly, the idea of universal morphological genes is suggested as way to identify a family or group of morphological transformations which in turn are comprised of morphological parameters that define and generate form. This provides a higher-level organization than modeling by parameters alone as is done in "parametric modeling." As a starting point for mapping the morphological genome, an initial set of 15 independent genes is disclosed here as part of the entire genome, wherein each gene is defined by distinctly different group of morphological transformations specified by independent parameters or entities. The idea of a universal morphological genome as an integrated framework for taxonomy of form and form-generation is absent is prior art. The idea that the infinite variety of forms in nature, technology and human made constructions is based on a finite number of universal morphological genes is also absent in prior art. The idea that these genes, though all part of the morphological genome, can be activated ("turned on" or expressed) selectively or de-activated ("turned off" or suppressed) selectively is also absent in prior art. Designers do this instinctively but the genome provides a formal structure to design within. Furthermore, Form, as a basis for design in the building arts, technology and science, has been approached piecemeal, leading to limited and focused efforts that miss the universal nature of form. The morphological genome concept disclosed here enables looking at the entire morphological universe and tuning into the relevant parts of it and apply it to specific design applications. This expands the design possibilities enormously in an integrated manner, provides a methodical approach to solving design problems and reviewing the taxonomy of alternatives, and is thus an improvement on prior art.

Accordingly, the object of this invention is to provide a morphological genome which can be used as an integrated system for form-generation in all design fields, namely, architecture, interior and environmental design, product design, engineering and structural morphology, graphic arts, sculpture, painting, textile design, computer graphics, computer modeling, etc. This integrated framework may also be useful in different scientific and technologic fields for understanding how nature works and exploring alternatives design solutions in technology.

Another object of the invention is to provide an integrated framework for systematic form taxonomies. This could have applications in classifying artifacts, design and technological objects, architecture, as well as designs in nature.

Another object of the invention is to provide a method for form-generation which enables a designer to navigate systematically through the universe of shapes, select suitable ones, modify these to address specific design problems.

Another object of the invention is to provide a numeric or symbolic code for form. This code can be used as a taxonomic device or as a design tool to generate and invent new forms, new families of forms, and new taxonomies. By altering the code, a new form can be created, invented or discovered, and existing forms modified.

Another object of the invention is to provide a basis for designing new interactive computational environments. This includes providing an integrated framework which can serve as a foundation for a new generation of computer modeling software. It also includes providing a basis for designing new input devices, and new ways to visually and graphically representing the morphological genome, or its parts, in useful ways.

Another object of the invention is to provide a system for numbers including integers, rational numbers (fractions), positive and negative numbers and real numbers. This could have applications in efficient numeric processing by machines.

Another object of the invention is to provide a method for organizing information in other fields of knowledge based on the genomic method disclosed here for form.

While preferred embodiments and examples are illustrated here, it will be clear to those skilled in the art to come up with variations and other examples without departing from the scope of the invention.

BRIEF DESCRIPTION OF THE DRAWINGS

Now, referring to the drawings which are integral to the present disclosure:

FIG. 3 shows the hyper-cubic lattice space of integers (and, by extension, real numbers) used as a basis for defining the morphological code of different forms. The integers represent a compressed form of the higher-dimensional Cartesian co-ordinates of the vertices of the hyper-cube.

FIG. 8 shows the vector star of Gene2 and the morpho-space of (p,q,r) structures encoded by this gene.

FIG. 10 shows the vector star of Gene3 which defines the angle-number space of polygons encoded by Gene2.

FIG. 17 shows portion of an infinite table pf 3-valent structures encoded by Gene5 and Gene2.

FIG. 39 shows the morpho-space of Gene12 that encodes the projection of higher-dimensional forms to usable 2-dimensional and 3-dimensional spaces.

FIG. 44 shows Gene15 which encodes position and an example of its use in the size-position-orientation space.

DETAILED DESCRIPTION OF THE INVENTION

General Principles:

The general principle underlying the 'morphological genome' (alternatively called a 'morph genome' herein) is that it comprises a finite number of independent 'morphological genes' (also termed 'morph genes' here), where each gene has an underlying higher-dimensional structure and specifies a distinct group of 'morphological transformations'. Each morphological transformation, and hence each morph gene, is specified by independent 'morphological parameters'. Each parameter is mapped along a distinct vector in higher-dimensional Euclidean space, and the group of morphological parameters specifying the gene act as generators of the 'morpho-genomic space' (also termed 'morpho-space' here) of that gene. Any point within this space uniquely represents a distinct combination of parameters being mapped. The Cartesian co-ordinates of this point represent the genetic code (herein also referred to as the morph-code or morpho-genomic code) for the morphology being mapped. The codes of all genes taken together define the entire morph genome which can be represented in a composite morpho-genomic space of all genes. The higher-dimensional spaces considered here are Euclidean, though the mapping can be extended in non-Euclidean hyper-spaces.

The morph genes, designated Gene1, Gene2, Gene3, Gene4 . . . , and the groups of morphological transformations they encode are listed in Table 1. The genes are represented by the symbols G1, G2, G3, G4 . . . . Each gene splits into its dimensions D1, D2, D3, D4 . . . , where each group of dimensions represent a group of morphological transformations, and a dimension within each group represents a different morphological parameter within that gene and is represented by a different vector in the morpho-space. The vector numbers are listed in incremental order to track the total number of dimensions being mapped, while the dimension numbers track this number within the gene. The total number of vectors indicates the extent (size) of the morph genome presented herein. This size will increase as more transformations and parameters are added, Table 2 lists the morphological parameters for each gene and the associated Dimension and Vector numbers.

Figure 1:
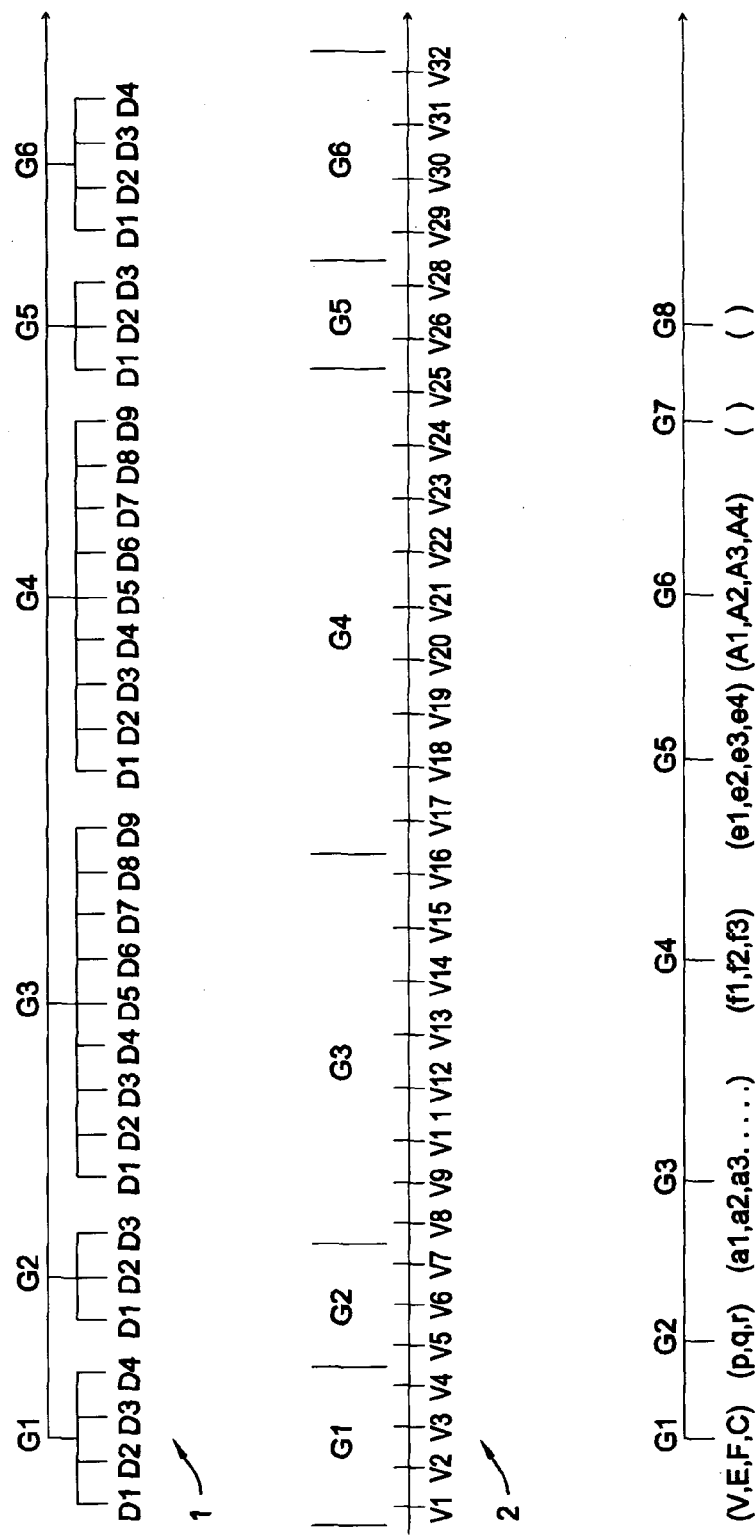
FIG. 1 shows three different linear representations of the morphological genome (morph genome) with morph genes G1, G2, G3, G4 . . . , and the Dimensions, Vectors and Parameters associated with these genes.

FIG. 1 shows three linear representations of the morph genome. In 1, the continuous line on top indicates the morph gene sequence G1, G2, G3, G4, . . . ; Each gene is branches into its own dimensions D1, D2, D3, . . . as shown, The genes are of different sizes and have a different number of dimensions. In 2, the dimension numbers are replaced by incremental vector numbers, V1, V2, V3, V4 . . . V32, suggesting that the portion of the morph genome shown has a total of 32 vectors and is thus 32

TABLE 1

Morphological Genes and Encoded Morphological Transformations

Figure 5:
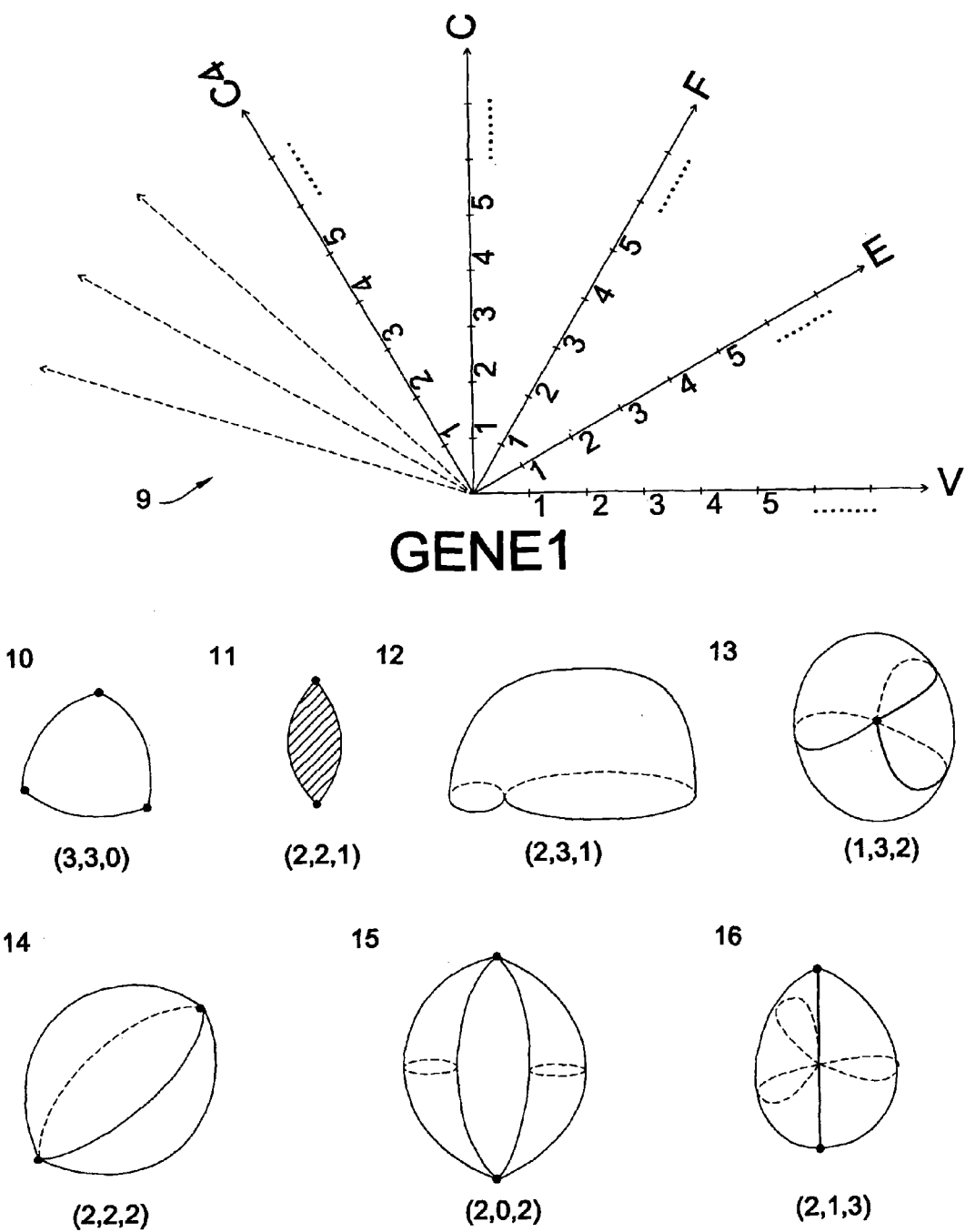
FIG. 5 shows the vector star of Gene1 which encodes the number of topological elements (vertices V, edges E, faces F and cells C) in any structure, form or configuration. A few examples of structures with their V,E,F co-ordinates are also shown.
Figure 6:
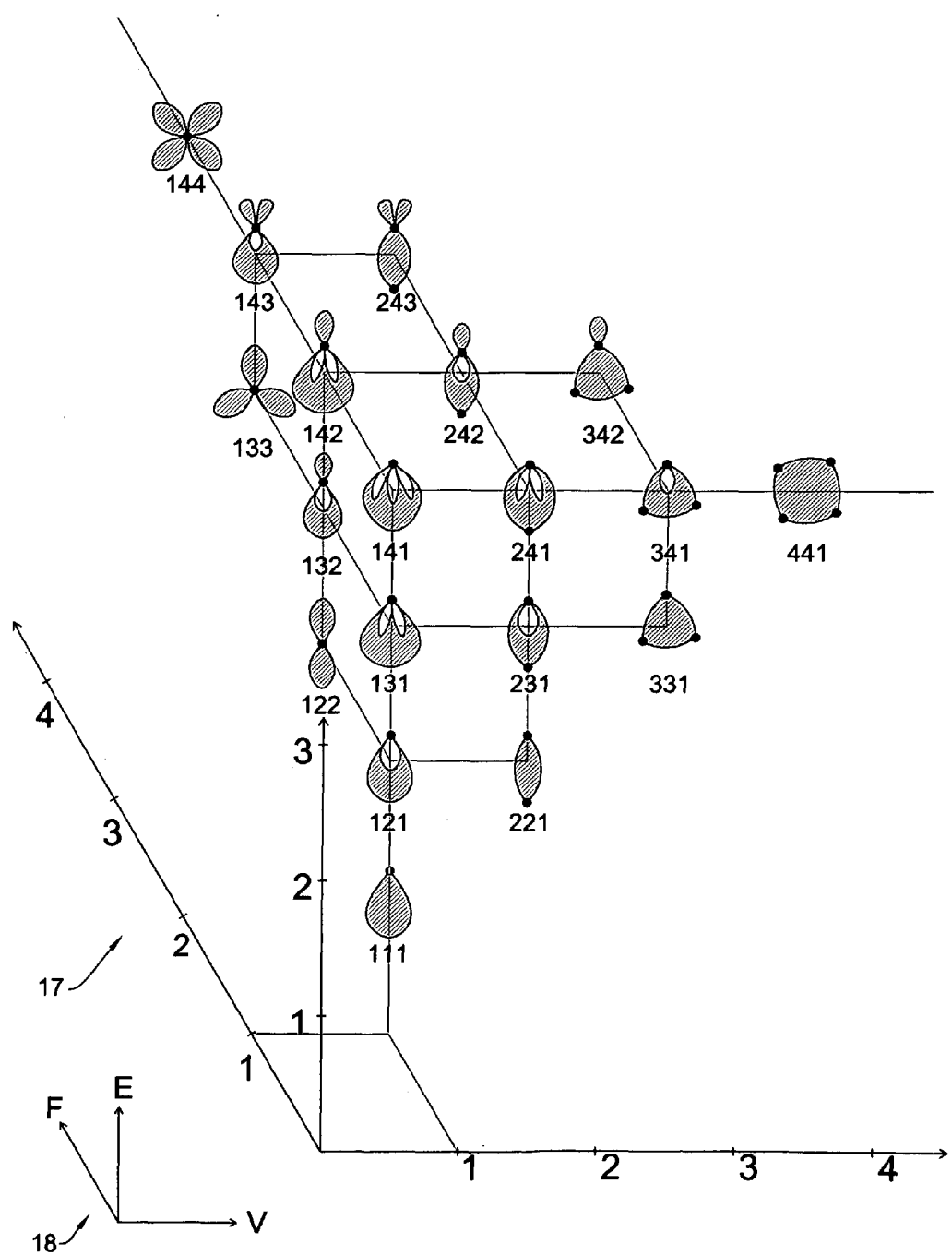
FIG. 6 shows the V,E,F morpho-space of a few structures with lower number of elements.
Figure 7:
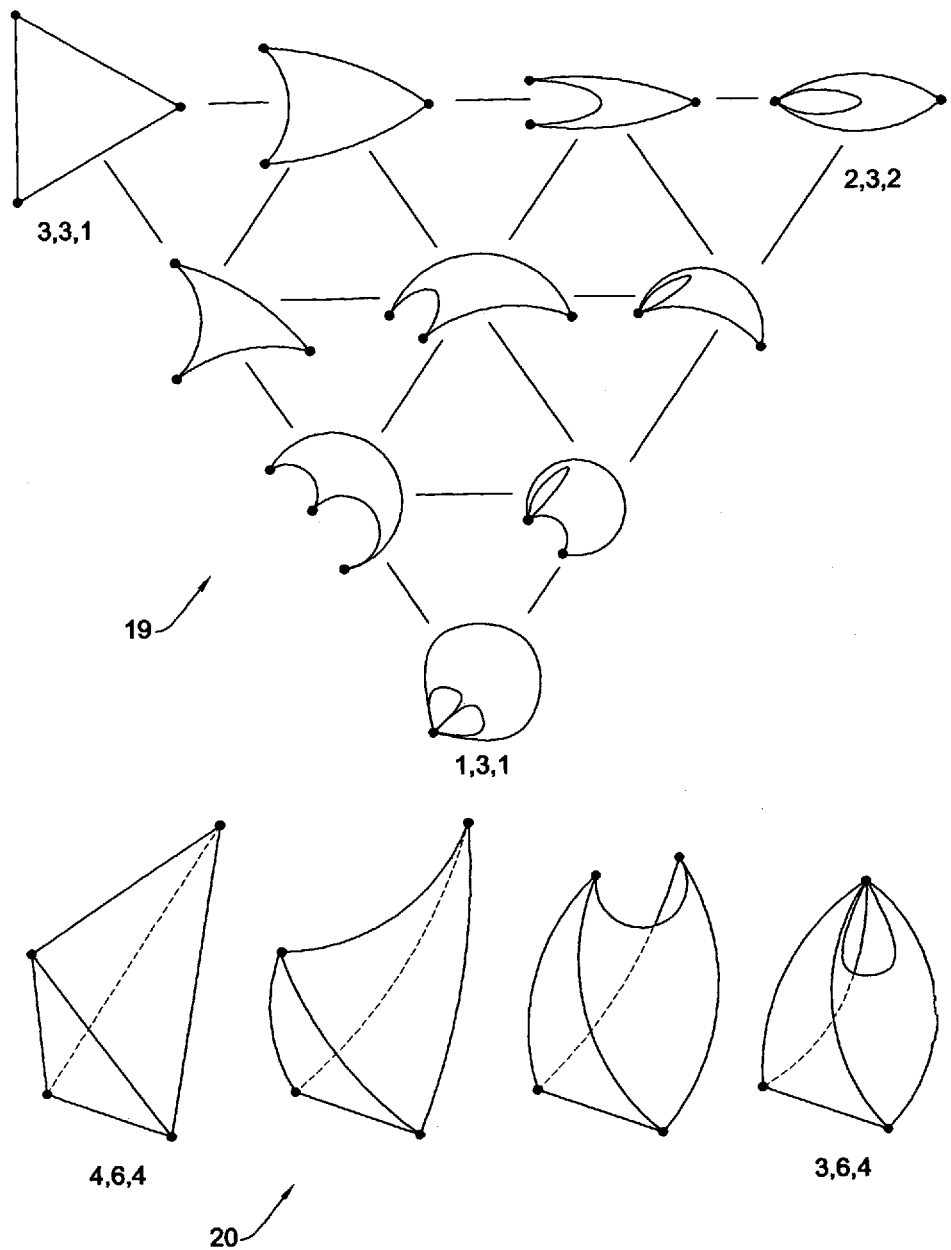
FIG. 7 shows how the V,E,F,C space could represent a continuum of changing forms.
Figure 9:
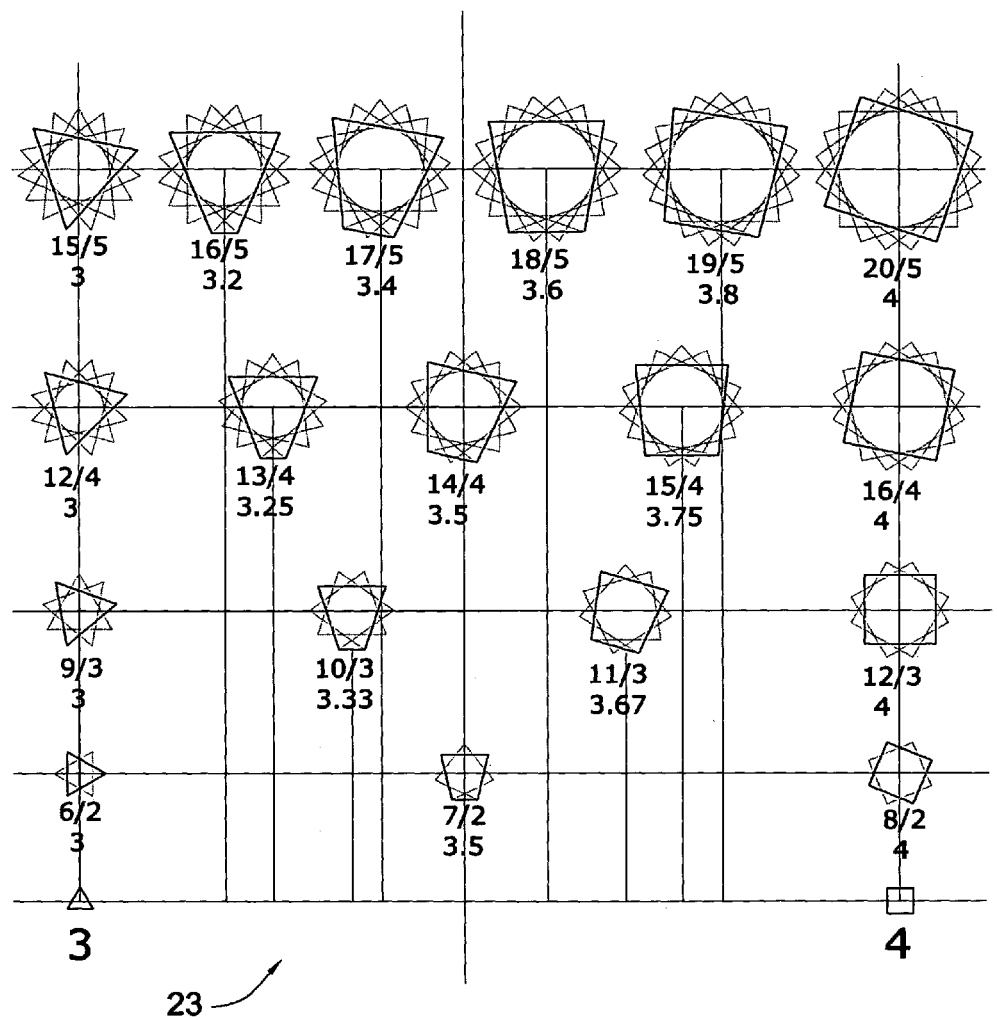
FIG. 9 shows the application of FIG. 4 to star polygons and fractional regular polygons.
Figure 11:
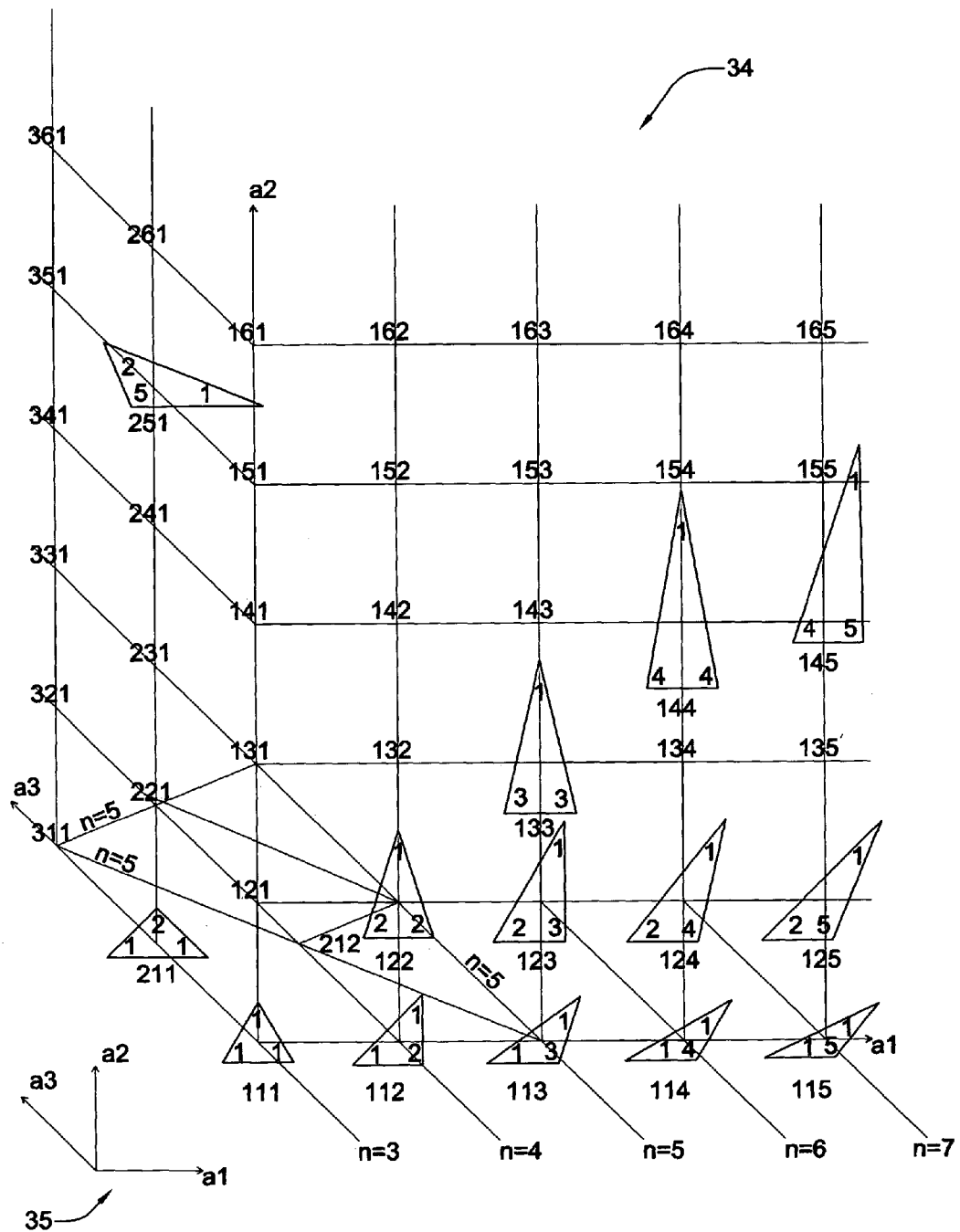
FIG. 11 shows the angle-number morpho-space of all triangles and their morph-codes.
Figure 12:
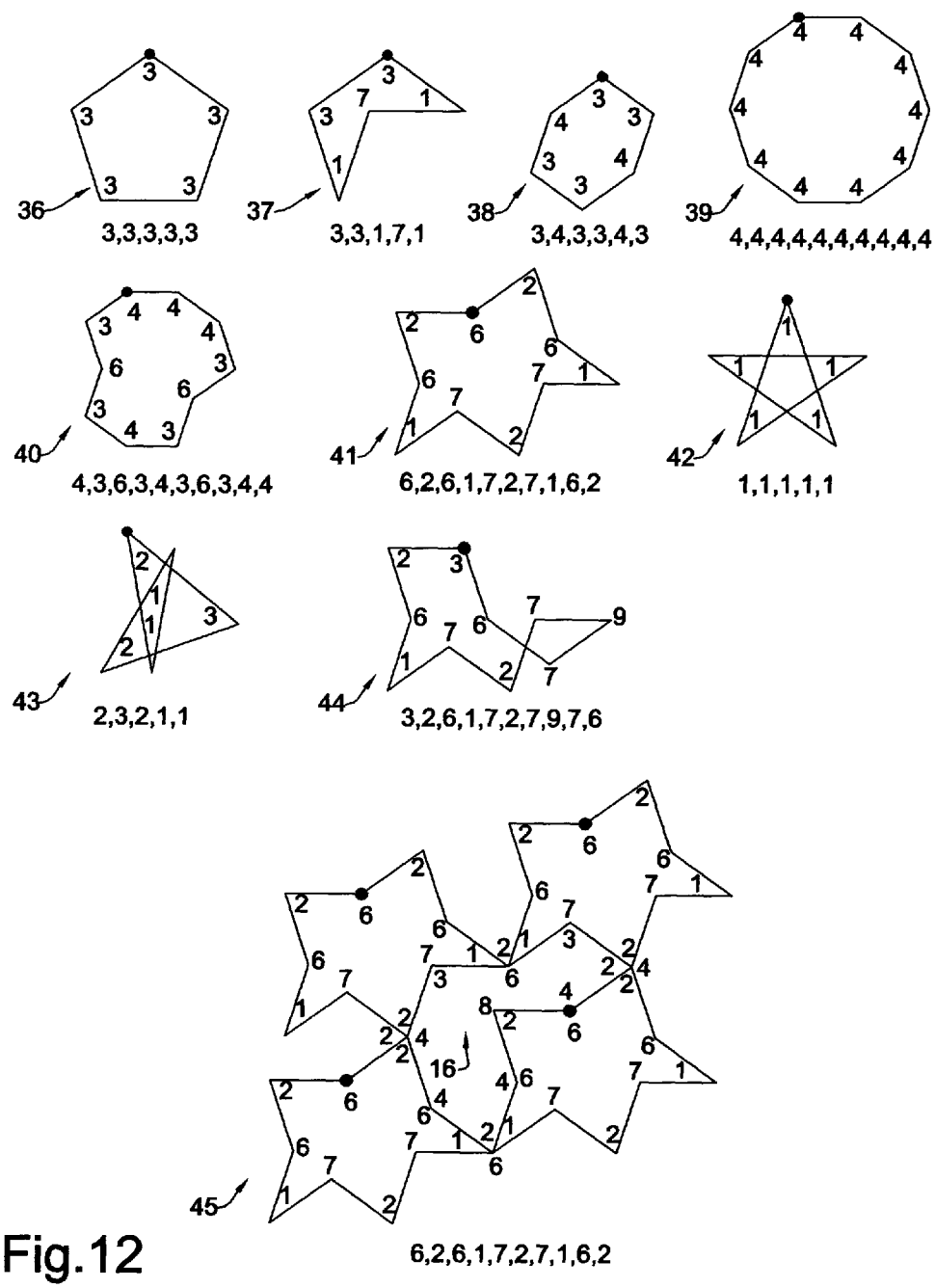
FIG. 12 shows examples of polygons encoded by angle-number sequences.
Figure 13:
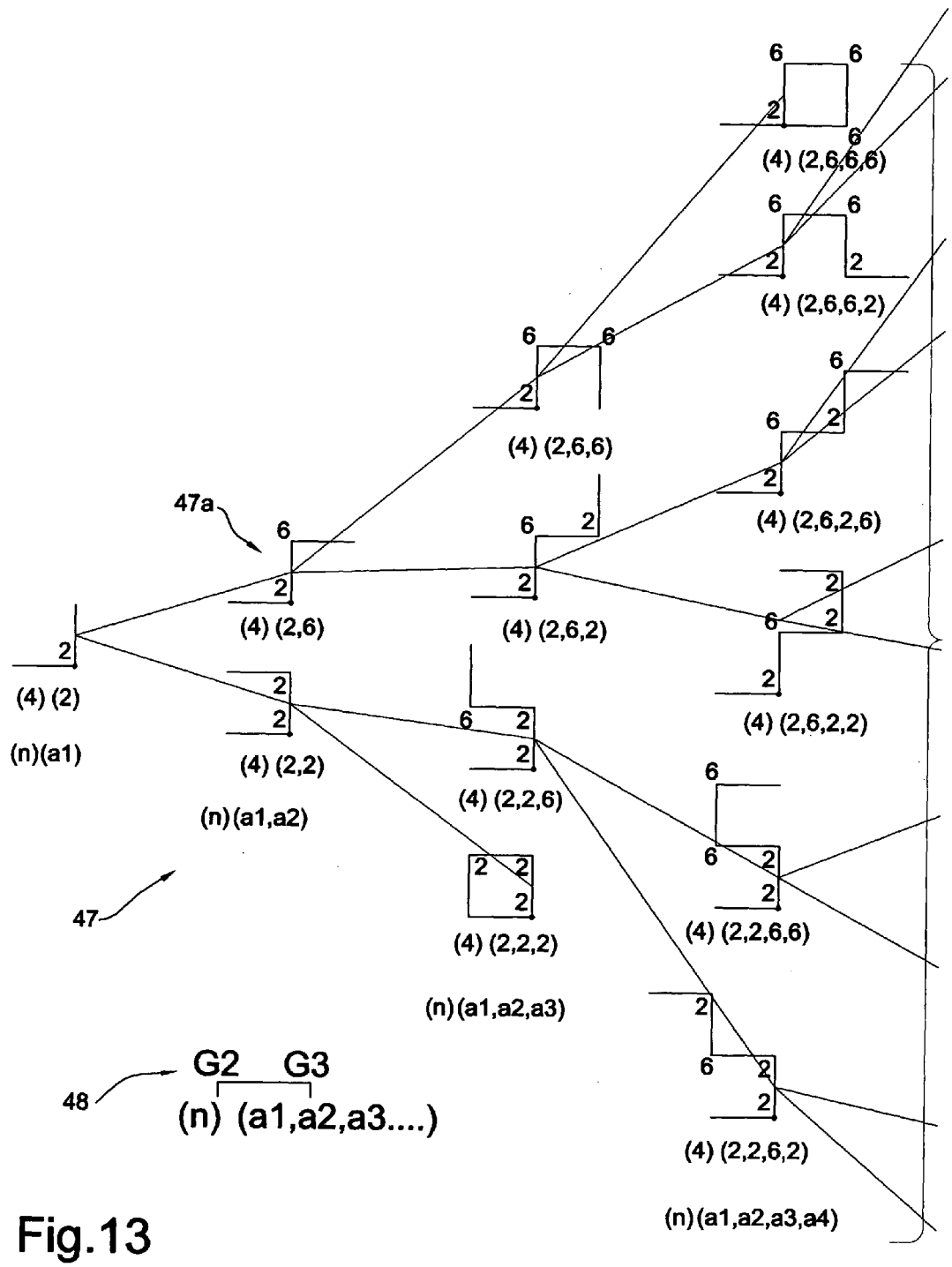
FIG. 13 shows a generative tree of angle-number based sequences of line segments having 90 degree bends and their morph-codes.
Figure 14:
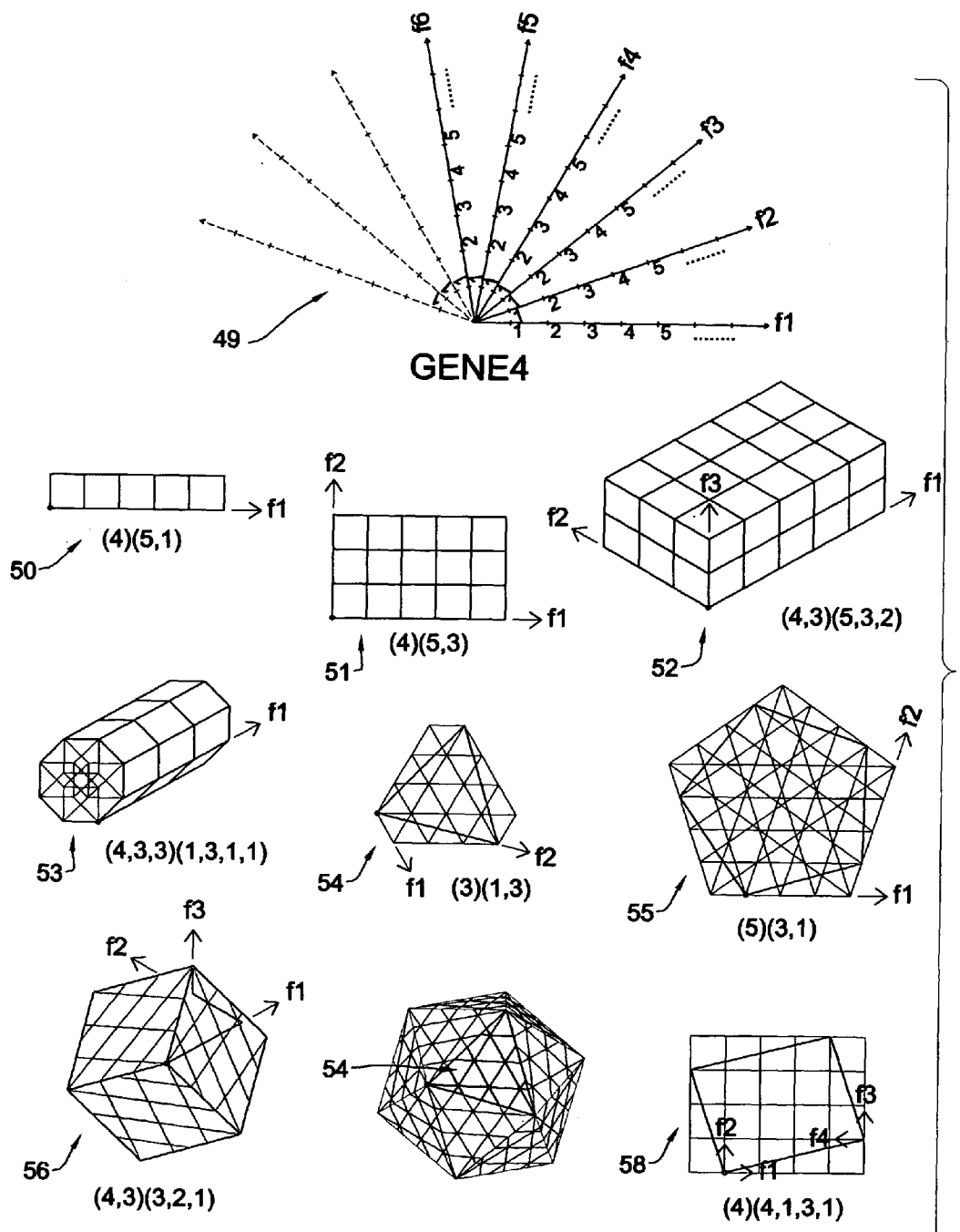
FIG. 14 shows the vector star of Gene4 that encodes various structures by their frequency or the number of regular subdivisions along the edges of (p,q,r) structures encoded by Gene2.
Figure 15:
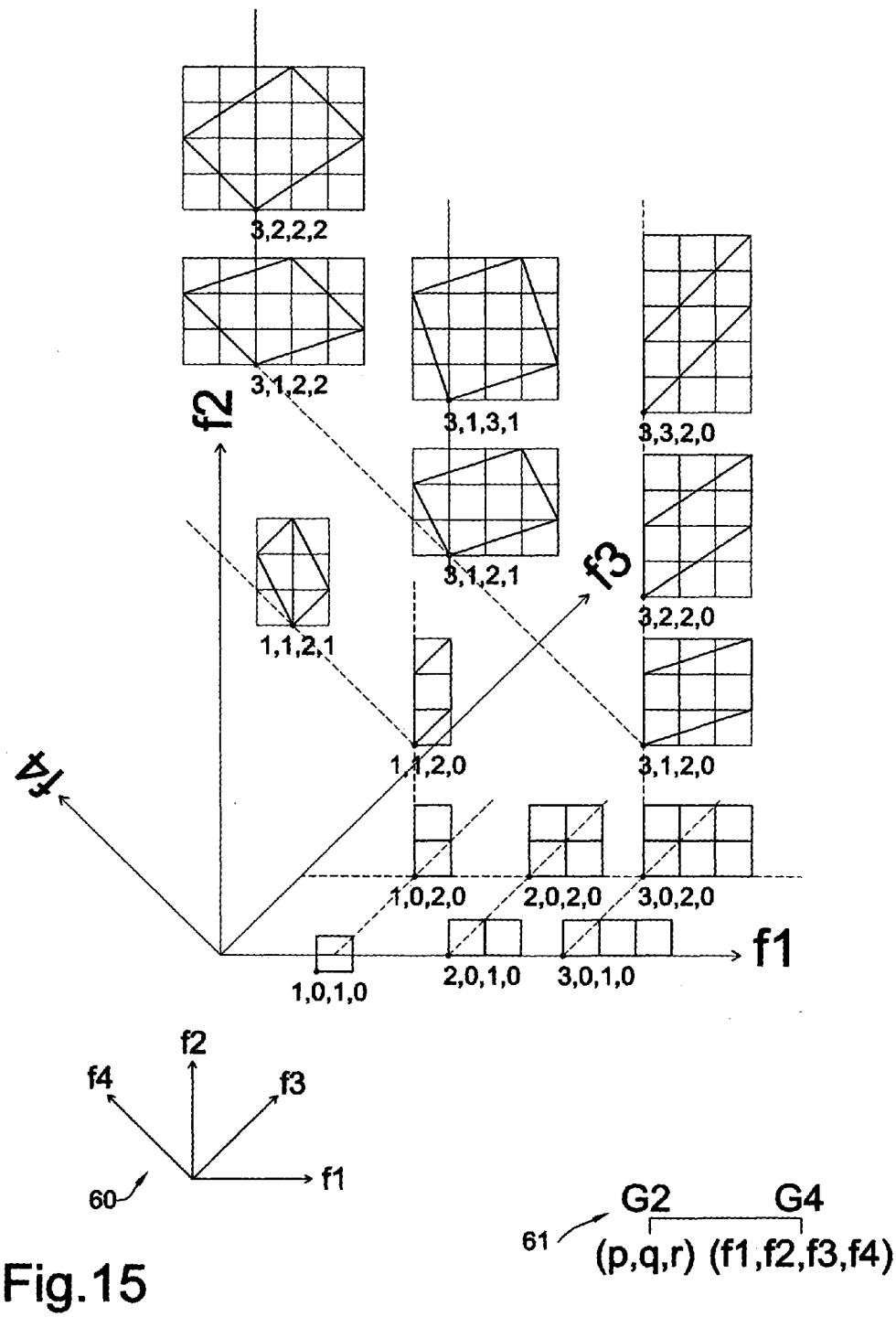
FIG. 15 shows the morpho-space of parallelograms and their morph-codes.
Figure 16:
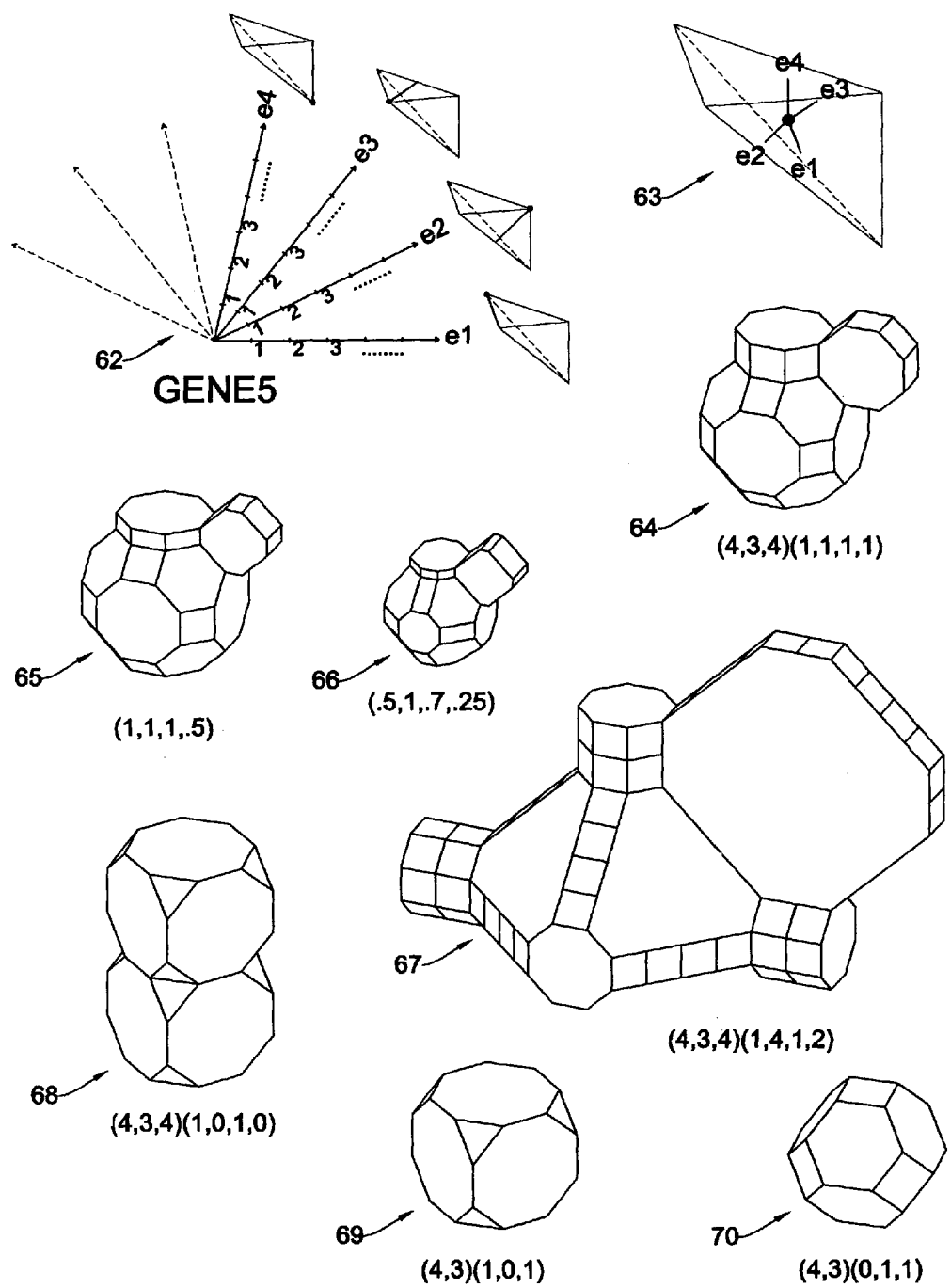
FIG. 16 shows the vector star of Gene5 which encodes different subdivisions of (p,q,r) structures encoded by Gene2.
Figure 18:
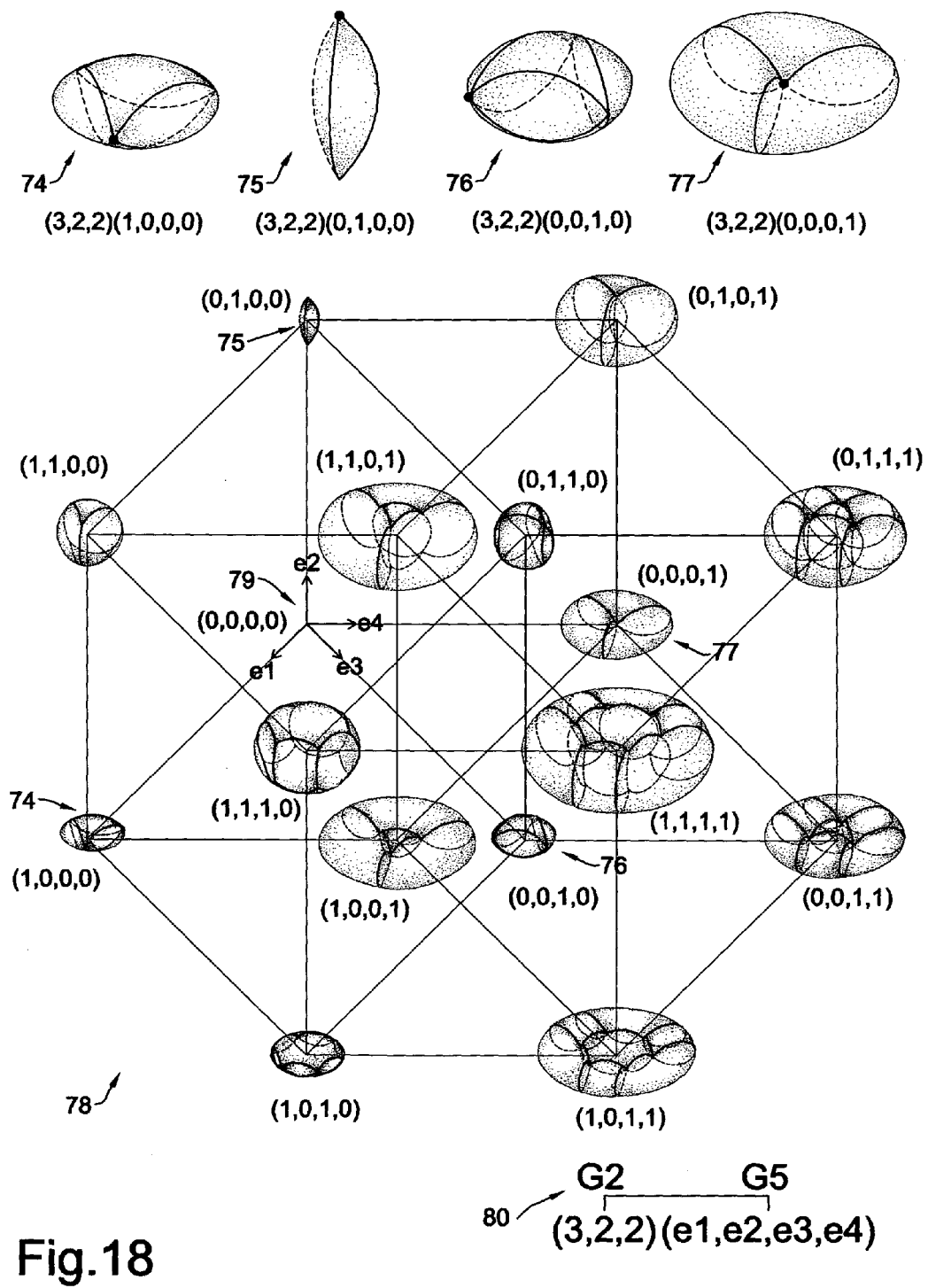
FIG. 18 shows an example of a (3,2,2) polytope and its subdivisions encoded by Gene5.
Figure 19:
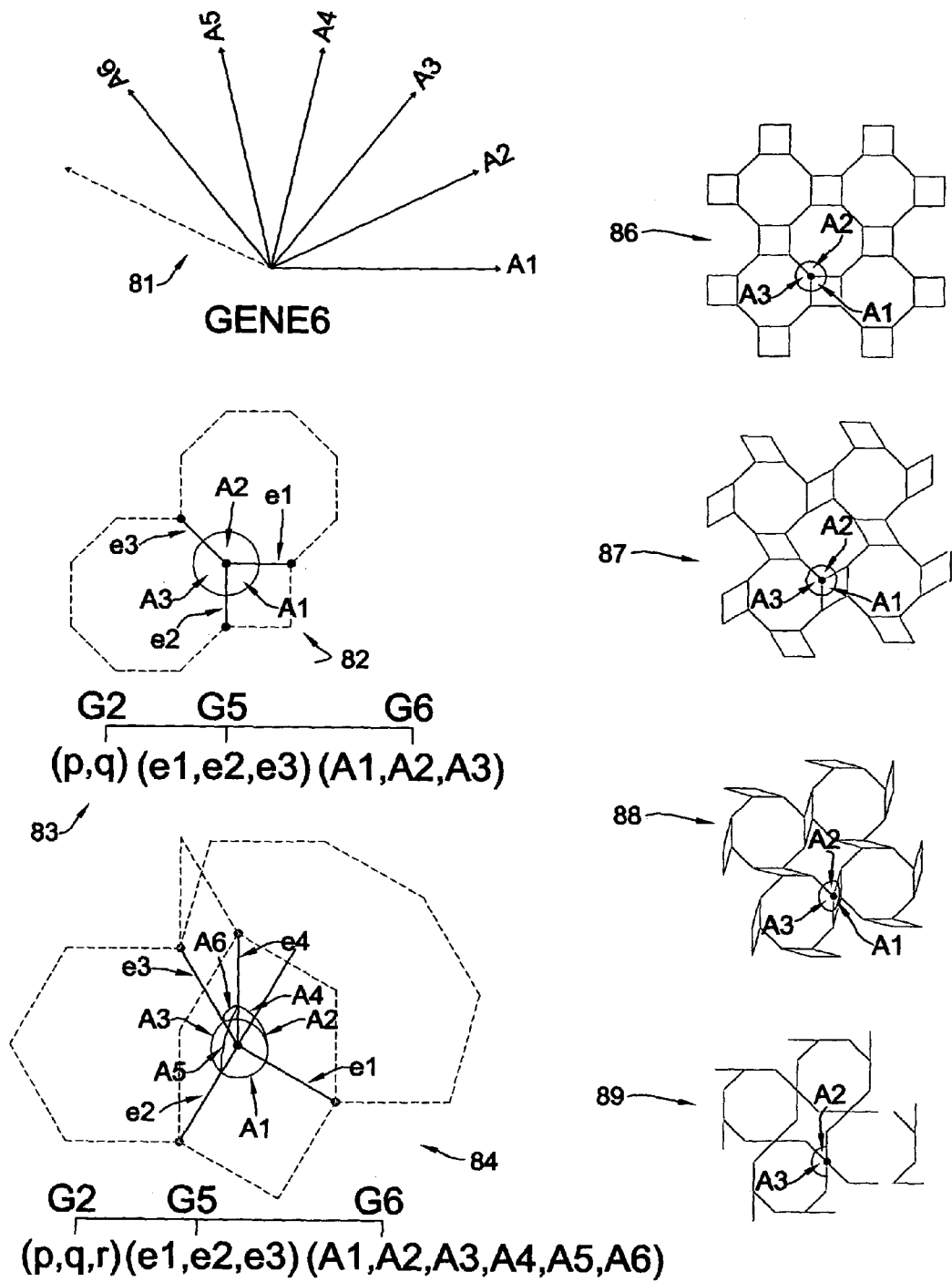
FIG. 19 shows the vector star of Gene6 which encodes snub structures having rotational symmetries.
Figure 20:
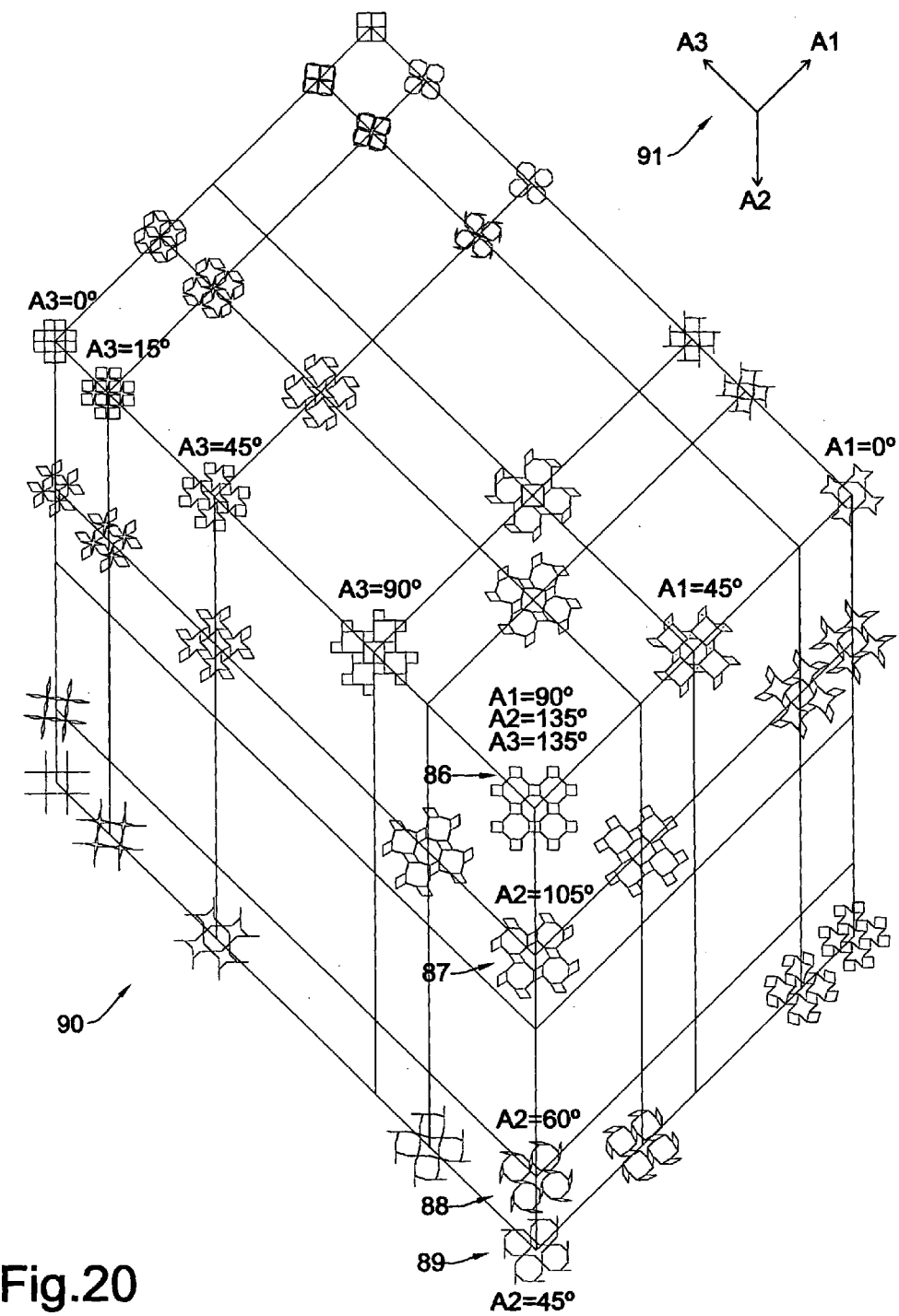
FIG. 20 shows the morpho-space of one family of structures encoded by Gene6 and Gene2.
Figure 24:
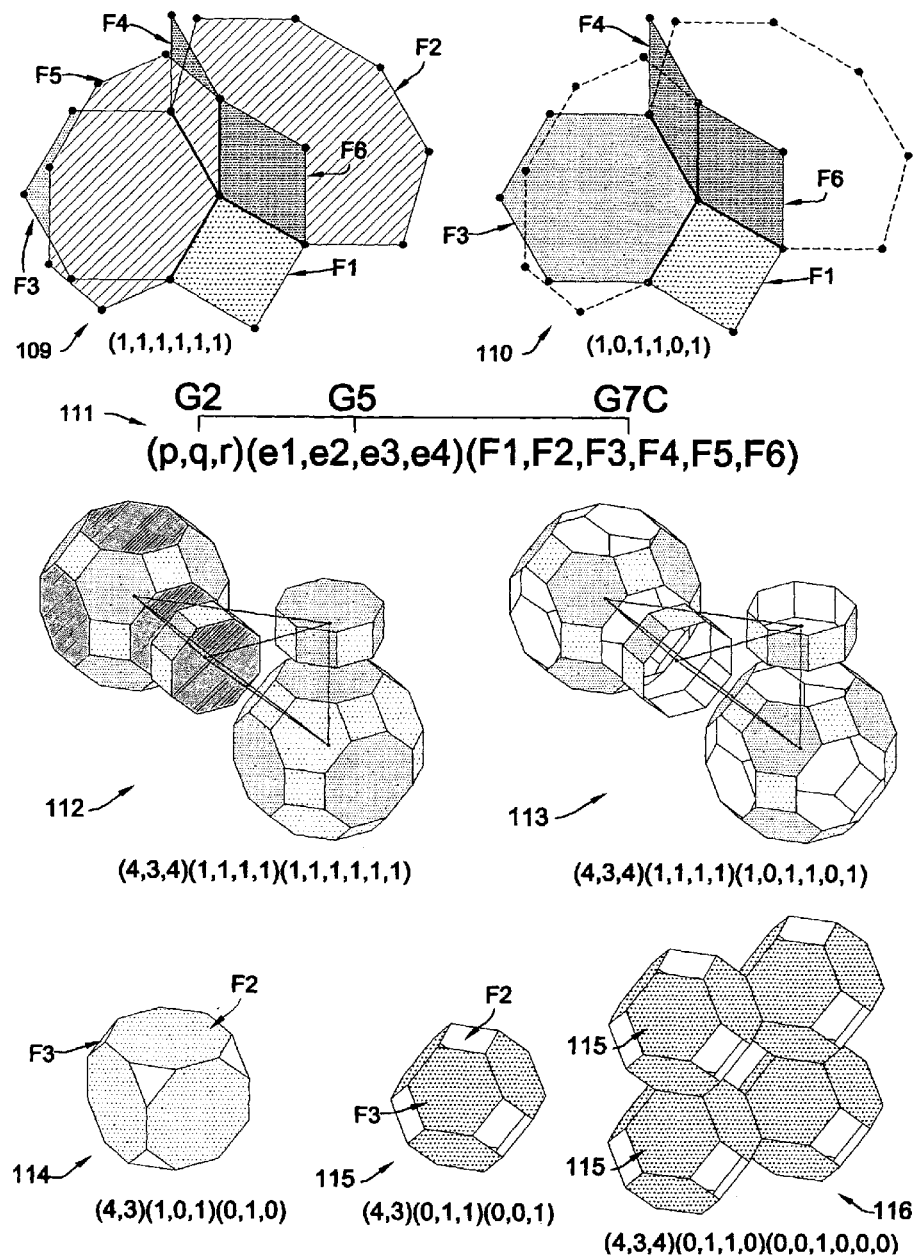
FIG. 24 shows the application of Gene7C and the encoding of 3-dimensional space-filling structures like space labyrinths having faces removed.
Figure 25:
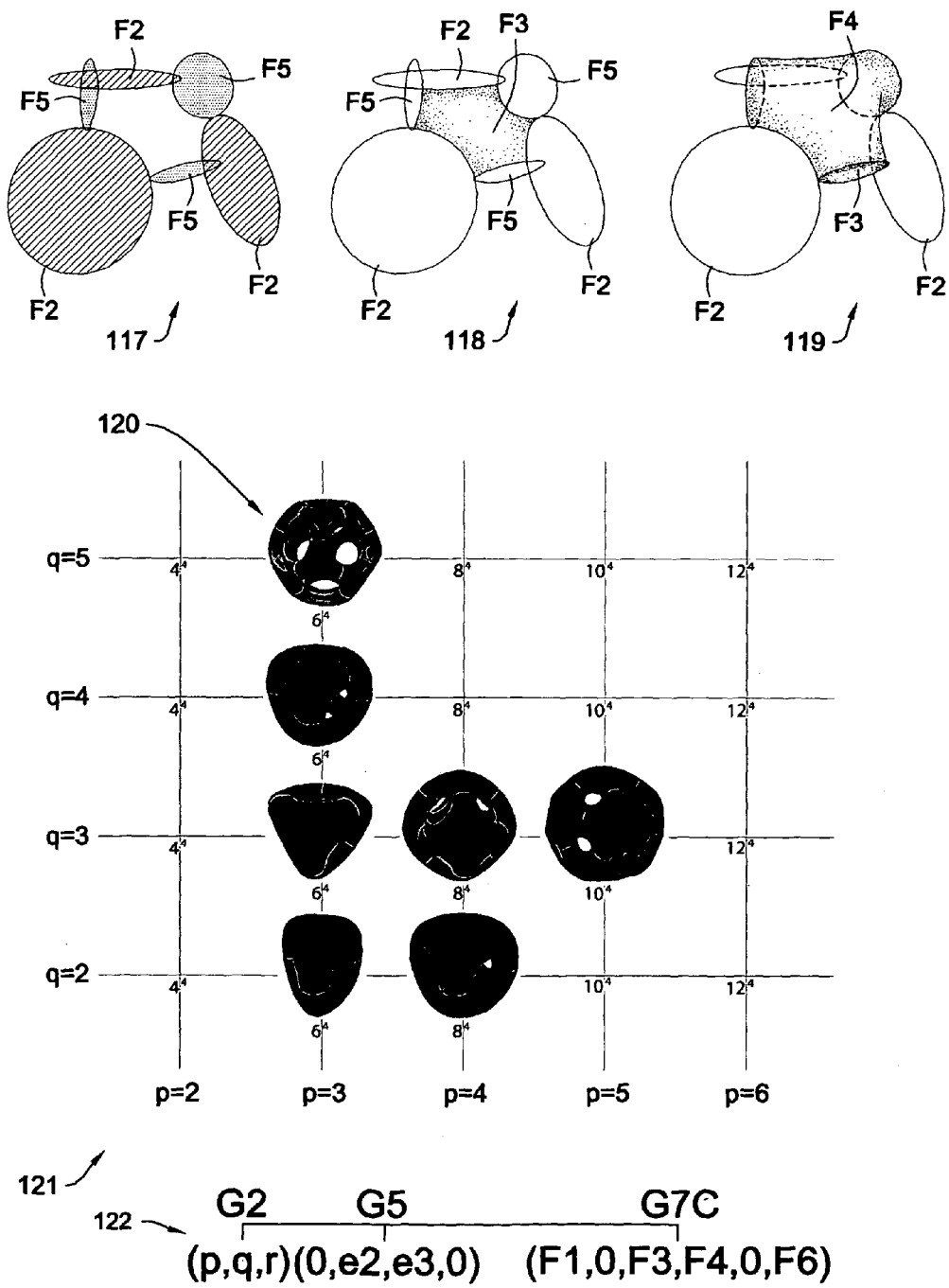
FIG. 25 shows a portion of an infinite table of curved space labyrinths encoded by Gene7C acting on Gene5 and Gene2 that specify the source topology.
Figure 26:
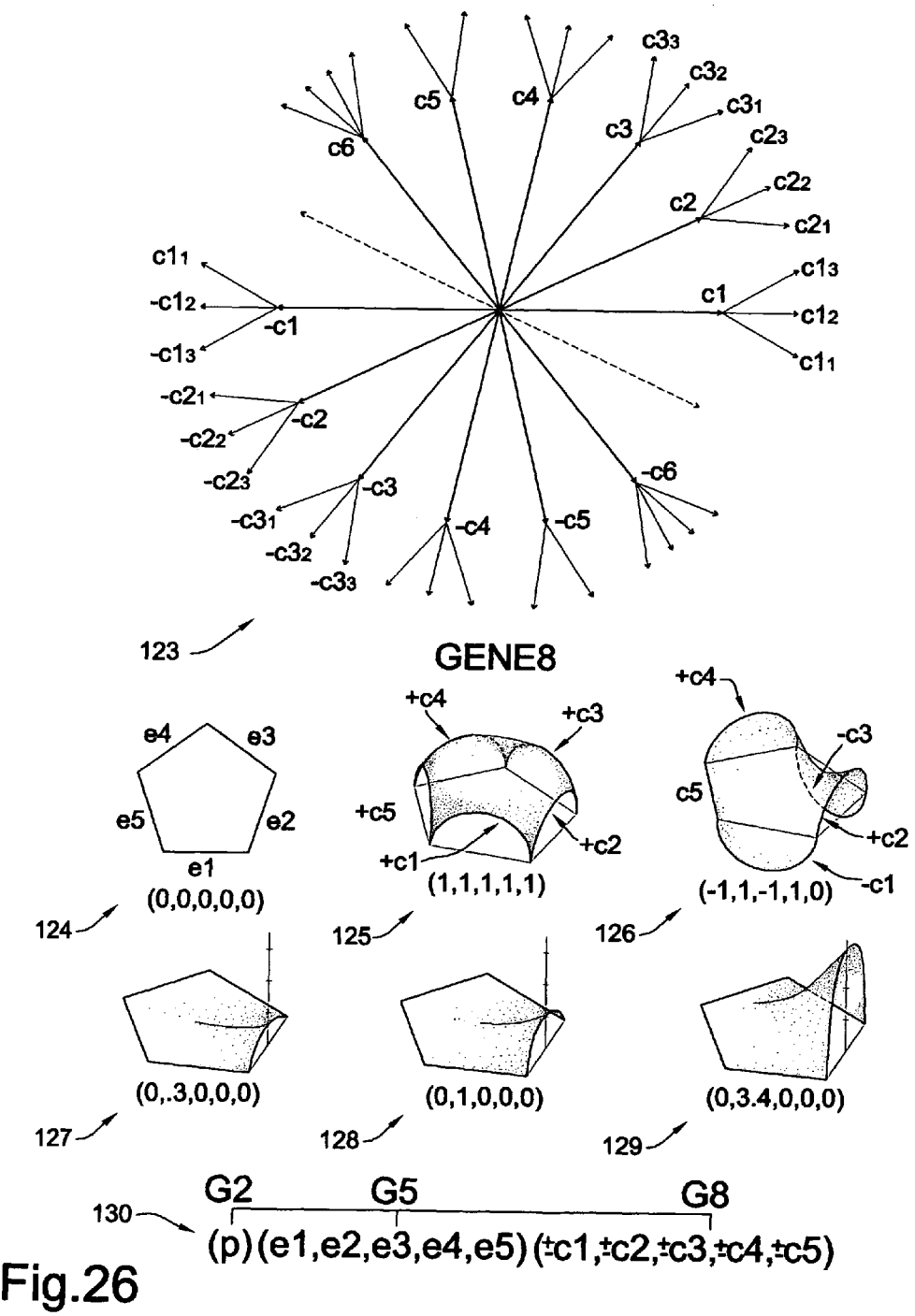
FIG. 26 shows the vector star for Gene8 which encodes the curving of structures encoded by Gene2 and Gene5.
Figure 27:
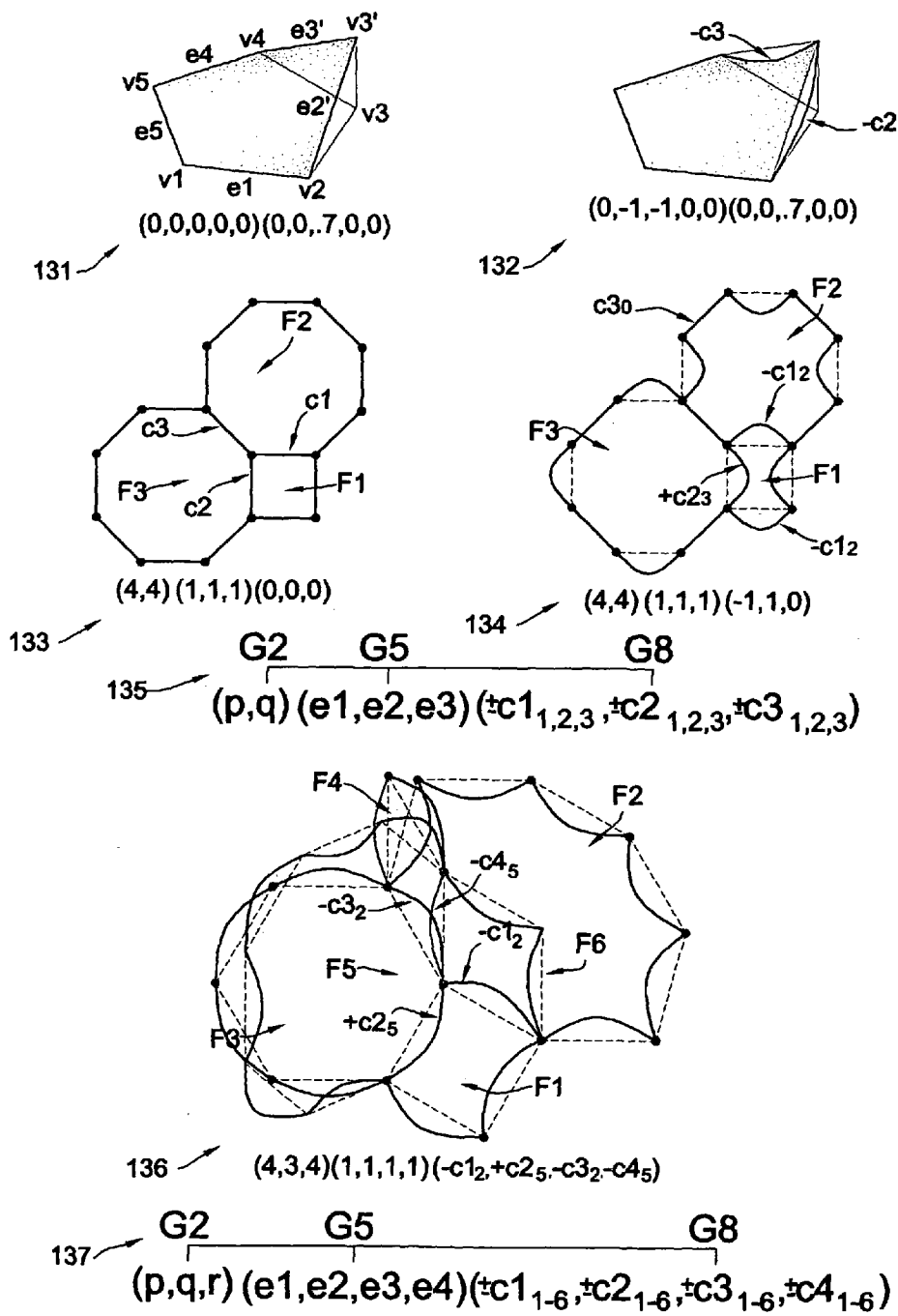
FIG. 27 shows some examples of curved structures encoded by the activation of Gene8 on Gene2 and Gene5.
Figure 28:
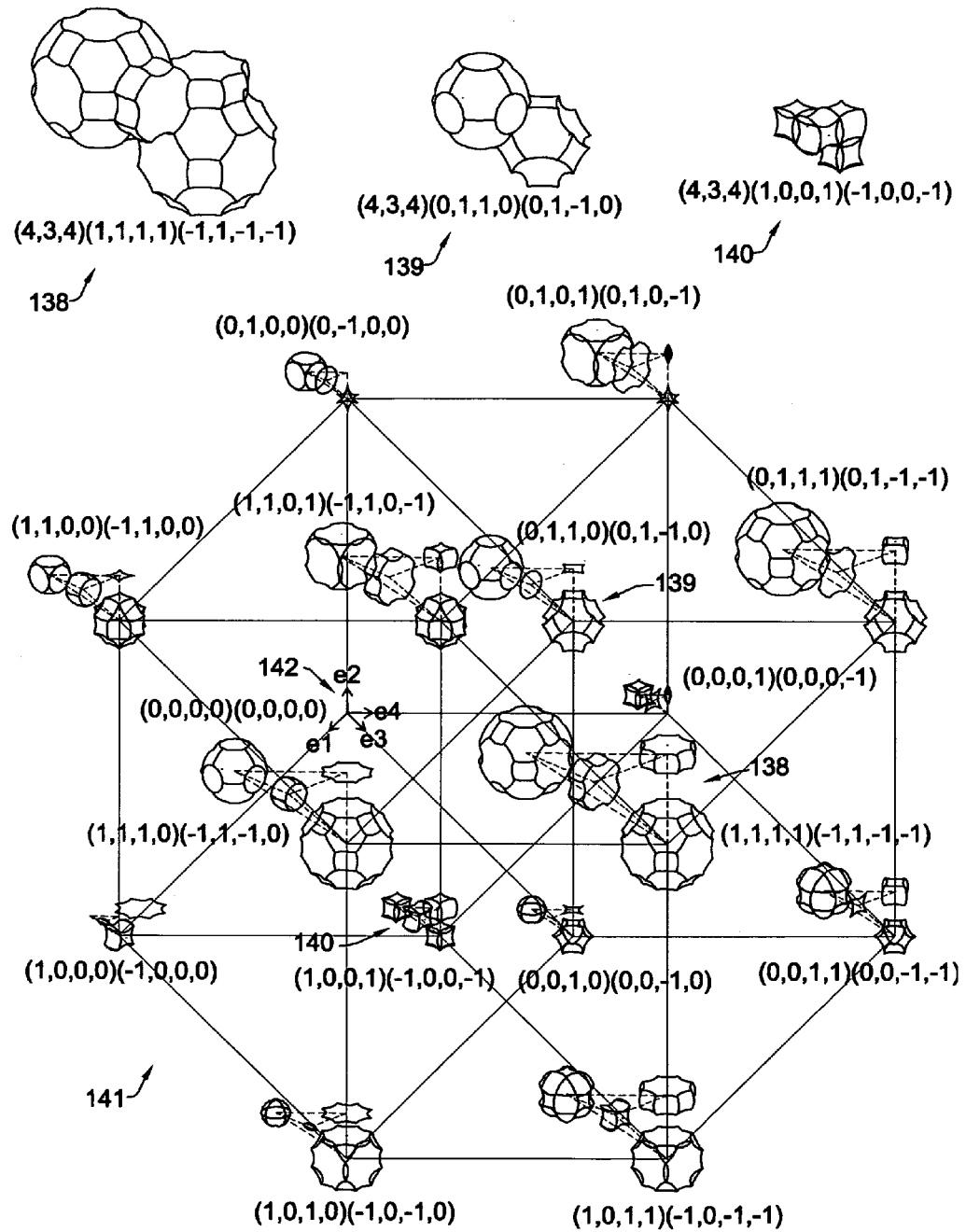
FIG. 28 shows an example of a family of curved space-filling polyhedral structures and their morph-codes.
Figure 29:
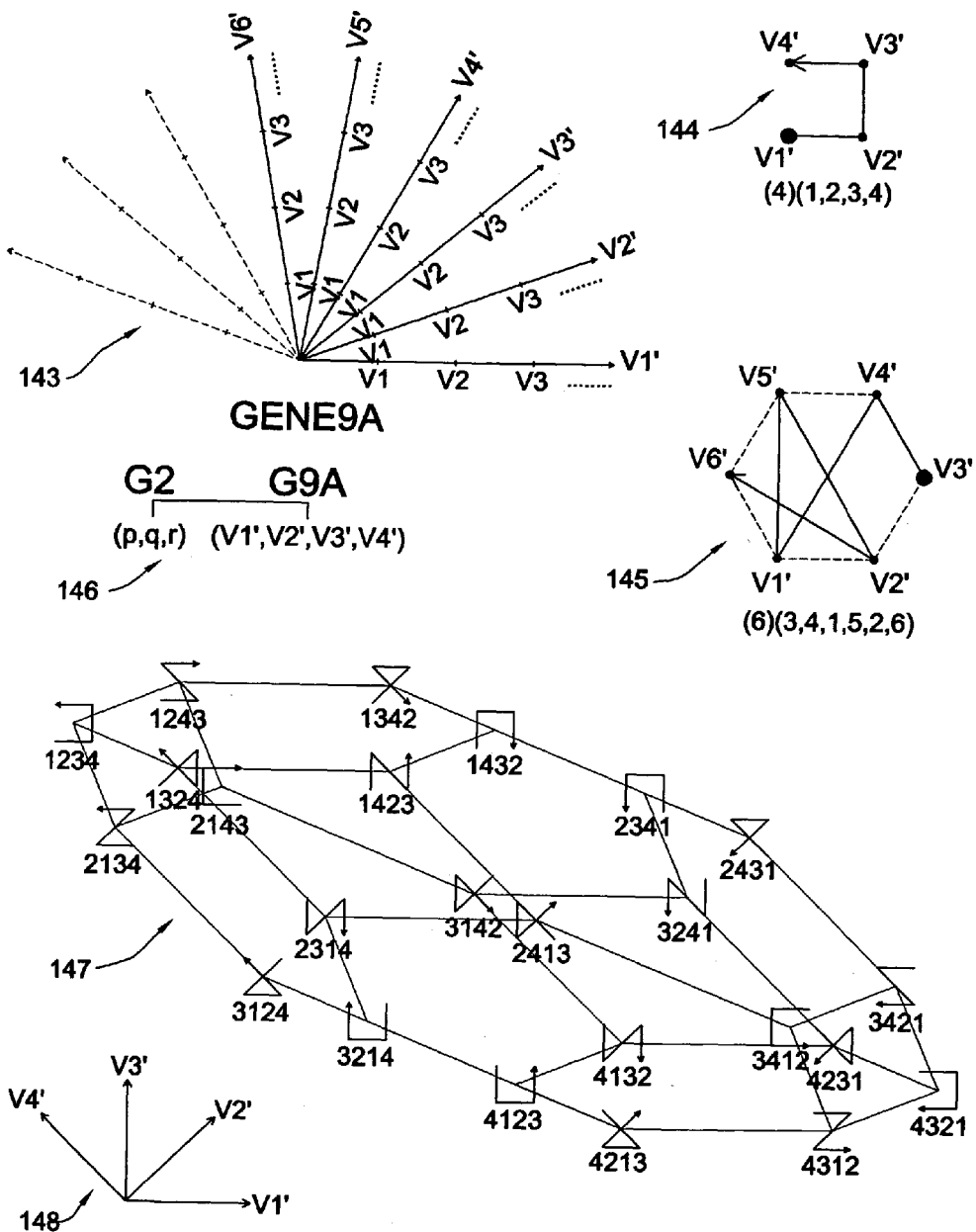
FIG. 29 shows the vector star of Gene9A that encodes the sequences of vertices and the morpho-space of a family of sequences of four vertices along with their morph-codes.
Figure 30:
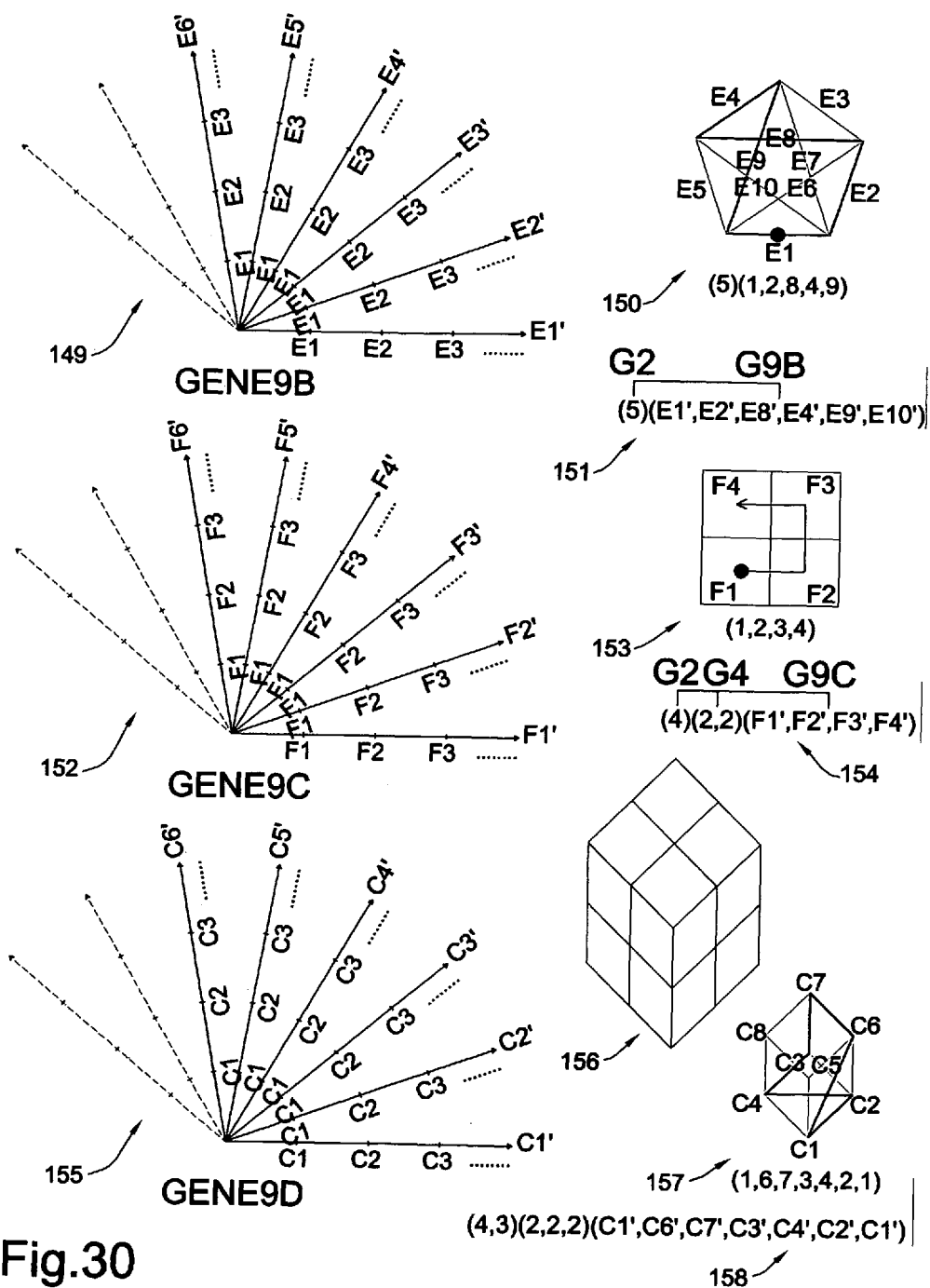
FIG. 30 shows the vector stars of Gene9B, Gene9C and Gene9D that encode the sequences of edges, faces and cells along with an example of each.
Figure 35:
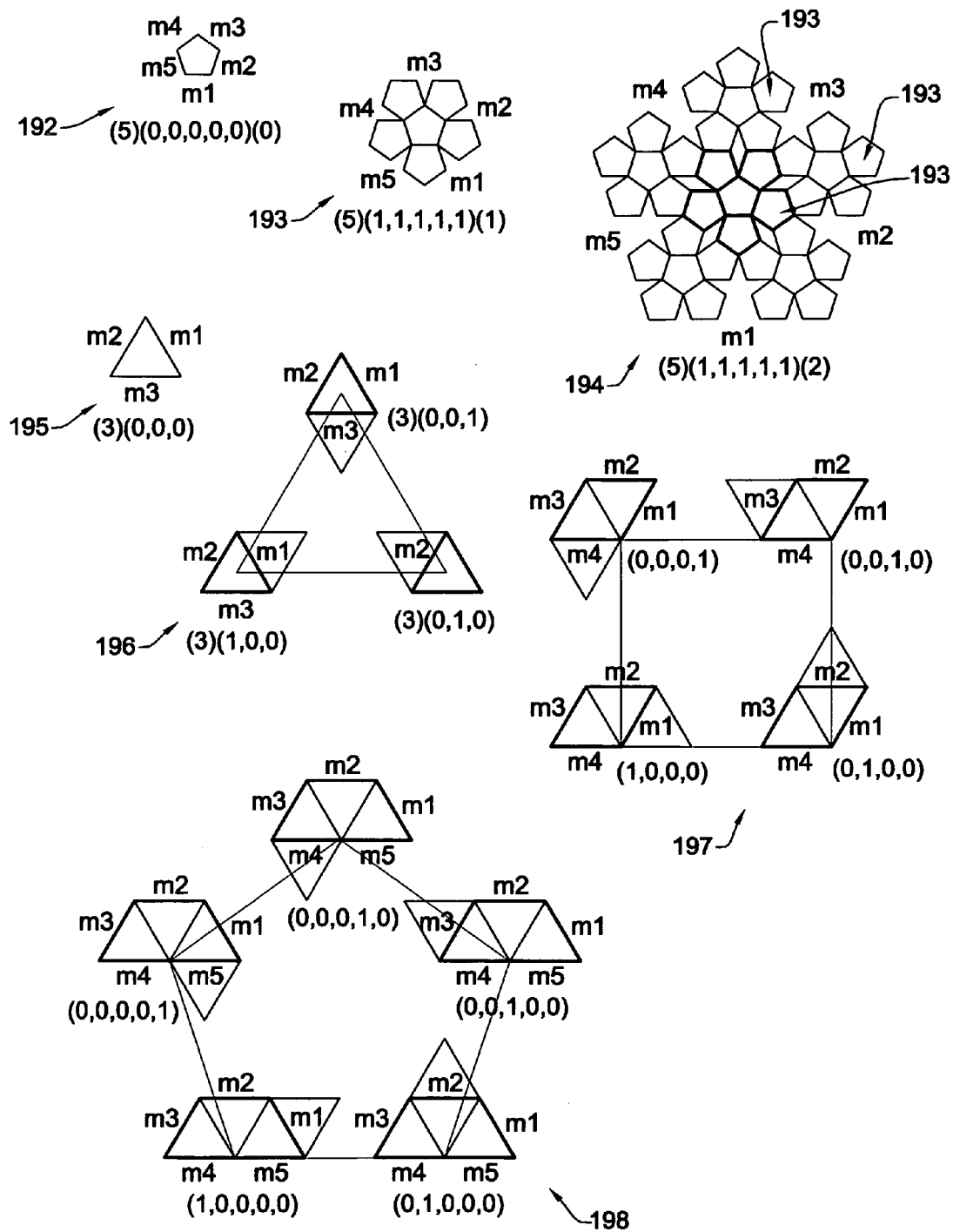
FIG. 35 shows two different recursive procedures by the action of Gene10B to generate a different fractal and assemblages of triangles.
Figure 36:
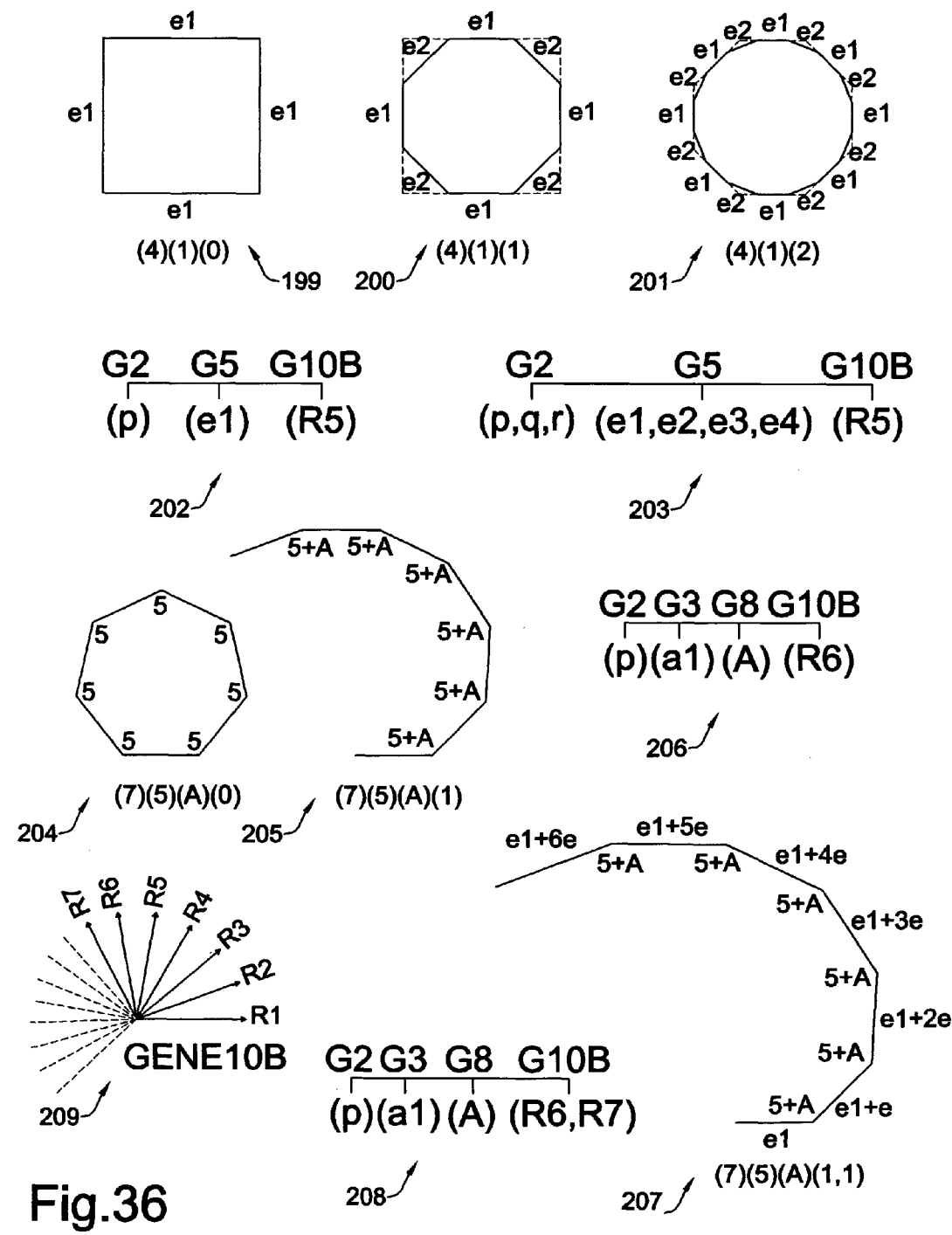
FIG. 36 shows three additional recursive procedures by the action of Gene10B to generate smoother forms, and forms that vary incrementally by varying angles or lengths.
Figure 37:
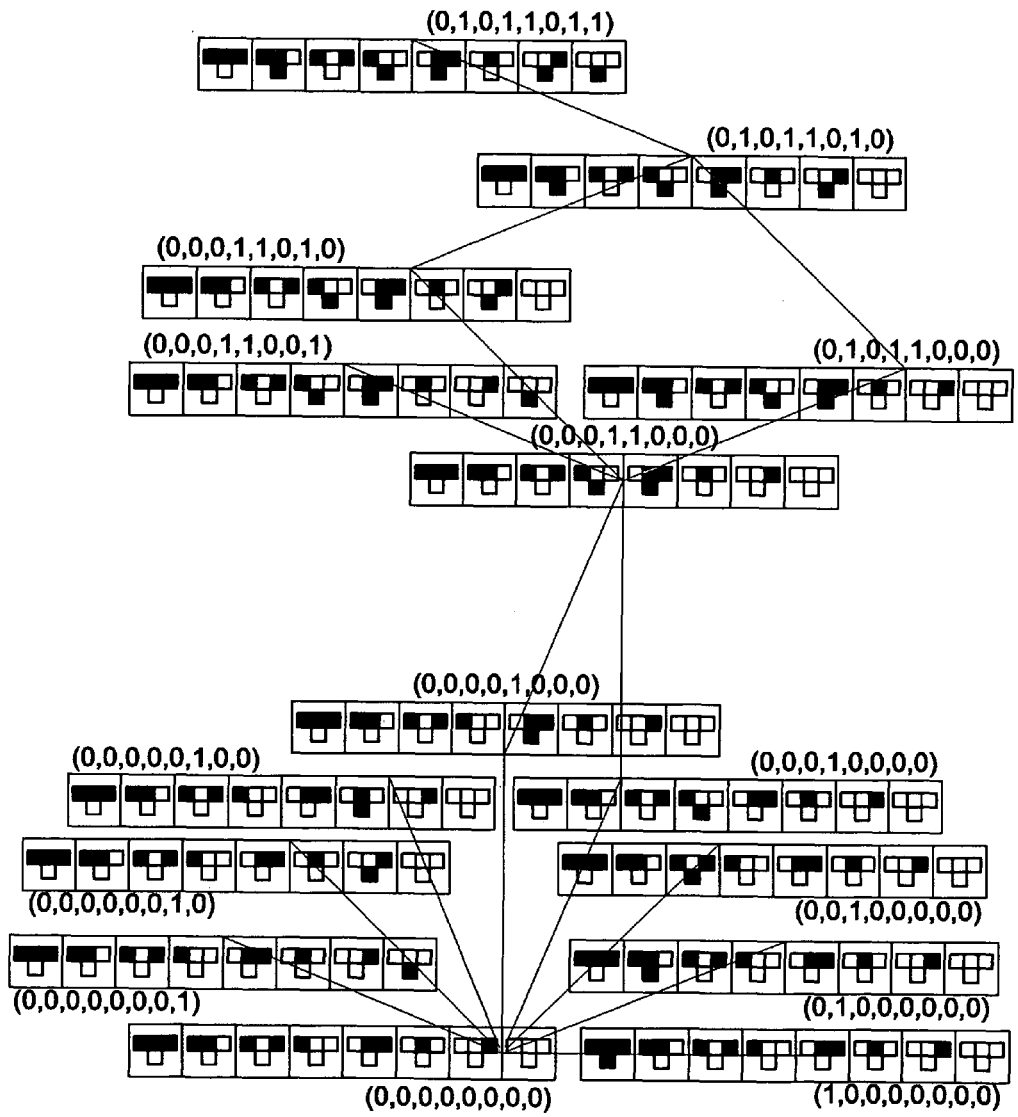
FIG. 37 shows the morpho-space of Gene11 that encodes Wolfram's one-dimensional cellular automata rules and their encoding in 8-dimensional Cartesian co-ordinates.
Figure 38:
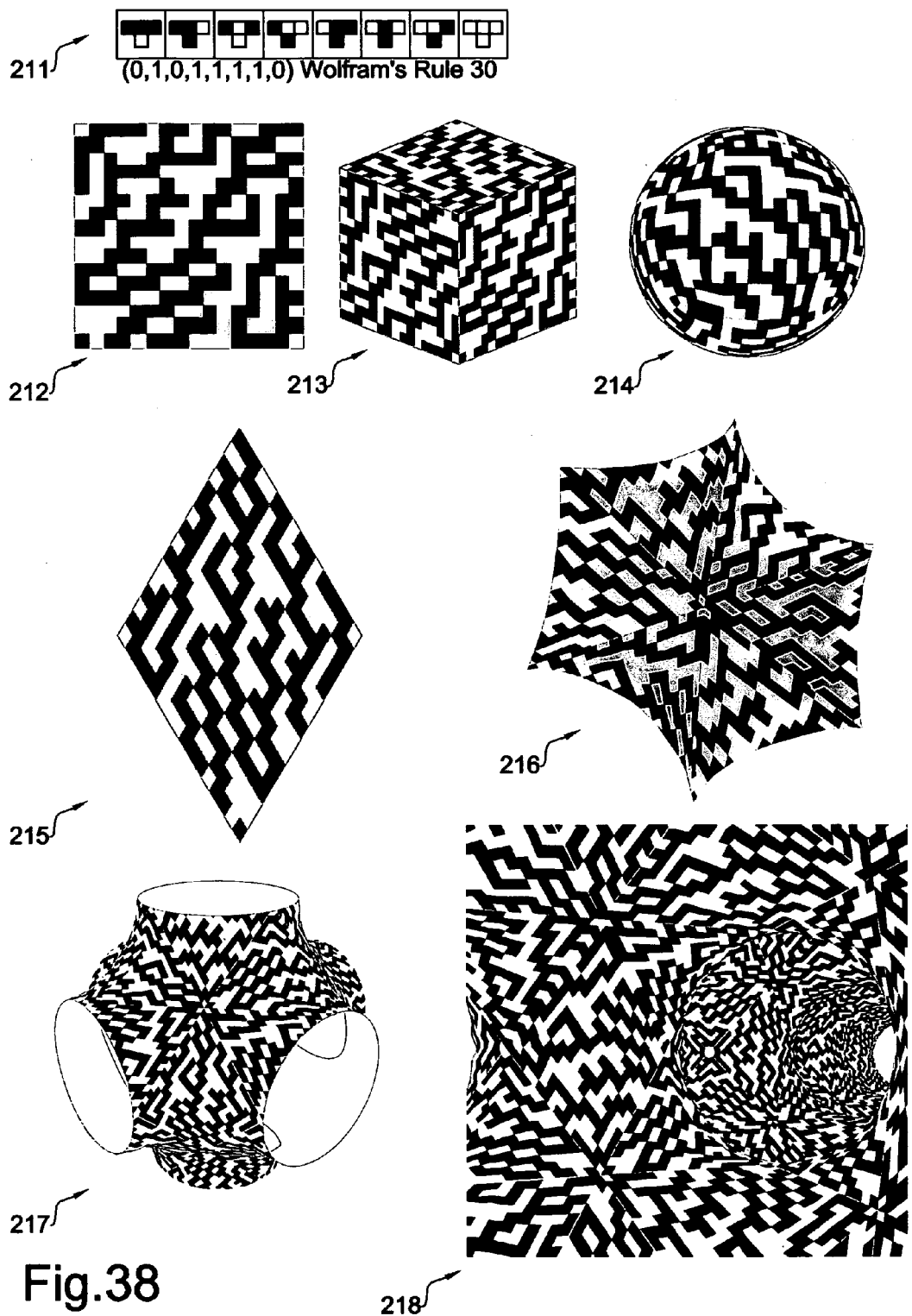
FIG. 38 shows the application of Wolfram's Rule 30 and its mapping on various surfaces like a cube, a sphere, a hexagonal saddle and the Schwarz surface.
Figure 40:
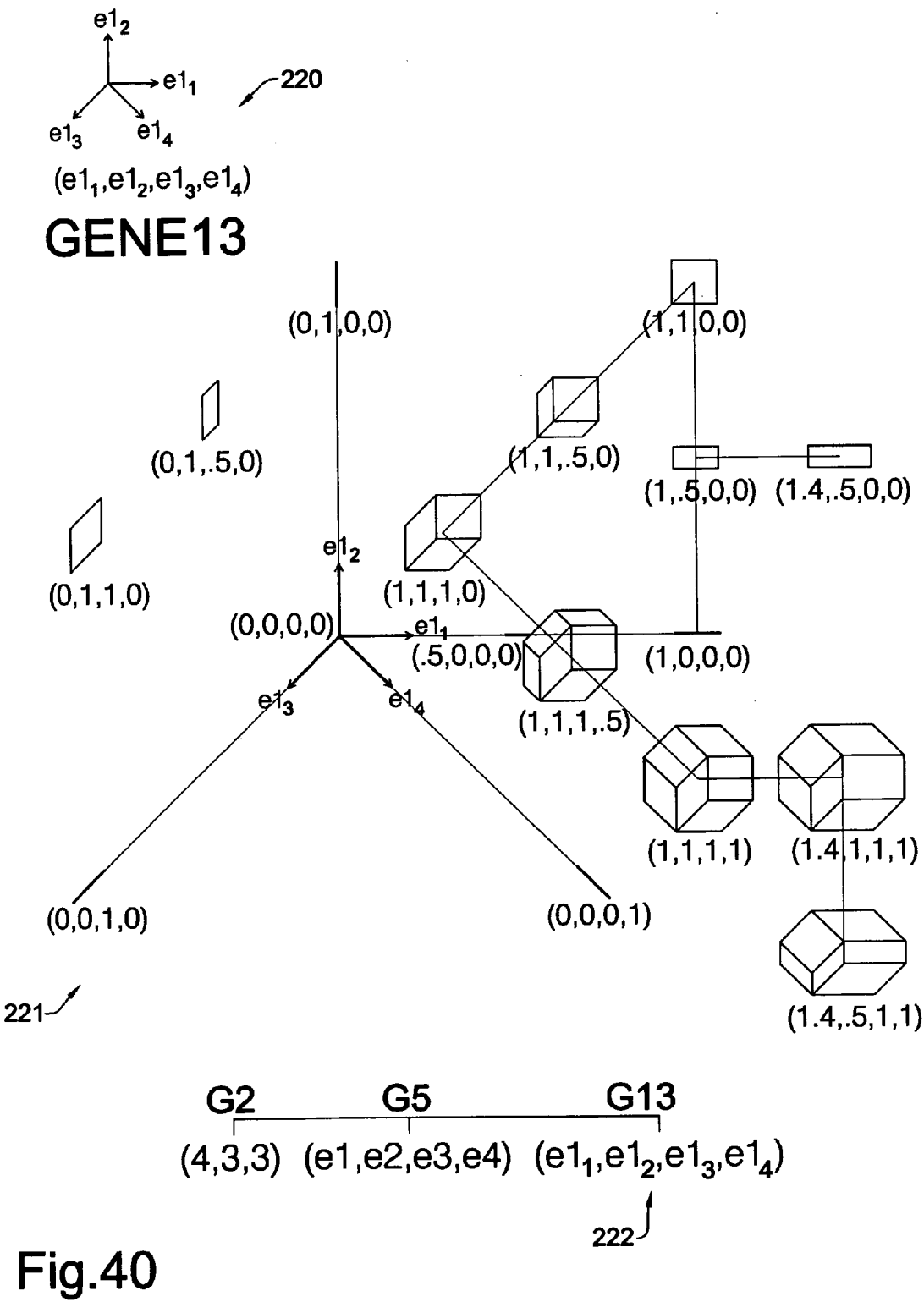
FIG. 40 encodes the morpho-space of Gene13 that encodes dimensional extent or size.
Figure 41:
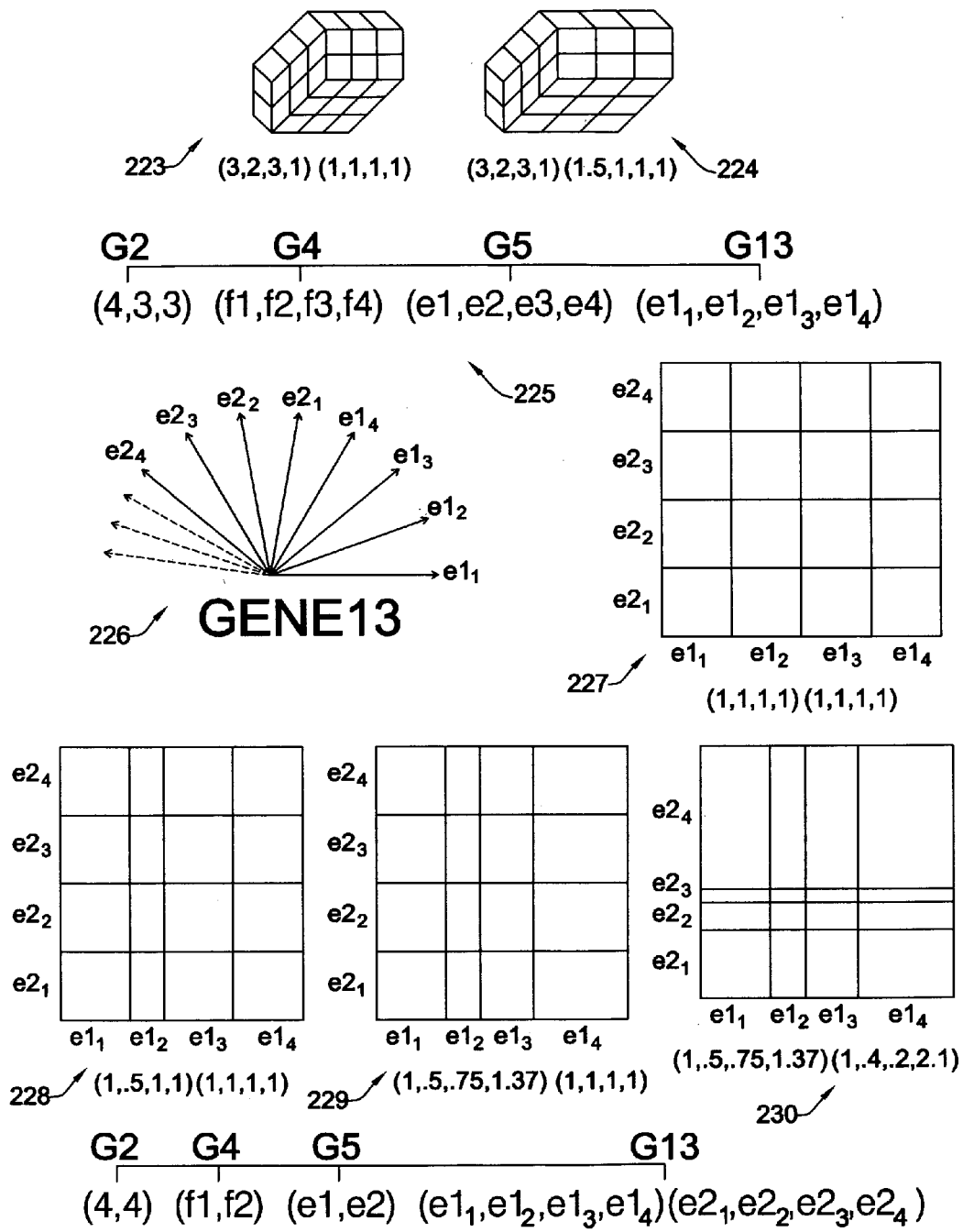
FIG. 41 shows an example of how Gene13 acts to generate an asymmetric grid from a regular grid.
Figure 42:
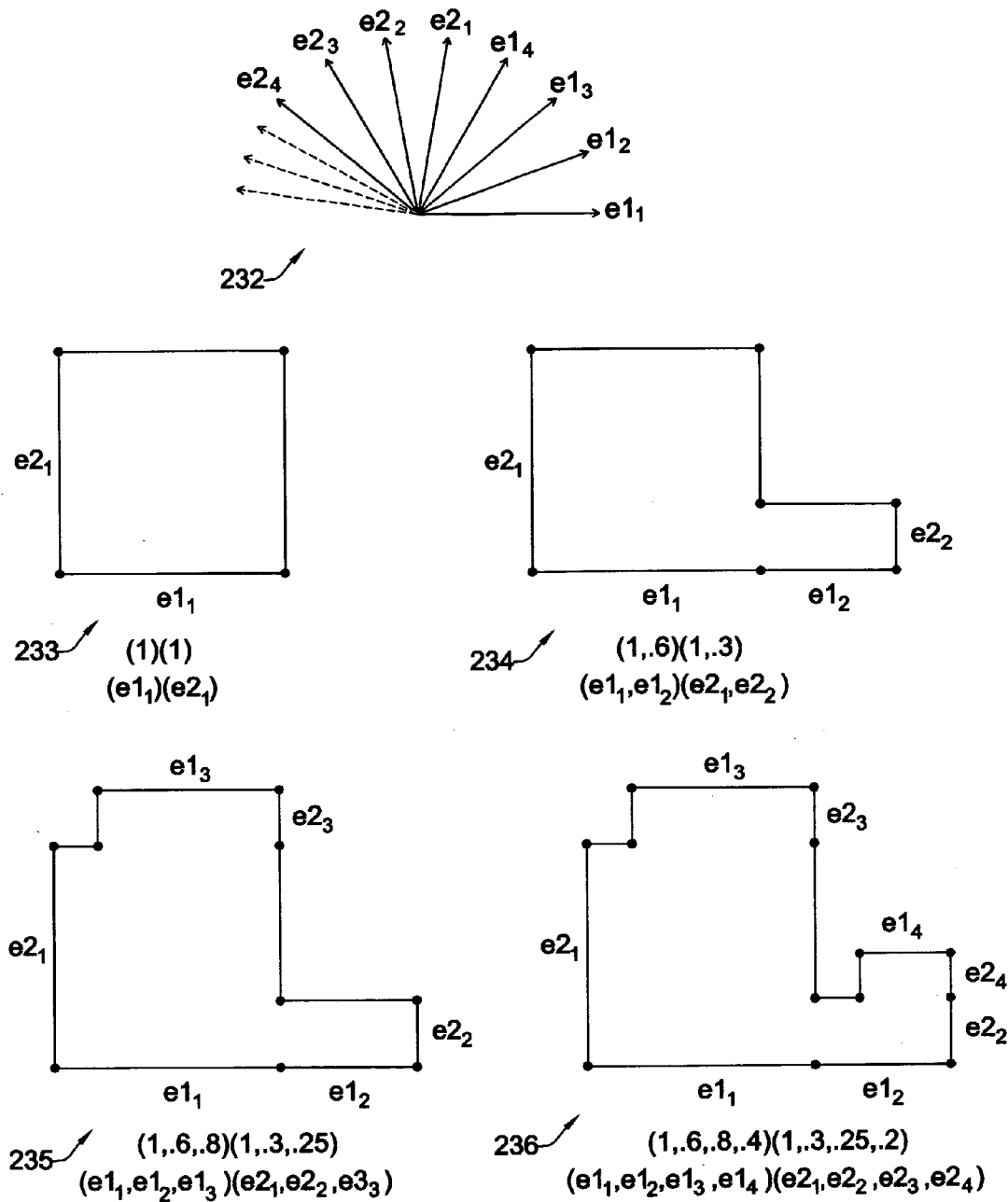
FIG. 42 shows another example of how Gene13 acts to generate an asymmetric form from a simple, symmetric one.
Figure 43:
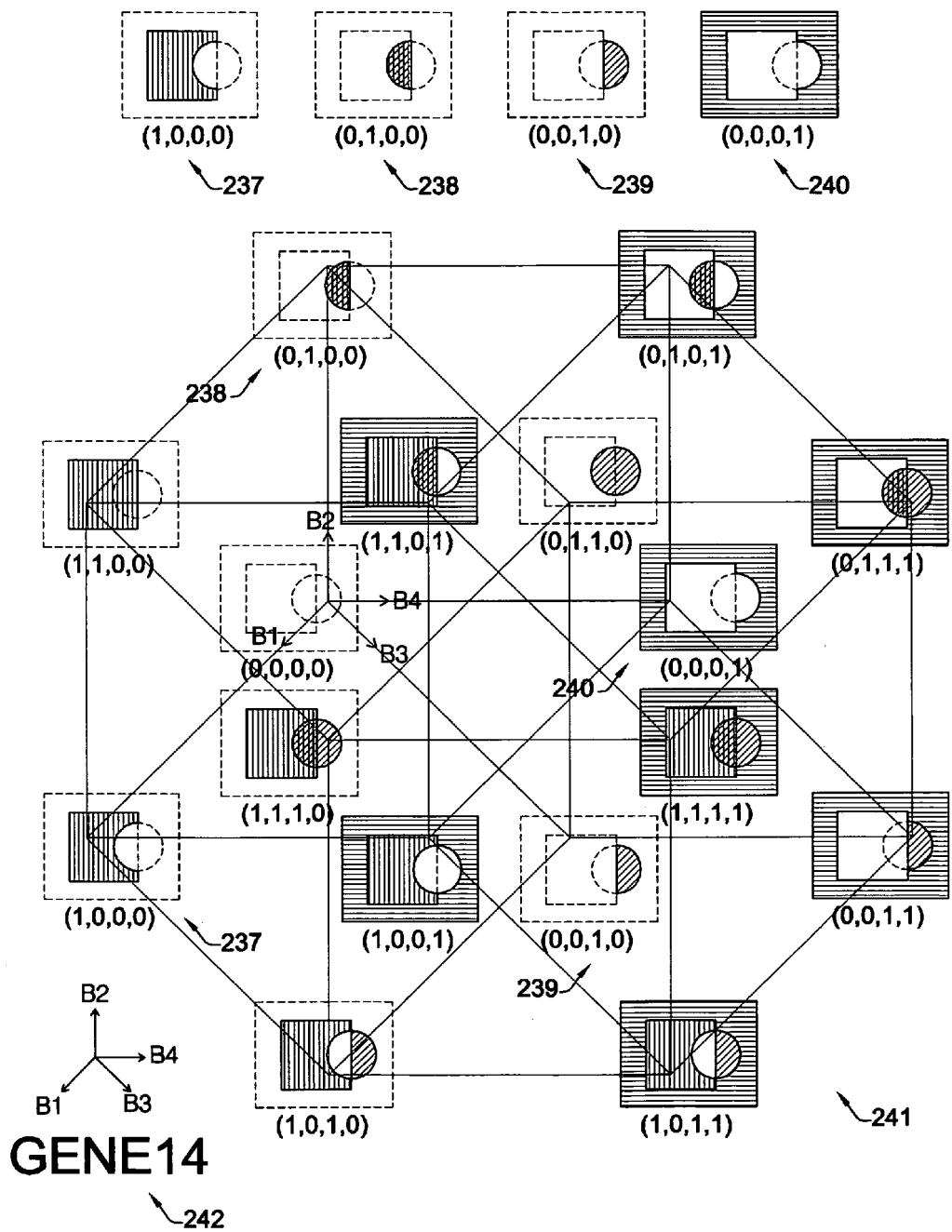
FIG. 43 encodes the morpho-space of Gene14 that encodes Boolean operations which specify the interactions between two or more forms.

| Morph Gene No. | Gene Symbol | Morphological Transformations | FIGS. |
|---|---|---|---|
| Gene1 | G1 | Number of Elements | FIGS. 5-7 |
| Gene2 | G2 | Regular Topologies | FIGS. 8, 9 |
| Gene3 | G3 | Angle Variations | FIGS. 11-13 |
| Gene4 | G4 | Subdivision of Space | FIGS. 14, 15 |
| Gene5 | G5 | Subdivision of Structure | FIGS. 16-18 |
| Gene6 | G6 | Rotary Transformations | FIGS. 19, 20 |
| Gene7 | G7 | Addition-Subtraction of Elements | FIGS. 21-25 |
| Gene8 | G8 | Curvature of Elements | FIGS. 26-28 |
| Gene9 | G9 | Sequences of Elements | FIGS. 29, 30 |
| Gene10 | G10 | Recursive Rules | FIGS. 31-36 |
| Gene11 | G11 | Cellular Automata Rules | FIGS. 37, 38 |
| Gene12 | G12 | Dimensional Projection | FIG. 39 |
| Gene13 | G13 | Dimensional Extent (Size) | FIG. 40-42 |
| Gene14 | G14 | Boolean Operations | FIG. 43 |
| Gene15 | G15 | Position | FIG. 44 |

TABLE 2

Morphological Parameters, Dimensions and Vector Numbers associated with the Morph Genes

| Gene Symbol | Morphological Parameters | Dimensions | Vector Nos. |
|---|---|---|---|
| G1 | V, E, F, C | D1-D4 | V1-V4 |
| G2 | p, q, r; (n) | D1-D3 | V5-V7 |
| G3 | a1, a2, a3, a4, a5, a6, a7, a8, a9; (n) | D1-D9 | V8-V16 |
| G4 | f1, f2, f3, f4, f5, f6 | D1-D6 | V17-V22 |
| G5 | e1, e2, e3, e4 | D1-D4 | V23-V26 |
| G6 | A1, A2, A3, A4, A5, A6 | D1-D6 | V27-V32 |
| G7A | V1, V2, V3, V4, V5, V6, V7, V8, V9 | D1-D9 | V33-V41 |
| G7B | E1, E2, E3, E4, E5, E6, E7, E8, E9 | D1-D9 | V42-V50 |
| G7C | F1, F2, F3, F4, F5, F6, F7, F8, F9 | D1-D9 | V51-V59 |
| G7D | C1, C2, C3, C4, C5, C6, C7, C8, C9 | D1-D9 | V60-V68 |
| G8 | +-c1$_{1,2,3}$, +-c2$_{1,2,3}$, +-c3$_{1,2,3}$, | D1-D9 | V69-V74 |
| G9A | V1', V2', V3', V4', V5', V6', V7', V8' . . . | D1-D9 | V75-V83 |
| G9B | E1', E2', E3', E4', E5', E6', E7', E8' . . . | D1-D9 | V84-V92 |
| G9C | F1', F2', F3', F4', F5', F6', F7', F8' . . . | D1-D9 | V93-V101 |
| G9D | C1', C2', C3', C4', C5', C6', C7', C8' . . . | D1-D9 | V102-V110 |
| G10A | m1, m2, m3, . . . ; r1, r2, r3, . . . ; R1 | D1-D9 | V111-V119 |
| G10B | R2; R3; R4; R5; R6; R7 | D1-D7 | V120-V126 |
| G11 | F1, F2, F3, F1F2, F1F3, F2F3, . . . | D1-D8 | V127-V135 |
| G12 | (n), i, S | D1-D2 | V136-V137 |
| G13 | e1$_1$, e1$_2$, e1$_3$, e1$_4$, . . . e2$_1$, e2$_2$, . . . | D1-D9 | V138-V146 |
| G14 | B1, B2, B3, B4 | D1-D4 | V147-V150 |
| G15 | d1, d2, d3, . . . | D1-D3 | V151-V153 |

-dimensional. In 3, the vector numbers are replaced by the actual morphological parameters that specify each group of morphological transformations. The symbols correspond to Table 2.

Figure 2:
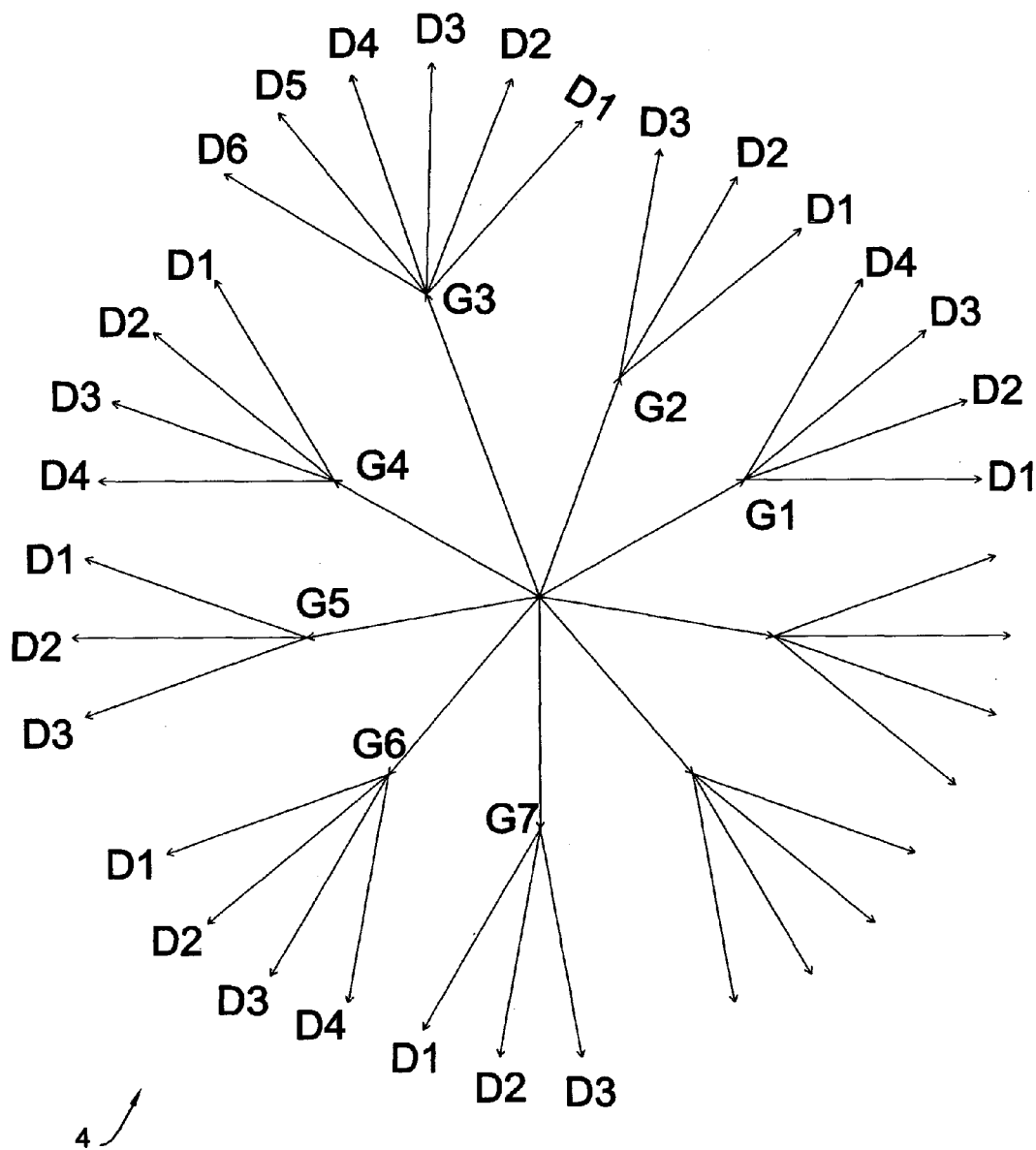
FIG. 2 shows an radial representation of the morph genome.

FIG. 2 shows an alternative representation of the morph genome, shown schematically. In this radial format of the linear version 1 in FIG. 1, the genes radiate from a common center. The genes could radiate from other genes and not all from the center. Other geometries of representations are possible, for example, in 3 dimensions, but these do not change the scope of the invention.

FIG. 3 shows the mapping of 4 vectors V1, V2, V3, V4 indicated by the generating star 5, into a 4-dimensional hyper-cubic lattice 6. The numbers represent the Cartesian co-ordinates of all vertices of the lattice. The lattice is infinite in extent, and the co-ordinates of each point are shown in their compressed form by removing the commas separating the co-ordinates. For example, the one-digit number 2 is a compressed form of the 4-dimensional co-ordinates (2,0,0,0), the two-digit number 13 is a compressed form of (1,3,0,0), the three-digit number 354 is a compressed form of (3,5,4,0) and the four-digit number 2045 is a compressed form of coordinates (2,0,4,5). The Cartesian co-ordinates, within a bracket with each number separated by commas, and the compressed form with or without brackets will be used inter-changeably in this disclosure. FIG. 3 will be used as a basis for mapping the morph-space of many of the morphological transformations captured in the morph genome. This will become clear from examples.

A spin-off application of the morph genome is the hypercubic lattice representation of numbers as integers, rational numbers and real numbers. This can be useful in number-processing by computers. The compressed form of higher-dimensional Cartesian co-ordinates, as shown in FIG. 3, provides a way to represent all integers. For this, the extent of the vectors must be restricted to 9 digits from 0 thru 9 along each vector. In doing so, vector V1 is calibrated in single digit numbers from 1 thru 9, V2 in all 10's (10, 20, 30, ... 90), V3 in all 100's (100, 200, 300, ... 900), V4 in 1000's (1000, 2000, 3000, ... 9000), V5 in 10,000s (10,000, 20,000, 30,000, ... 90,000), V6 in 100,000's, V7 in millions, and so on, in increasing powers of 10. The entire lattice includes all integers. In this application of the morph-genome, all numbers composed of multi-digit integers are viewed as higher-dimensional entities, where each digit of the number is mapped in a separate dimension. The 'dimension of the number' equals the number of digits in the number being represented. Real numbers, i.e. those having decimal places, can be mapped by applying this lattice recursively such that the numbers after the decimal place are a separate hyper-cubic lattice that emanates from each vertex of the lattice of integer numbers. The numbers on the left side of the decimal place are vertices of the primary lattice from which emanate the lattice comprising the numbers on the right side of the decimal place.

Figure 4:
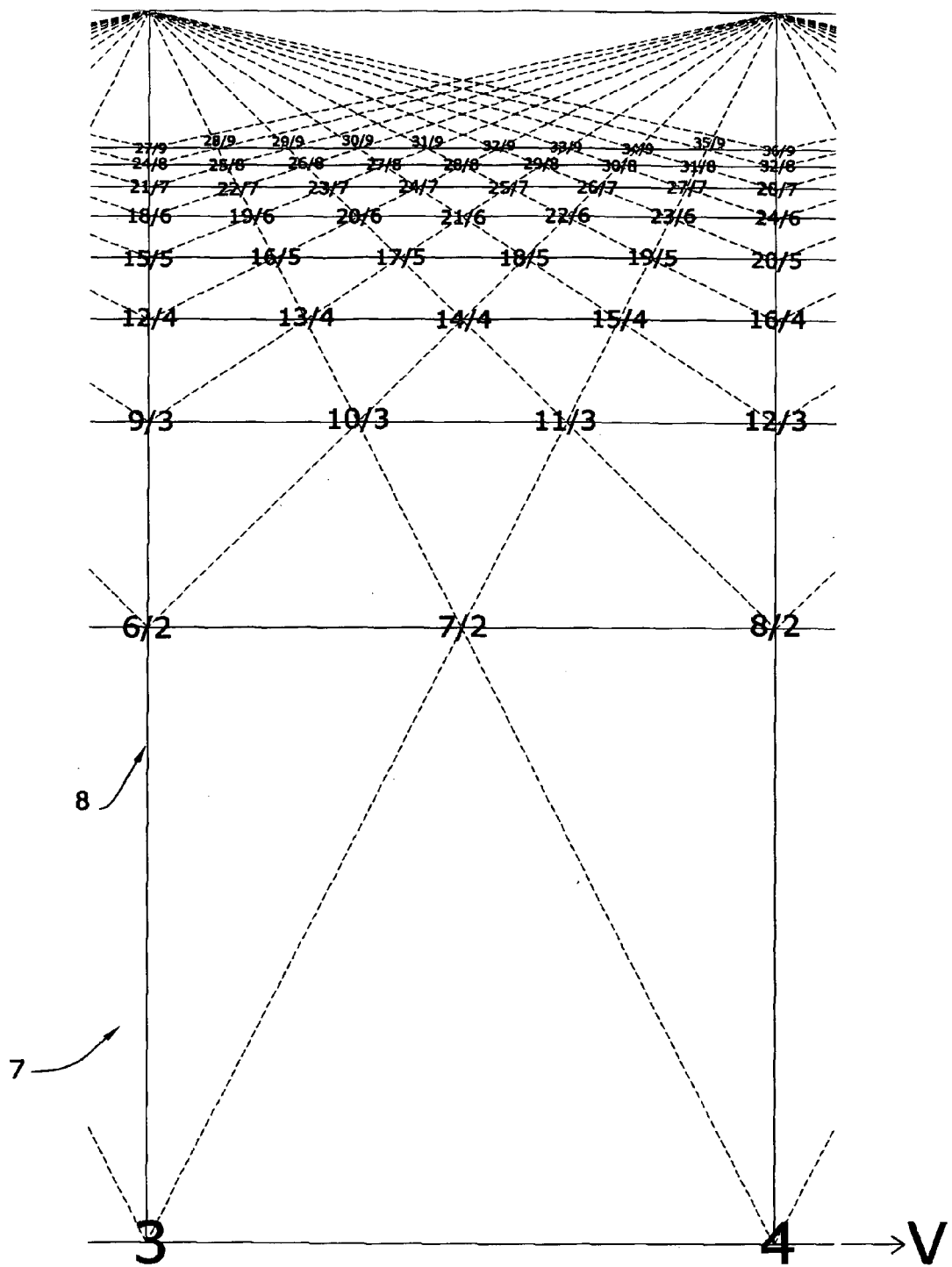
FIG. 4 shows the space between two integers and how it is filled with all rational numbers.

FIG. 4 shows the morpho-space 7 between two integers, 3 and 4 as an example, mapped as an infinite triangular lattice of rational numbers. The lattice becomes denser as the denominator increases. These two integers lie on the vector V1 in FIG. 3, is illustrated. Along the vertical grid line 8 at integer 3, the denominator increases by 1, and the numerator is 3 times the denominator. Along the horizontal axes, the spaces between 3 and 4 are filled in one-halves, ⅓rds, ¼ths, ⅕ths, ⅙ths, and so on, as we move upwards. Applying this to the entire space in FIG. 3, we get higher-dimensional Cartesian co-ordinates in rational numbers. An application to form will be shown later in FIG. 9.

DETAILED DESCRIPTION

Gene1

(FIGS. 5-7) DimensionsD1-D4, VectorsV1-V4

Gene1 specifies the number of topological elements of different dimensions in structures (forms, patterns, configurations) of different dimensions. All structures are composed of these elements. For the purposes of illustration, the extent of Gene1 will be restricted to 4 dimensions, representing the numbers of elements in a 3-dimensional structure. For 3d structures, the elements, in increasing dimensions are: points (vertices), edges, faces and polyhedra (cells). Their corresponding numbers are represented by the symbols V, E, F and C. For higher-dimensional structures, the numbers of hyper-cells for each higher dimension will need to be added.

The morpho-genomic space of Gene1 for the number of elements V, E, F and C is represented in a 4-dimensional hyper-cubic lattice, where each of these variables represents an independent dimension (Dimensions D1-D4) indicated by a different vector (Vectors V1-V4). Throughout this application, each gene will be described with its Dimension numbers which are internal to that gene, and Vector numbers which track the total number of dimensions as we move through different genes.

The generating vectors for this morpho-space of Gene1 are shown in illustration 9 (FIG. 5, top), where each vector is calibrated in unit vectors. The vectors are arranged in a counter-clockwise manner, starting from the horizontal vector, Vector1, on the right. Vector1 represents the number of vertices V (V=1, 2, 3, 4, 5, 6 ... ), Vector2 represents the number of edges E (E=1, 2, 3, 4, 5, 6 ... ), Vector3 represents the number of faces F (F=1, 2, 3, 4, 5, 6 ... ), and Vector4 represents the number of cells C (C=1, 2, 3, 4, 5, 6 ... ). The entire lattice covers all possible structures having any combination of these numbers. The structures that satisfy the well known Euler's equations for polyhedra and packings, namely, V−E+F=2 or 2−2g, where g is the genus (number of holes), are a sub-set within this space. The morpho-genomic space includes these structures and also those which do not satisfy Euler's equations (here termed 'non-Eulerian' structures). The illustration also indicates vectors for 4-dimensional cells ($C_4$), 5-dimensional cells ($C_5$), and so on.

The bottom group of illustrations in FIG. 5 show various examples of simple, low number combinations of the V,E,F co-ordinates. 10 is the open triangle (3,3,0) having 3 vertices, 3 edges and no face. 11 is a digon (2,2,1) with 2 vertices, 2 edges, and 1 face. 12 is a surface (2,3,1) with 2 vertices, 3 edges and 1 face; the base plane is comprised of 2 open polygons, a monogon on the left and a digon on the right. 13 is a structure (1,3,2) with one-vertex in the center, edges and 2 faces. 14 is a structure (2,2,2) with 2 vertices, 2 edges and 2 faces. 15 is a structure (2,0,2) with 2 vertices, no edges, and 2 faces. 16 is a structure (2,1,3) with 2 vertices, 1 edge and 3 faces.

FIG. 6 shows a small group of polygonal structures and their co-ordinates in V,E,F space 17 with its generating vectors 18 as shown. The top horizontal plane is a VF plane, where F and V vary, but E=4 for all structures in that plane. The vertical plane (in the plane of the paper) is a VE plane with F=1 structures. The third orthogonal plane is a EF plane with V=1 structures.

FIG. 7 shows that the discrete values of V,E,F could imply a continuum of morphing structures. For example, in the illustration 19, a continuum is shown between a triangle (3,3,1) on top left to a non-Eulerian digon (2,3,2) having 1 hole (on top right) to a non-Eulerian monogon (1,3,1) having 2 holes (bottom of the triangle). The latter two satisfy the equation V−E+F=1−g. The lines connecting the structures show how the transformation can be produced by gradually joining two adjacent vertices to make in internal hole within the structure. Similarly, in the illustration 20 shown below, a continuum is shown for a 3-dimensional structure. (4,6,4) is a tetrahedron (4 vertices, 6 edges, 4 faces) which loses one vertex by pinching 2 adjacent vertices together to make the structure (3,6,4) as shown. The number of edges and faces remain unchanged. The result is a non-Eulerian structure satisfying the relation V−E+F=2−g. Every Eulerian polygon and Eulerian polyhedron can be similarly morphed into their corresponding non-Eulerian structures by this technique. The genetic code of all these structures can be specified by the E,V,F,C co-ordinates.

Gene1 serves the function of identifying the number of topological elements in any form, structure, pattern, configuration or design. The activation of this gene sets the basic topological parameters, the number of elements, to be transformed to generate a related form. This can be done by changing the numbers, or by systematically navigating through the morph-space to find search and find new topologies.

Gene2

(FIGS. 8 and 9) DimensionD1-D3, VectorV5-V7

Gene2 specifies the fundamental regular topologies permissible by a well-known equation called the Euler-Schlafli equation that relates the number of elements (number of vertices, edges, faces and cells) within a space structure. Since Gene1 contains all numbers of all elements, Gene2 must be embedded in Gene1, though this remains to be demonstrated clearly. Nonetheless, it is expedient to specify the regular topological structures by new vectors that map this gene. These vectors are defined by the Schlafli symbol (p, q, r, s . . . v, w) for a regular space structure. This symbol is the vertex symbol of a regular structure having regular vertices (all identical vertices), regular faces (polygons having equal edges and equal angles), regular cells (regular polyhedra) and regular higher-dimensional cells (polytopes) that meet identically around each element. In Euclidean space, the polygons are flat. In non-Euclidean spaces e.g. spherical or hyperbolic space, the edges and polygons are curved in a variety of ways and include the following: curved faces with straight edges, curved faces with curved edges, flat faces with curved edges.

The symbol 'p' represents the number of sides of a polygon. It is any integer from 1 thru infinity (circle) and is represented as DimensionD1 (Vector V5) in the morpho-genomic space of Gene2. This vector is divided into unit increments, p=1, 2, 3, 4, 5, 6, 7 . . . . Fractional values of p are possible.

The symbol 'q' represents the number of polygons 'p' that meet at every vertex of a structure (p,q). 'q' is also any integer from 1 through infinity. It is represented as DimensionD2 (VectorV6) in the morpho-genomic space of Gene2. This vector, at right angles to Dimension1, is also divided into unit increments, q=1, 2, 3, 4, 5, 6, 7, 8 . . . . Fractional values of q are possible.

The morpho-genomic space (p,q) is an infinite square lattice, with each vertex on the lattice representing a distinct topological surface structure (p,q) and includes convex polyhedra, plane Euclidean and plane hyperbolic tesselations. For example, (4,3) represents a cube having 4-sided polygons (p=4) with three squares meeting at every vertex (q=3); (5,3) represents the pentagonal dodecahedron with three pentagons meeting at every vertex; (6,3) represents a hexagonal tessellation composed of hexagons (p=6) three of which meet at every vertex (q=3); (3,∞) represents infinite triangles meeting at a vertex as in the known hyperbolic tessellation; (5,4) represents another hyperbolic tessellation composed of four pentagons at every vertex; (1,7) is a rosette with seven monogons meeting at a vertex; (2,10) is a digonal polyhedron composed of ten digons meeting at a vertex, and so on for all combinations of two integers.

The symbol 'r' represents the number of cells (p,q) around an edge of a structure (p,q,r). 'r' is also any integer from 1 thru infinity. It is represented as DimensionD3 (VectorV7) in the morph-genomic space of Gene2 and its vector is divided into unit increments, r=1, 2, 3, 4, 5 . . . . Fractional values of r are possible.

The morpho-genomic space (p,q,r) of Gene2 is an infinite cubic lattice, with each vertex of the lattice representing a distinct topological structure (p,q,r) and includes 4-dimensional polytopes in Euclidean and hyperbolic space. For example, (4,3,3) represents a 4-dimensional cube composed of cubes (4,3) three of which meet at every edge (r=3); (3,3,3) is a 4 dimensional tetrahedron, (5,3,3) is the 120-cell, (4,3,4) is the cubic lattice or honeycomb, (5,3,4) is the hyperbolic polytope with four dodecahedra meeting at every edge.

FIG. 8 shows the (p,q,r) space of Gene2. Illustration 21 shows the generating vector star of this space with the vectors p (VectorV5), q (VectorV6) and r (VectorV7) divided into integer increments. The remaining vectors (shown in dotted lines) suggest the extension of the space to higher-dimensional structures. Illustration 22 shows some examples of structures that inhabit this space. The vector p comprises all regular polygons arranged along this horizontal vector and illustrated with a triangle (3), square (4) and a pentagon (5). Adding the vector q to the triangle (3) changes it to a trigonal dihedron (3,2), and then to a tetrahedron (3,3); adding a vector q changes this to the polytopes (3,3,2) and (3,3,3). Similarly, the square (4) morphs to the cube (4,3) by moving along direction q. and to the 4-dimensional cube (4,3,3) by moving along direction r. Bulk of this space is filled with hyperbolic tilings and hyperbolic space-fillings.

FIG. 9 shows an example of a portion of morpho-space where the integer values of the (p,q,r) space can have fractional number values and can be extended to real number values. The example shows fractional values of p between 3 and 4. The Cartesian co-ordinates of this space are in rational numbers as shown in FIG. 4. The intermediates are all fractional polygons in between the triangle and the square. For example, the fraction 7/2 (=3.5), based on the heptagon, is located half-way between co-ordinates 3 and 4, the fraction 10/3 (=3.333 . . . ) is located one-third of the distance between 3 and 4, and so on. This example is illustrative and suggests the possibility for q and r to have integer values as well.

The entire morpho-space of Gene2 can be extended to 5-dimensional polytopes (p,q,r,s) and to higher n-dimensional structures. In general, the entire morpho-genomic space becomes an (n–1)-dimensional hyper-cubic lattice as the periodic table of all regular n-dimensional polytopes. For the purposes of illustration, only (p,q,r) structures are used here for Gene2 of the morphological genome.

Gene2 identifies the regular topologies available as a starting point of designing more complex structures for design applications including architectural spaces, structures and miscellaneous objects. They also provide the starting point of modeling structures found in nature in physics, chemistry, biology and other sciences. These topologies could translate into symmetrical structures as the default case, or asymmetrical structures with the action of other genes on these topologies.

Gene3

(FIGS. 10-13) DimensionsD1-D9, VectorsV8-V16

Gene3 specifies a shape based on number of sides and angles between the sides.

Examples are illustrated with polygon having p sides, where p is any integer, in terms of the sequence of angles at the vertices of the polygon. The polygon can be symmetric or asymmetric, convex or concave, or have its edges crossing over other edges. The polygon could also represent a cross-section through a 3-dimensional structure with the angles defining the dihedral angles.

The angles at the vertices of a polygon are specified by a sequence of numbers termed 'angle-numbers', a1, a2, a3, a4, a5, a6 . . . $a_p$, where a1 is the angle at vertex1, a2 is the angle at vertex2, . . . and $a_p$ is the angle at the pth vertex. The sequence begins at one vertex (marked with a dot) and goes in a clockwise manner through all the vertices. The simplest cases are when the angle-numbers are integers, say, 1, 2, 3, 4, 5 . . . etc. Though the angle-numbers can be any real number (having any non-integer values), the examples shown here are based on integer angle-numbers.

The angle number is an integer multiple of the central angle-C of a 2n-sided regular polygon where $C=180°/n$. n is the number of directions (dimensions) the p sides of the polygon are parallel to. For example, a square (p=4) has four sides which are parallel to two directions and hence n=2; a regular triangle (p=3) has 3 sides parallel to 3 directions, hence n=3. In general, for all polygons having even number of sides, n=p/2, and for all odd-sided polygons, n=p.

For p=6, n=3, and C=60°; therefore, angle-number 1 equals 60°, angle-number 2 equals 120°. For p=7, n=7, and $C=180/7=25.714285°$ which equals angle-number 1. This angle is the $1/7^{th}$ portion of the vector-star 25 in FIG. 10; it has 7 equal directions emanating from a point. Angle number 2, indicated by a number 2 inside the angle in illustration 26 is twice that and equals 51.428571°, angle number 3 in 27 is three times that and equals 77.142857°, angle number 4 in 28 equals 102.857142°, and so on.

Illustration 24 in FIG. 10 shows the generating vectors of the morpho-genomic space of Gene3. This space is an infinite hyper-cubic lattice. In this illustration, 9 vectors labeled a1 thru a9 are shown. Each vector is calibrated in integers. Each vector represents all the values of all angle-numbers for each different vertex of a polygon. These vectors are the generators of all polygons up to 9 sides. More vectors are needed for polygons with more sides and the restriction to 9 sides is for illustrative purposes only.

A few examples of triangles, having angle numbers a1, a2, a3 as indicated in 29 are shown in 22-25 to show how the system works. For a triangle, any three integers specify a distinct triangle; the sequence of numbers begins with the vertex marked with a black dot. 30 is a triangle (1,2,3) with angle-numbers 1, 2 and 3. The sum of angle-numbers equal 6, thus n=6 and C=30°. Therefore, (1,2,3) represents a triangle with angles 30°, 60° and 90°. Similarly, triangles (1,1,4) in 31 and (2,2,2) in 32 also represent triangles with angle-number sum equaling 6 or for n=6. Their respective angles are 30°, 30° and 120° for triangle (1,1,2) and 60°, 60° and 60° for triangle (2,2,2). To take another example, a 3-digit number like (7,1,8) in 33 represents a triangle with 78.75°, 11.25° and 90° based on n=16. Similarly, there exists a triangle for any 3-digit number with the rule that the sum of all three angle numbers equals n.

The morpho-genomic space for all angle-number based triangles is an infinite cubic lattice 34 in FIG. 11, where the three Cartesian co-ordinates of any point specifies a distinct triangle. The space has three generating vectors, a1, a2 and a3 shown in 35. It is defined by DimensionD1, DimensionD2 and DimensionD3, and where each dimension is calibrated in unit increments 1, 2, 3, 4, 5, . . . , and where D1 represents the angle-number a1 at vertex1, D2 represents the angle-number a2 at vertex2, and D3 represents the angle-number a3 at vertex3 of the triangle.

The triangles are the building blocks of all polygons with more than three sides. These require more dimensions in the morpho-space, with a new dimension added for each new vertex. Thus DimensionD4 (VectorV11) represents angle-numbers at vertex 4 of 4-sided polygons, DimensionD5 (VectorV12) for angle-numbers at vertex5 of 5-sided polygons, DimensionD6 (VectorV13) for 6-sided polygons, and so on, all the way to p with infinity as the upper limit. For illustrating the morpho-genomic code, the extent of Gene3 is restricted to a9 (VectorV16), representing all polygons up to nonagons.

The rule for constructing convex and non-convex polygons without self-intersections is to guarantee that the sum of angle-numbers $S_a$, termed angle-sum here, equals (n)(p−2), where n within the first bracket equals the angle sum of a triangle and the term (p−2) represents the number of triangles in the polygon. For example, for a square (p=4, n=2), the angle-sum equals 2n. Several examples are shown in FIG. 12. For the regular pentagon 36 (p=5,n=5), the angle-sum equals 3n or 15. This is coded as (3,3,3,3,3) in the morpho-space. The non-convex pentagon 37 (p=5, n=5) also has the angle sum equal to 15 and is coded as (3,3,1,7,1). The convex non-regular hexagon 38 (based on p=10, n=5) has the angle sum 4n or 20 and is encoded by the co-ordinates (3,4,3,3,4,3). The decagons 39, 40 and 41 (all p=10, n=5) have the angle sum 8n or 40 and are encoded respectively as (4,4,4,4,4,4,4,4,4,4), (4,3,6,3,3,6,3,4,4,4) and (6,2,6,1,7,2,7,1,6,2). The decagon 41 can be tiled as shown in 45; note that a new polygon 46 is also a decagon with angle-number sequence (4,2,2,3,6,3,4,4, 2,4,8)—starting counter-clockwise from the vertex marked with a dot—and angle sum 40. This generates an interesting periodic tiling of two types of decagons.

FIG. 12 also shows 3 different polygons with self-intersections, namely, 42, 43 and 44. The regular pentagonal star 42 (p=5,n=5) has the genomic code (1,1,1,1,1) and the non-regular pentagonal star 43 (p=5,n=9) has the code (2,1,1,2,3). The decagon 44 has the code (3,2,6,1,7,2,7,9,7,6). Larger number sequences, obtained from higher values of p and n, will lead to an infinite family of such polygons. Since each of these polygons are represented by digits, the angle-number concept provides a graphic visualization of any number sequence or any length.

FIG. 13 shows the application of Gene3 in generating sequences of edge segments that bend at 90 and 270° degrees having corresponding angle numbers 2 and 6 obtained from n=4 case in Gene2; angle number 4, which equals 180°, is a straight line which is topologically insignificant and hence eliminated from this example. The sequence of generation is shown in the pattern-generating tree 47, a special network from the expanding higher-dimensional morpho-space which grows as each new edge segment (new angle number in the sequence) is added to an existing one. The morph-code is indicated in two sets of co-ordinates, the one on the first bracket from Gene2 and the other in the second bracket from Gene3 giving the angle-number sequences. The general morph-code for such line segments if (n)(a1,a2,a3,a4, . . . ) and is shown in 48. In 47 the starting edge configuration on the left has the angle-number 2 with the morph-code (4)(2); the fixed reference point is indicated by a black dot in each configuration that follows. The second column has two possible configurations (2,6) and (2,2). In the third column, (2,6) branches to (2,6,6) and (2,6,2), and (2,2) branches to (2,2,6) and (2,2,2); the latter is a closed square and the branch of the tree ends here. As the tree is extended such closed configurations stop the growth of that branch, thereby making the tree more and more asymmetric as it grows. This example is illustrative and a different selection from Gene2 will yield different types of edge configuration sequences, in 2d and 3d. Similar pattern-trees are possible with faces and cells.

The angle number sequences specified by Gene3 provide a neat way to model complex linear compositions and configurations. These could also represent diagrams of paths between points, network diagrams, and relationship diagrams as well. The angle number sequences could also serve as a numeric key for a graphic code, and vice versa, and used with decoders, scanners, and other electronic devices for decoding and encoding between numbers and graphics. This makes it useful for application to encryption. It also provides a graphic alternative to the bar-code system.

Gene4

(FIGS. 14,15) DimensionsD1-D6, VectorsV17-V22

Gene4 deals with the number of regular subdivisions of the primary topologies specified by Gene2. The edges of primary structures determined by Gene2 are subdivided in equal increments and new edges added by joining corresponding points on primary edges such that they are parallel to the directions of sides of the primary structure. Such subdivisions lead to regular grids and describe the extent of the space. This morph-gene specifies the number of subdivisions along the primary edges. Non-regular grids, with unequal subdivisions of the edges, are specified by a different morph gene. The number of subdivisions are discrete and in integers. In some instances like the square (4), square tiling (4,4), the cube (4,3) and the hyper-cube (4,3,3) to take one family of related forms, this subdivision can increase continuously and specified in real numbers. This requires the action of Gene2, and the next gene, Gene5.

FIG. 14 shows the vector star 49 as the generator of the morpho-space of Gene4. The vectors are specified by variables f1,f2,f3,f4,f5,f6 . . . , where f1 (DimensionD1, VectorV17) represents the frequency (extent or number) of subdivision of edge1 of the primary structure, f2 (DimensionD2, VectorV18) is the frequency along edge2, f3 (DimensionD3, VectorV19) along edge3, and so on. For the purposes of illustration, Gene4 is restricted to six generating vectors f1-f6 (DimensionsD1-D6, VectorsV17-V22). Assorted examples are shown in 50-58; in each example the origin is indicated by a black dot.

Example 50 is a square (4) translated along edge1 for 5 units and is specified by 5 intervals along vector f1, i.e. f1=5. The morph-code for this linear array of squares in (4)(5), where the first bracket indicates the primary structure specified by Gene2, and the second bracket indicates the extent of its subdivision. 51 is a 5 by 3 (f1=5, f2=3) rectangular grid and its code is (4)(5,3). 52 is a cubic array with the extent 5 by 2 by 3 (f1=5, f2=2, f3=3) in which the cube (4,3) is translated along the three directions of its edges; its code is (4,3)(5,2,3). 53 is a hypercube (4,3,3) which is translated along one of its four directions by 3 units (f1=3); its code is (4,3,3)(3).

Examples 54-57 show regular skewed subdivisions which retain the symmetry of the primary structure. 54 is a triangular array based on the subdivision of the triangle (3) and the highlighted skewed triangle is obtained by traversing 1 unit (f1=1) along one direction of the triangle, followed by traversing 3 units (f2=3) along a second direction of the triangle. By joining corresponding points located symmetrically on the triangular grid, the highlighted triangle is obtained. It has a skewed triangular grid on its surface, and its morph-code is (3)(1,3). 55 is a similar idea applied to a pentagon (5). Its edges are subdivided into 4 units, from each new point emanate new grid lines that are parallel to the edges of the pentagon. The skewed subdivision of the highlighted pentagon is obtained by traversing 3 units (f1=3) along one edge of the pentagon followed by 1 unit (f2=1) parallel to adjacent edge of the pentagon, and joining the five corresponding points on the edges. Its morph code is (5)(3,1). 56 is a similar idea applied to a 3-dimensional structure, a cube (4,3), by traversing along the x-y-z axis in unequal units, 3 units along x-axis (f1=1), 2 units along y-axis (f2=2), and 1 unit along the z-axis (f3=1). Its morph-code is (4,3)(3,2,1). 57 is an alternative 3-dimensional structure, a regular icosahedron (3,5), with a skewed triangle grid 54 on one of its faces. When all the faces of the icosahedron are similarly subdivided, a skewed surface subdivision is obtained. Its morph-code is (3,5)(3,1).

Example 58 is an asymmetric skewed subdivision based on a square grid, and other examples can be similarly derived for other polygons and polyhedra. The general principle is that the traversals along the grid need not be in same increments from different vertices of a polygon or polyhedron. As an example, a skewed quadrilateral is shown. From the first vertex, marked with a black dot, the traversal equals 4 units (f1=4) along the horizontal axis followed by 1 unit (f2=1) along the y-axis. From the new vertex, the traversal equals 3 units (f3=3) along the y-axis followed by 1 unit along the x-axis in the negative direction. This generates two sides of a parallelogram, and the other two sides are obtained by symmetry. The resulting parallelogram has a skewed subdivision with a morph-code (4)(4,1,3,1). This code could be modified by inserting a semi-colon between the two different traversals since the usage of f3 here is different from the usage of f3 in example 56 where it represents the third direction rather than the extent along a different vertex.

FIG. 15 shows the 6-dimensional morpho-space 59 of Gene4 for a group of primary topologies, the square (4) and cube (4,3) specified by Gene2. The generating vector star 60 shows the six different vectors, the first three—f1, f2 and f3—representing the extent along the three different directions of the cube (4,3), and the remaining three vectors representing the 3 different directions of traversal from a vertex. The general morph-code for the entire family of forms generated by applying Gene4 to Gene2 is shown in 61. In 59, the co-ordinates of the examples illustrated are indicated in their compressed form. These examples include three different linear square arrays 11, 12, 13, a rectangular array 23, a configuration of cubes shaped as a rectangular block 232, a skewed parallelogram 2302 with a skew along one traversal, a skewed parallelogram 23023 with a skew along two directions, and the skewed cube 321321 illustrated earlier in FIG. 14. As one navigates from vertex to vertex through the morpho-space of Gene4, all different subdivisions are encountered. Note that this morpho-space emanates from locations (4) and (4,3) in FIG. 8. Similar spaces are possible from each vertex location in the (p,q,r) space of FIG. 8.

Gene4 is useful for subdividing a surface into arrays of polygons which provide a starting point for surface grids, e.g. spherical subdivisions for geodesic spheres, maps, etc. thereby providing a basis for increasingly faceting a surface. More facets lead to smother surfaces or larger architectural spans from small-sized parts. Gene4 is also useful for subdividing space into arrays of cells. This is useful as a starting point for designing spatial architectural layouts, spatial reference grids and 3-d compositions. When the subdivisions are continuous and can be described in real numbers as in the case of square, square tiling, cube, cubic lattice, hyper-cube and hyper-cubic lattice, they provide a way to morph a form continuously and adjust its size and proportions.

Gene5

(FIGS. 16, 17) DimensionsD1-D6, VectorsV23-V26

Gene6 specifies the various types of continuous changes in edges that lead to topological subdivisions as well as changes in size of any topological structure specified by Gene2. The subdivisions of polygons (p), polyhedra and tessellations (p,q), and polytopes (p,q,r) are embedded in this space. This gene leads to a family of less regular structures for each family of (p), (p,q) and (p,q,r) structures specified by Gene2. Within each family, the new generation of structures transform from one to another in a continuous manner. These subdivisions are obtained by placing a vertex in within the fundamental regions of primary structures in all available distinct positions. A triangular fundamental region having 3 faces has 8 possible distinct locations, 3 at the vertices (one for each vertex), 3 at the edges, one within the triangular face and one at none of these. The general number of subdivisions equal $2^F$, where F is the number of faces of the fundamental region. 2-faced fundamental regions (F=2) cover all polygons and its relatives, 3-faced fundamental regions cover all polyhedra, plane and hyperbolic tessellations, 4-faced fundamental regions cover all 4-dimensional polytopes, 5-faced fundamental regions cover all 5-dimensional polytopes and multi-layered prisms in Euclidean and hyperbolic space, 6-sided fundamental regions cover all 6-dimensional polytopes and all subdivisions of multi-layered tilings from cubic or rectangular parallelepiped cells, and so on.

As examples, some subdivisions of the cubic packing (4,3,4), polyhedra (p,q) and the polytope (3,2,2) are illustrated. These subdivisions extend to all structures specified by Gene2 and lead to new surface geometries. Though this morph-gene is restricted to transformations on regular structures, the procedure is a general topological procedure and applies to topological structures obtained from Gene1 and irregular topologies specified by a different part of the genome.

The generating vectors of the morpho-space of Gene5 is specified by the number of edges e1, e2, e3, e4, e5, e6 ... within the fundamental region of the structure (p,q,r). These define the generating vector star 62 in FIG. 16. The different edges indicate different directions emanating from a general vertex location in the interior space of the fundamental region. Each edge defines a structure that is represented by a different co-ordinate in higher-dimensional space, and all combinations of these edges (hence, co-ordinates) produce all the structures within the family. For the purposes of demonstrating the morph-genome, Gene5 is restricted to four edges as follows: e1 (DimensionD1) along VectorV23, e2 (DimensionD2) along VectorV24, e3 (DimensionD3) along VectorV25, and e4 (DimensionD4, VectorV26). The directions of these edges are perpendicular to faces of the tetrahedral fundamental region of (p,q,r); additional directions can be added by making new edges parallel to the edges of the fundamental region.

The morpho-space of these four edges is a 4-dimensional cube. Their 4-dimensional co-ordinates are: e1 (1,0,0,0), e2 (0,1,0,0), e3 (0,0,1,0) and e4 (0,0,0,1). The edges can morph in continuous states from 0 thru 1 by shrinking to 0 (a point) and enlarging to unit length 1. The edges can be extended in unit increments (1,2,3,4,5,6 ... ), where the spaces between successive integers can be a continuum as well the way they are between 0 and 1. The edges can be represented by 6-dimensional co-ordinates in any real numbers. This enables a change in size of the structure from small to infinitely large, though in practice the size limit will be constrained by physical considerations. The operating of scaling is embedded here, and is when all edges of a structure change their lengths equally. This scaling falls along the paths that specify the edge-combinations. For structures with one type of edge, say, e1, the scaling is along e1 vector of the morpho-space. For structures with two types of edges, the scaling is along the face diagonal of the morpho-space. For structures with three types of edges, scaling is along the diagonal of the cube, and for structures with four types of edges, the scaling is along the cell-diagonal of the hyper-cube.

In FIG. 16, the tetrahedral fundamental region 63 shows four edges e1, e2, e3, and e4 emanating from a common point. 64 is a portion of a cubic space-filling structure obtained by mirroring the fundamental regions along with all the four edges within it. Its code is (4,3,4)(1,1,1,1), where (4,3,4) is a symbol for the cubic space-filling, also called cubic lattice, or cubic honeycomb, and (1,1,1,1) is its subdivision using all four edges. 65, 66 and 67 are topology-preserving transformations where the four co-ordinates are altered but retain non-integer values. In 65, e4 is halved; in 66, three of the edges, e1, e3 and e4, take different real number values as indicated in their code. In 67, the same structure has stretched in two different directions by elongating e2 and e4 to 4 units and 2 units, respectively.

FIG. 17 shows some examples of subdivisions of surfaces of structures (p,q). The morpho-space 71 is a portion of an infinite square lattice inhabited by the family of surfaces with the genetic code (p,q)(0,e2,e3) in 73. This family is obtained by the combination of edges e2 and e3; edge e1 is absent as indicated by a 0 in the code. The generating star 72 shows the four vectors p, q, e2 and e3, and the morpho-space 71 shows the structures lying on the pq-plane. The specific morph-code for each structure is shown with values of p and q ranging from 2 thru 6. This includes the familiar semi-regular polyhedra like the truncated tetrahedron (3,3)(0,1,1), truncated octahedron (4,3)(0,1,1), truncated icosahedron (5,3)(0,1,1), hexagonal tessellation (6,3)(0,11), continuing to the truncated heptagonal tessellation (7,3)(0,1,1) in hyperbolic space, to name a few in the q=3 row. The general symbol for these surfaces is given by Schlafli symbol $p.q^2$ which describes the polygons around a vertex. In this family, each vertex has one p-sided polygon and two q-sided polygons meeting. Changing the edge combinations leads to matrices of other families, e.g. (p,q)(1,1,1), or (p,q)(1,0,1), etc.

One can traverse the morpho-space through continually transforming matrices of structures as one moves from family to family by altering their morph-codes.

FIG. 18 shows a family of subdivisions for the structure (3,2,2) as a special case of the infinite class of structures (p,2,2). It has curved edges e1, e2, e3 and e4, with each edge generating the four structures 74-77, respectively. All combinations of these four edges lead to a family of 16 structures arranged on the vertices of a 4-dimensional cube as shown in 78. The morph codes for each structure and the edge combinations are given alongside. The structures can morph continuously from one to another within this 4-cubic morpho-space. Similar families can be generated with different values of p,q and r in a larger morpho-space.

Gene5 is useful for faceting 2-dimensional surfaces and 3-dimensional space-fillings. This leads to an increasing variety of surface patterns and spatial configurations which could be useful by themselves or could serve as a starting point for generating more complex designs. Continuous transformations between these subdivisions lead to continually morphing designs in 2d and 3d; these change from one to another in a continuous manner. These morphing designs provide the starting point for deployable structures as architectural constructions and kinetic structures in nature. When combined with Gene4, a much greater variety of such structures, both static and dynamic is possible.

Gene6

(FIGS. 19, 20) Dimensions D1-D6, Vectors V27-V32

Gene6 specifies rotary transformations. All topological structures specified by Gene2 and Gene5 can undergo rotary transformations, where the faces rotate with respect to their neighbors, leading to left-handed and right-handed rotational forms for each (p,q) and (p,q,r) structure. This includes the known cases of snub polyhedra, prisms, and tessellations, and extends to snub space-fillings in Euclidean and hyperbolic space. This gene should also apply to topological structures obtained from Gene1.

FIG. 19 shows the generating vector-star 81 for Gene6. It is specified by angles A1, A2, A3, A4, A5 ... representing angles of cyclic rotation of corresponding edges e1, e2, e3, e4, e5, ... at the vertex of a topological structure (p,q) or (p,q,r). A1 is represented by DimensionD1 (VectorV27), A2 by DimensionD2 (VectorV28), and so on. For regular and semi-regular structures, these angles result in a change in the face angles within the fundamental region. For structures exhibiting other symmetries, these are the face angles within the unit cell.

Two different vertex conditions are shown in 82 and 84. 82 shows the generalized vertex (indicated by a black dot) of the structure (p,q)(1,1,1) specified by Gene2 and Gene5. It has three edges, e1, e2 and e3, which define three face angles: A1 between e1 and e2, A2 between e1 and e3, and A3 between e2 and e3. Altering angles A1, A2 and A3 in any combination in a cyclic manner (left-handed or right-handed) leads to rotary transformations. The genetic code of the resulting family of forms is shown in 83 and requires three different genes, G2, G5 and G6. 82 shows a generalized vertex of a structure (p,q,r)(1,1,1,1), also specified by Gene2 and Gene5. It has four edges, e1, e2, e3 and e4, which define six different face angles: A1, A2 and A3 as in 82, and A4 between e1 and e4, A5 between e2 and e4, and A6 between e3 and e4. This angle configuration corresponds to the vertex condition of the (4,3, 4) structure 64 in FIG. 16 to take one example. Altering any combination of the six angles and applying this angle transformation to all vertices of the structure in a cyclic manner leads to rotational polyhedral packing. The genetic code of the resulting rotational forms is shown in 84.

One example of a rotary transformation of the semi-regular tessellation (4,4)(1,1,1) is shown in four stages in 86-89 by altering only one angle A1. The angle 135 degrees at the vertex indicated by a black dot in 86, reduces to 105 degrees in 87, to 60 degrees in 88, and to 45 degrees in 89. The rotation could continue till the angle becomes 0 degrees. Similar transformations could be applied to any (1,1,1) structure from the family (p,q) and (1,1,1,1) structure from the family (p,q,r). The transformations apply to other topologies obtained from Gene5. All these transformations are continuous transformations and can go from left-handed rotation to right-handed rotation.

The morpho-genomic space of rotary transformations is a 3-dimensional cubic space for a (p,q)(1,1,1) structure, and 6-dimensional hyper-cubic space for a (p,q,r)(1,1,1,1) structure. The dimension of the morph-genomic space is n(n−1)/1, where n is the number of different angles at the vertex of a structure. This space captures all the rotary transformations in a continuum. One example is shown for a plane tiling and extends to all other tilings, polyhedra and space-fillings. FIG. 20 shows the outer surface of the cubic morpho-space for the tiling (4,4)(1,1,1). The vector star 91 indicates the three directions in which the three different angles are changing.

Gene6 is useful as a starting point for designing dynamic structures for architecture, sculpture, etc., both as surface structures and space-filling structures, and also as models for design in nature.

Gene7A-7D (FIGS. 21-25) Dimensions D1-D9 for Each Sub-Gene, Vectors V33-V68

Gene7 specifies addition-removal of topological elements, namely, vertices, edges, faces and cells. This gene depends on other genes like Gene1, Gene2, Gene4 and Gene5 which generate the topology. Gene7 uses the topologies established by other genes as a starting point and acts on that information. As in earlier genes, this is restricted to 3-dimensional structures for the purposes of demonstrating the morph genome. For higher-dimensional structures, hyper-cells will need to be added. This gene is composed of 4 sub-genes, named here Gene 7A, 7B, 7C and 7D, each gene specifying the elements of increasing dimensionality, G7A for vertices, G7B for edges, G7C for faces and G8D for cells. The morpho-space of each of the sub-genes is a hyper-cube, where the dimension of the hyper-cube equals the number of elements, namely, V for vertices, E for edges, F for faces and C for cells. Though each of these four morpho-spaces is distinct, they can morph from one to another in the same manner as the elements morph from one to another.

Figure 21:
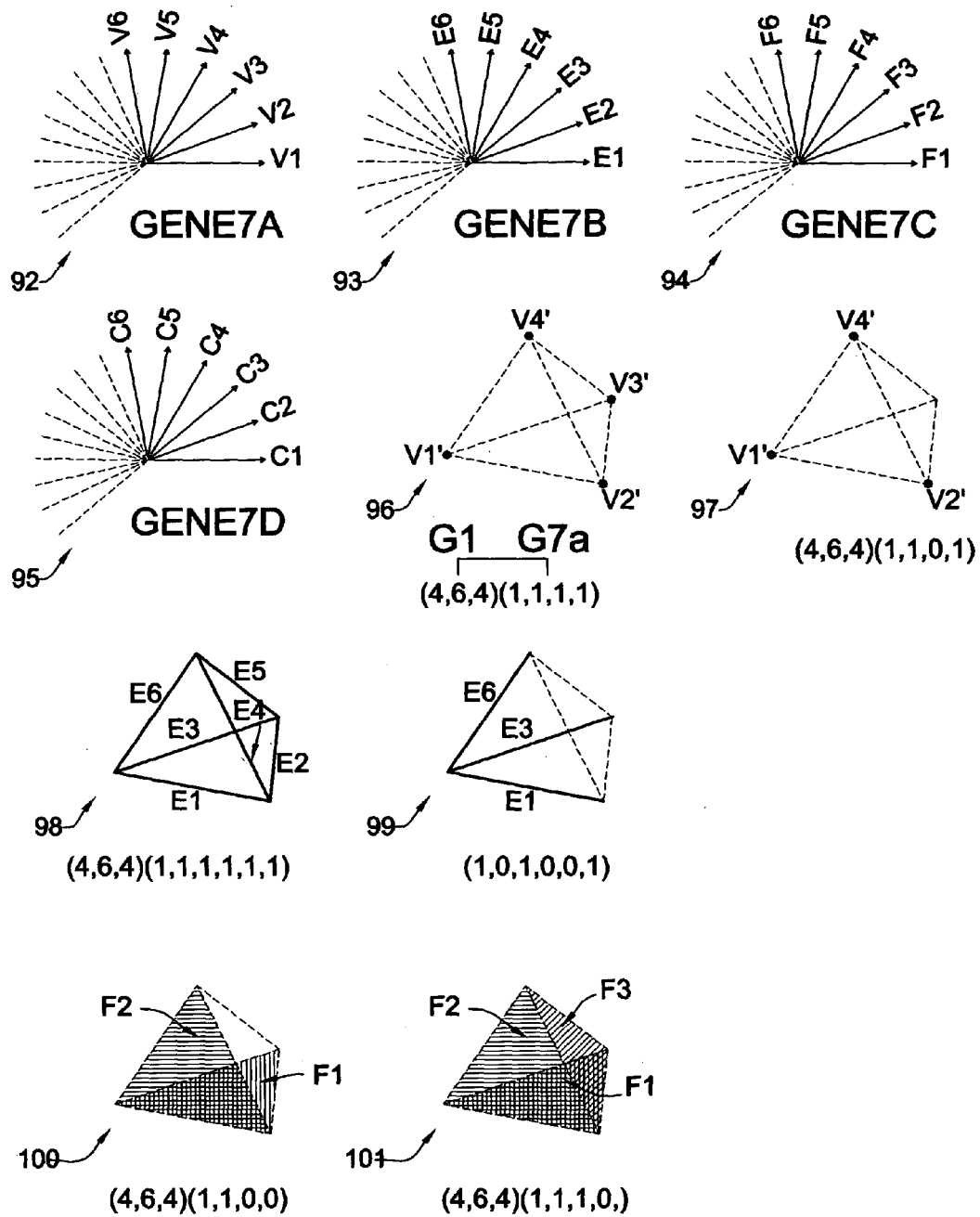
FIG. 21 shows the vector stars of Gene7A, Gene7B, Gene7C and Gene7D that encode the addition and removal of topological elements.

The four generating stars 92-95 in FIG. 21 are the generators of the morpho-space for the four sub-genes. Each different vector indicates the number vertices, edges, faces and cells in any given form or structure. 96-101 show simple examples of the application of this gene and can be applied to more complex forms and structures. These illustrative examples are based on the tetrahedron having 4 vertices, 6 edges and 4 faces and specified by Gene1 by its VEF co-ordinates (4,6,4).

96 shows an example of the activation of Gene7A (DimensionsD1-D9, VectorsV33-V41) with a configuration where all four vertices are present; its morph-code is (4,6,4)(1,1,1, 1). The general code for this class of configurations is (V,E, F)(V1,V2,V2, V4 ... ). In 97, one vertex is removed and the code changes to (4,6,4)(1,1,0,1). 98 shows the application of Gene7B with a configuration of 6 edges E1, E2, E3, E4, E5 and E6. Its code is (4,6,4)(1,1,1,1,1,1), and the general morph-code is (V,E,F)(E1,E2,E3,E4,E5 ... ). In 99, three edges are removed and the code changes to (4,6,4)(1,0,1,0,0, 1). In 100 and 101, Gene7C is activated and selected faces of the tetrahedron are expressed (added), the remaining ones being repressed (removed). In 100, faces F1 and F2 are expressed, and the morph-code (4,6,4)(1,1,0,0). In 101, face F3 is added and the code changes to (4,6,4)(1,1,1,0).

Figure 22:
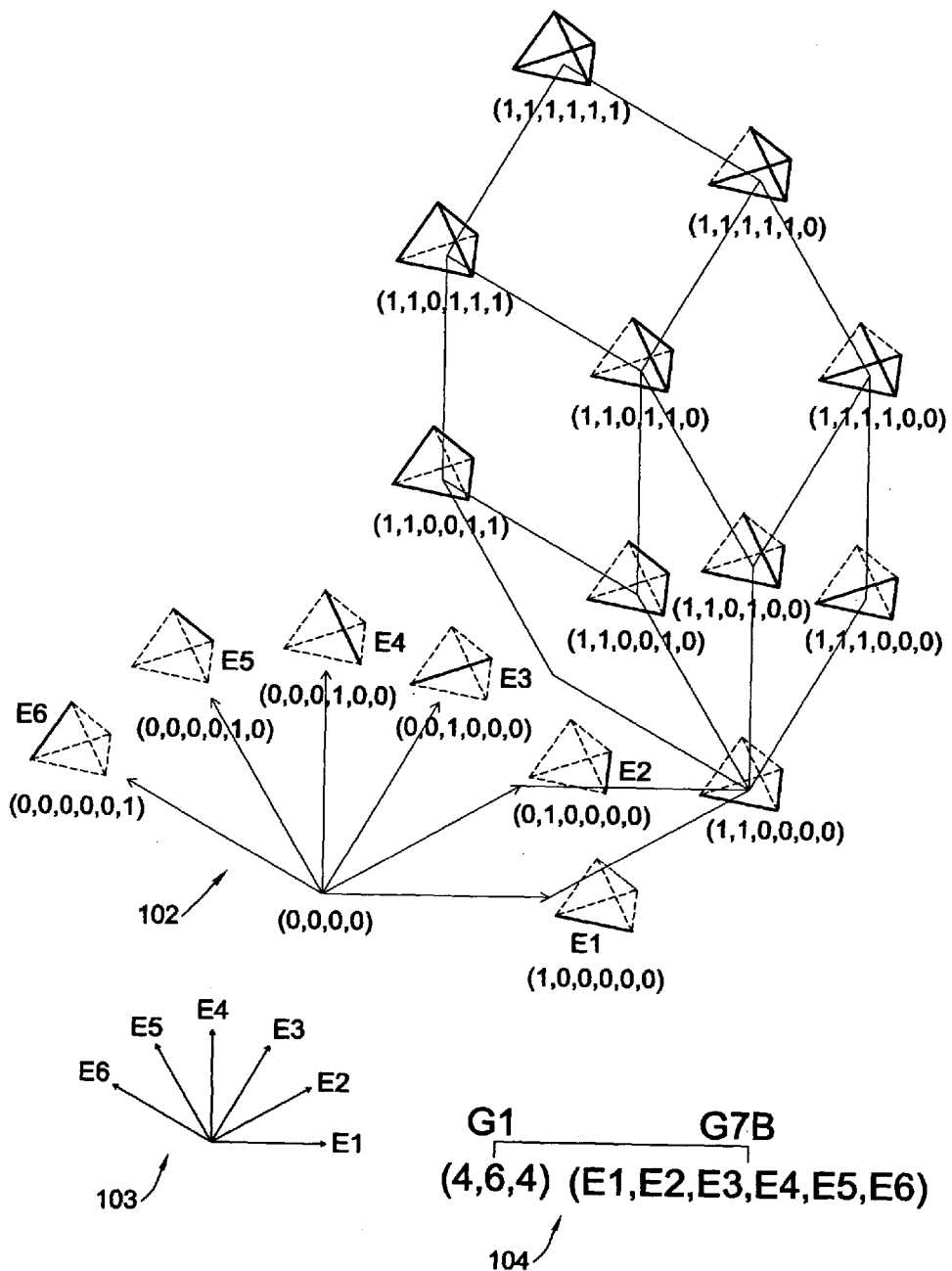
FIG. 22 shows the morpho-space of structures encoded by Gene7B with the example of a tetrahedron and addition-removal of edges.

FIG. 22 shows the morpho-genomic space 102 of Gene7B (DimensionsD1-D9, VectorsV42-V50) with the example of a tetrahedron which has 6 edges E1 thru E6 shown in the generating star 103. The resulting structures are identifies by their corresponding 6-dimensional codes as follows: E1 (1,0, 0,0,0,0), E2 (0,1,0,0,0,0), E3 (0,0,1,0,0,0), E4 (0,0,0,1,0,0), E5 (0,0,0,0,1,0) and E6 (0,0,0,0,0,1). The generic code is shown in 104.

Figure 23:
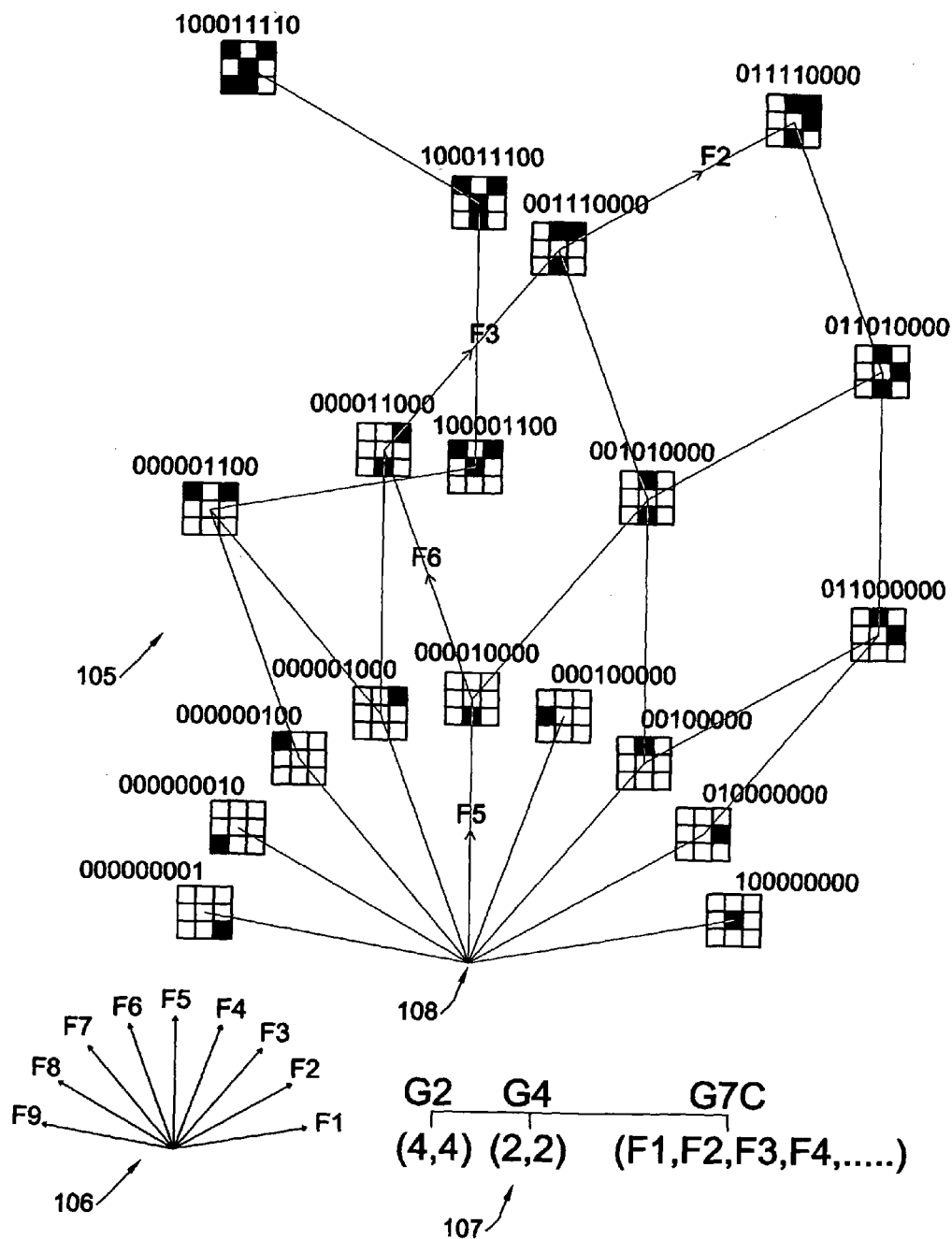
FIG. 23 shows the morpho-space of structures encoded by Gene7C with the example of a 9-square design and addition-removal of faces.

FIG. 23 shows the morpho-genomic space 105 of Gene 7C (DimensionsD1-D9, VectorsV51-V59) applied to a 9-square grid with the nine distinct square faces marked F1-F9. The square grid has the topology (4,4) from Gene2, and a frequency (2,2) from Gene4. In 105, each pattern with one distinct square acts as the independent generator of different compositions obtained by combining these nine different one-square patterns which act as generators. The vector directions of these 9 generators are identified by the vector-star 106 and the patterns themselves are shown in 105 emanating from the point of origin 108. Other patterns in 105 are derived from combinations of these patterns as we move through this space along the different directions. For example, starting from the origin 108 and moving along vector F5, we get the pattern one of the one-square pattern with the morph-code 000010000 (the compressed form of the code which, in Cartesian co-ordinates is (0,0,0,0,1,0,0,0,0)). Moving along direction F6 from this pattern we get the pattern with the code 000011000, then along direction F3 we get pattern with the code 001110000, then along F2 to pattern 011110000 on the upper right corner, and so on. The morph-code for this class of patterns, as shown in 107, is (4,4)(2,2)(F1,F2,F3,F4,F5, F6 . . . ), the generic code for this family of forms is (p,q,r) (f1,f2,f3)(F1,F2,F3 . . . ). Related structures can be obtained by altering the values of p,q,r,f1,f2,f3 and having a different number of faces.

FIG. 24 shows another application of Gene7C to 3-dimensional close-packing of polyhedral cells. These cell-packings, generated by Gene2 or Gene5, provide the starting point from which different classes of faces are removed systematically. The result is a packing of open cells with linked spaces. Some of these have continuous spaces, others have islands of closed cells within open spaces, some others are completely open like a network of edges without faces. A few examples are shown for polyhedral cells from the cubic space-filling (4,3, 4). 109 shows the polygons meeting at a typical vertex of the subdivision (1,1,1,1) obtained by the action of Gene5 on (4,3,4) as shown earlier in 64 (FIG. 16). Its six different faces are marked F1-F6 and its code from Gene7c is (1,1,1,1,1,1). The four close-packed cells resulting from this configuration are shown in 112 with its code (4,3,4)(1,1,1,1)(1,1,1,1,1,1). From 109, two faces F2 and F5 are removed in 110 leading to a configuration with the code (1,0,1,1,0,1). The four cells corresponding to this are shown in an exploded view in 113 with its code which has changed to (4,3,4)(1,1,1,1)(1,0,1,1, 0,1). 114 and 115 show two different polyhedral cells, each with faces F2 and F3 and corresponding to 69 and 70 in FIG. 16, and from which one type of face is removed. In 114, F3 is removed; and in 115, F2 is removed; their codes are shown alongside. In 116, a packing of open cells 115 is shown along with its code; it is derived by removing faces F2 and F5 from the original packing with the code (0,1,1,0,1,0). Cell configurations 113 and 116 are examples of space labyrinths which are interesting because, when continued to fill space, they divide the space into two distinct parts (spaces), one inside and the other outside. This method can be applied to other forms by altering the code within Gene2, Gene5 or Gene7C. The morpho-space of Gene7C is F-dimensional hyper-cube, where F is the number of faces being expressed (added) or repressed (removed).

FIG. 25 shows a family of labyrinth surfaces from structures (p,q,2) specified by Gene2. These surfaces are similar to the ones described in FIG. 24, but are finite and curved. 117-119 show the details of one structure 120 from the family in table of surfaces 121. From the six faces that meet at the vertex of (1,1,1,1) structure in this family, two edges, e1 and e4, are removed to get a family of (0,1,1,0) structures at Gene5 level. From these, two faces, F2 and F5, are removed to get the family of (1,0,1,1,0,1) structures at Gene7C level. Some of these structures are finite, some infinite in Euclidean 2-dimensional space, and others are in plane hyperbolic space.

In 117, the surfaces that are removed, namely, faces F2 and F5, are shown. In 118, the inner surfaces (faces F3) are shown and the removed faces F2 and F5 are indicated. In 119, the outer surface F4 is laid over the inner surface F3 to obtain a tubular surface module as shown. When these modules are put together over the entire structure, topologically uniform labyrinths having one type of vertex and one type of face, and having the same number of faces at every vertex, are obtained. For example, the module 119 defines one "vertex module" of the dodecahedral shell 120 in 121. The table 121 shows some of these surfaces with their Schlafli symbol which indicates the number of faces at a typical vertex. In the rows, from left to right, the numbers are in $4^{th}$ power of even numbers or 2p, namely, $2^4$, $4^4$, $6^4$, $8^4$, $10^4$, $12^4$ . . . . Along the columns, q increases, but the Schlafli symbols remain the same. For example, 120 is a (3,5,2) structure with four hexagons ($6^4$) at every vertex. Other tables like this one are obtained by changing the values of (p,q,r). The morpho-space of this family is a 13-dimensional space in which table 121 is one infinite plane.

The application of Gene7D (DimensionsD1-D9, VectorsV60-V68) to form-generation follows the same method as in FIGS. 23-25 by replacing the addition-removal of faces with that of 3-dimensional cells. Here the cells are added or removed from the initial set of cells, or built from zero to a target number of cells.

Gene7 is useful for generating architectural, spatial and visual compositions. For example, the 9-square grid designs, of FIG. 23 could be used as subdivision of the fundamental region which can then be repeated by the action of a separate gene. This will lead to plane-filling and space-filling designs of visual and spatial interest. The marking of faces in two colors, black and white as shown here, provides a basis for designs where there are two binary states for any square—two different colors, textures, materials, open or closed (as in windows in a wall), clear and opaque, moving and stationary, and so on. The designs in FIG. 23 and their 3-d counterparts also provide a basis of simple architectural layouts with interior and exterior spaces or space of two classes of functions, like primary and secondary spaces. The examples in FIG. 24 provide a systematic and exhaustive way to generate a wide variety of space structures which are not only interesting for architecture but also for designing new structures at the nanoscale. The space labyrinths provide alternatives to zeolites which are molecular sieves used for purification of matter (fluids, for example) at the molecular scale.

Gene8

(FIGS. 26-28) Dimensions D1-D9, Vectors V69-V77

Gene8 is the curvature gene and specifies the curvature of elements. The edges, faces and cells could be curved in various ways. As an illustration, some simple cases are shown by the application of this gene on Gene5. Clearly, there are infinite classes of plane and space curves, all of which need to be gene-coded. This makes this gene an expansive one, requiring the morph-coding of the universe of algebraic curves and their taxonomies. More complex cases will require more parameters, possibly in addition to the activation of other gene(s).

FIG. 26 shows the vector star 123 which generates the morpho-space of Gene8. It is defined by independent vectors c1, c2, c3, c4, . . . , each respectively corresponding to the edges e1, e2, e3, e4, . . . of a structure defined by Gene5 and extends to Gene4 and Gene6. c1 specifies the curved state of e1, c2 the curved state of e2, and so on. In addition, c1 exists in + and − states, + indicating a positive (convex) curvature and − a negative (concave) curvature. This change in curvature is a continuum along a vector direction and is indicated by a range from +c1 to −c1. c1 can be set to a precise parameter like a radius, the height of the curve or some other variable which defines the curve. As the curves become more complex, this involves more variables. In this case, the vector star c1 will branch into c1a, c1b, c2c, . . . where the suffixes a, b, c . . . define additional variables. The vector star 109 also shows the branching of the vectors into $c1_1$, $c1_2$, $c1_3$, . . . for vector c1, and similarly for the other vectors. This indicates that the curved edge c1 can exist in different distinct states $c1_1$, $c1_2$, $c1_3$ and represented by the combined symbol $+-c1_{1,2,3}$. These states are defined by the number of planes meeting at edge e1, each digit representing a different plane. $c1_1$ means that curved edge c1 has curved along one plane (F1), $c1_2$ indicates a curving along a second plane (F2), and so on. $c1_{1,2,3}$ means that there are three planes meeting at curved edge c1 (F1, F2, F3); +−c1$_{1,2,3}$ means that edge c1 can be curved positively or negatively along any one of the three planes.

The number of curved states of a structure obtained this way equals E×3$^{Fe}$ where E is the total number of edges in a structure and Fe is the number of faces meeting at the edge (assuming it is same for each edge). For each edge, this leads to a $F_e$-dimensional cubic morpho-space with each edge occurring in 3 states and curving only in, out, or remaining flat along each plane. In general, for f states, the hypercubic morpho-space has a frequency f, where each edge of the hypercube is subdivided f times.

Polygons 124-129 in FIG. 26 show 6 different pentagons with edges curved in a variety of ways by activating Gene8 on Gene2. The edges e1 thru e5, defined by Gene5, are curved to states c1, c2, c3, c4 and c5, each in a plus or minus state. Each edge is restricted to remain in the vertical plane as it curves up or down. 124 shows the flat pentagon with edges which are straight, the zero state of Gene8. Accordingly, they are numbered c1 thru c5 and their Gene8 code is (0,0,0,0,0). In 125, all edges are in their plus states and the code changes to (1,1,1,1,1). In 126, edge c1 is flat, edges c2 and c4 are positively curved, and edges c3 and c5 are negatively curved leading to a code (−1,1,−1,1,0). 127-129 show a progression of curved edges which increase their curvature continuously. For the purposes of illustration, the height parameter is used to calibrate this progression which ranges from 3. to 1 to 3.4 and is obtained by changing the value of c1 in the respective codes. The generic code for such surfaces is shown in 130. The morpho-space of all such curved polygons is a p-dimensional hyper-cubic lattice with the generators as shown in 123, and where the vectors are calibrated in suitable parameters which range in a continuum of positive real numbers to negative real numbers along each vector across the point of origin. The morpho-space of all such pentagons is a 5-cubic lattice continuum with a frequency 3.

FIG. 27 shows several additional examples of curved forms obtained when Gene8 is active. 131 is a different type of a curved polygon, a pentagon with straight edges e1, e2', e3', e4 and e5, vertices v1, v2, v3', v4 and v5, and a curved saddle-type face. It is obtained by lifting the vertex v3 from the flat position to v3'. Since any of the vertices can be lifted by any distance, five more co-ordinates are added to the code, one for the displacement of each vertex. In this example, the displacement is 0.7 for the purposes of illustration. In 132, the edges e2' and e3' are negatively curved and symbolized by new edges −c2 and −c3. This is reflected in the first five digits of the code. If the displacements have positive or negative real number values, the entire morpho-space of such structures is a 10-dimensional hyper-cube with frequency 3 where the structures can morph from one to another continuously.

Examples 133 and 134 show the application of Gene8 to a plane tiling. 133 shows three polygons from a tiling of octagons F2 and F3 and squares F1. It is generating by Gene2 and Gene5 and has the code (4,4)(1,1,1). Gene8 adds three more co-ordinates to this family of structures making the morpho-space 8-dimensional. The edges of 133 are in the zero-state, i.e. no curvature, and the three edges have the symbols c1, c2 and c3. In 134, the three edges are in their curved states. Edge c1 is concave towards face F2 and has the symbol −c1$_2$, edge c2 is convex around face F3 and has the symbol +c2$_3$, and edge c3 has no curvature. The Gene8 code for this tiling design is (−1,1,0), where the digit 1 represents the extent of the curvature defined by any convenient parameter that defines the curve. The generic code for this family of structures is shown in 135.

Example 136 shows the activation of Gene8 on the faces 109 of FIG. 24 of space-filling 112 in the same figure. This structure, with the code (4,3,4)(1,1,1,1) from Gene2 and Gene5, has four edges c1-c4, and six faces F1-F6, meeting at a representative vertex. In its curved state 136, edge c1 curves negatively into F2, edge c2 curves positively into F3, edge c3 curves negatively into F2, and edge c4 curves negatively into F5, leading to Gene8 code (−1,1,−1,−1). The generic code for this family of structures is shown in 137. It has a total of 11 co-ordinates. The morpho-space of this family is an 11-dimensional hyper-cubic space, where four of the dimensions have a frequency 3.

FIG. 28 shows a family of curved structures related to 136 in FIG. 27. 138 is a packing of curved polyhedra and prisms meeting at a typical vertex of a space-filling structure (4,3,4)(1,1,1,1) defined by Gene2 and Gene5. The rest of the structure can be visualized by repeating this condition at every vertex to fill space. Its complete morph code is (4,3,4)(1,1,1,1)(−1,1,−1,−1). 139 is obtained by changing the Gene5 code from (1,1,1,1) to (0,1,10) by losing two edges; its Gene8 code changes correspondingly from (−1,1,−1,−1) to (0,1,−1,0) by losing two edges. Once again, only two polyhedra are shown and these can be repeated to fill space. The structure 140 is obtained by removing the two complementary edges so that the Gene5 code becomes (1,0,0,1) and the Gene8 code changes to (−1.0.0.−1). The complete family is shown in 141, with the generating vector star 142 at the origin (0,0,0,0)(0,0,0,0) showing the four generator edges e1-e4 which curve to c1-c4 by applying Gene8. The sixteen combinations of these four edges generate the first 4 digits of the code, the second four digits are obtained by changing the straight edges to their curved states by adding converting the straight edges to 1 or −1. This example is representative and additional families of structures can be generated by changing the values of p,q,r.

Gene9, Gene10, Gene 11 are process genes and deal with sequences of operations or form-generating procedures that are applied to other genes. One example, in part, was covered in FIG. 13 by applying Gene3 in a sequential manner.

Gene9A-9D (FIGS. 29-30) DimensionsD1-D9 for each sub-gene, VectorsV75-110

Genes 9A, 9B, 9C and 9D specify the sequences of topological elements in configurations composed of these elements. These sequences imply a time element, or a succession of selection in the form-generating process. The elements are of increasing dimensions: points (vertices), edges, faces and cells. The sequences relate to elements in entire configurations or elements within an elementary unit of the configuration. When elementary units are used, as the "unit cell" in case of symmetry, or "fundamental region" in case of topology, or initial elements as in fractals or L-systems, the entire configurations are specified by rules acting on these units. These rules relate to symmetry, topology, self-similarity, recursion, substitution, or other rules for pattern-generation.

The sequences of elements are specified by any permutation of the basic topological elements. The vertices V1, V2, V3, V4, V5 ... Vn, edges E1, E2, E3, E4, E5, ... En, faces F1, F2, F3, F4, F5, ... Fn, and cells C1, C2, C3, C4, C5, ... Cn, can each be permuted within themselves and similar sequences can be specified for higher-dimensional cells. For the purposes of illustration, each sub-gene is restricted to a sequence of 9 elements (Dimensions D1-D9 for each, Vectors V75-V110 for all four sets of elements with 9 vectors for each as shown in Table 2).

The temporal sequence of these elements, for example, of the vertices is indicated by V1', V2', V3', V4', ... where V1' is the first vertex in the sequence selected from all vertices, V2' is the second vertex in the sequence, V3' the third, and so on. V1', V2' V3', V4', . . . define different vectors of the morpho-space of Gene9A. Each vector is calibrated in integers. For vector V1', V1 has the co-ordinates (1,0,0,0 . . . ), V2 has (2,0,0,0 . . . ), V3 has (3,0,0,0, . . . ), and so on. For vector V2', V1 has the co-ordinate (0,1,0,0 . . . ), V2 has the co-ordinate (0,2,0,0, . . . ), V3 has (0,3,0,0, . . . ), and so on. The generating vector-star is shown in 143 of FIG. 29.

144 shows the sequence of 4 vertices based on a square (4) specified by Gene2. It starts at V1 as indicated by a large dot, and moves thru V2, V3, ending at V4; the arrow indicates the direction of movement. Its code is (4)(1,2,3,4) since the first vertex along Vector V1' is V1 (the first co-ordinate in the code), the second along V2' is V2 (the second co-ordinate), the third along V3' is V3 (the third co-ordinate) and the fourth along V4' is V4 (the fourth co-ordinate). Similarly, the sequence of six points of the hexagon (6) are as shown, V3, V4, V1, V5, V2, V6 leading to the morph-code of this sequence (6)(3,4,1,5,2,6). The general morph-code for this family of vertex sequences is (p,q,r)(V1', V2', V3', V4', . . . ) shown in 147.

148 shows a portion of the morpho-space of a sequence of 4 elements with the code shown in its compressed form. These all possible permutations of 4 digits and represent all possible sequences of four elements. The generating star is shown in 149, and leads to a 4-cubic lattice with each permutation shown lying on a distinct vertex. The morpho-genomic space for permuted sequences of n elements is an n-dimensional hyper-cubic lattice.

FIG. 30 shows the generating stars for the morpho-spaces of Gene9B for edge sequences in 150, Gene9C for face sequences in 153, and Gene9D for cell sequences, in 156. The vector directions correspond to the ones in 143 (FIG. 29) for vertex sequences. An example is shown for each. 151 shows a sequence of five edges from a total of ten edges E1-E10 as marked. The selected sequence starts at E1 (indicated by a dot), moves to E2, E8, E4, and ends at E9. Its specific code is (5)(1,2,8,4,9) and its generic code is shown in 152. 154 shows a simple sequence through four faces F1-F4, starting with F1, thru F2, F3 and ending at F4. Its code is (4,4)(2,2)(1,2,3,4), where the first set of co-ordinates represents the square tiling from Gene2, the second set its frequency from Gene4, and the last set its sequence from Gene9C. 157 shows a cube (4,3) from Gene2, with a frequency of subdivision (2,2,2) from Gene4, and the sequence between its 8 cells C1-C8 indicated in 157. The sequence code is (1,6,7,3,4,3,1) based on the traversal sequence C1, C2, C6, C7,C3,C4,C2,C1. Other sequences of any of the elements can be derived by changing the sequence of numbers, e.g. by navigating through the morpho-space, or by changing the structure from which the edges are originally obtained. In addition, the elements could be combined to have composite sequences.

Gene9 is useful for generating or mapping temporal sequences of elements in growth processes, movement and dynamically changing formations. The vertex sequences mark the trace forms of human movement, i.e. the forms traced by the limbs of a moving body, and flow patterns in phenomena where there is movement (e,g, patterns of human movement in space, buildings) or transference of material or messages (codes, signals, chemicals) from element to element. Once a sequence code is identified, related sequences can be obtained by changing the sequence.

Gene10A,B (FIGS. 31-45) DimensionsD1-D9 for G10A, D1-D7 for G10B, VectorsV111-126

Gene10A,10B is a gene for recursion and space-filling. It specifies operations that enable morphological structures or their parts, as specified by other genes, to fill space. This space can be 1-dimensional lines, 2-dimensional tilings, or 3-dimensional space as in clusters, packings and space-filling surfaces, or higher-dimensional as needed. In addition this space can be Euclidean or non-Euclidean. Gene10A deals with symmetry operations like reflections and rotations and all its combinations. Some examples of self-similarity are built-in as a by-product of these operations. Gene10B enables the specification of fractals and recursive structures that involve substitution as in Lindenmeyer's grammars known as L-systems, and other types of iterative procedures like recursive truncations, recursive angular or linear growth.

Figure 31:
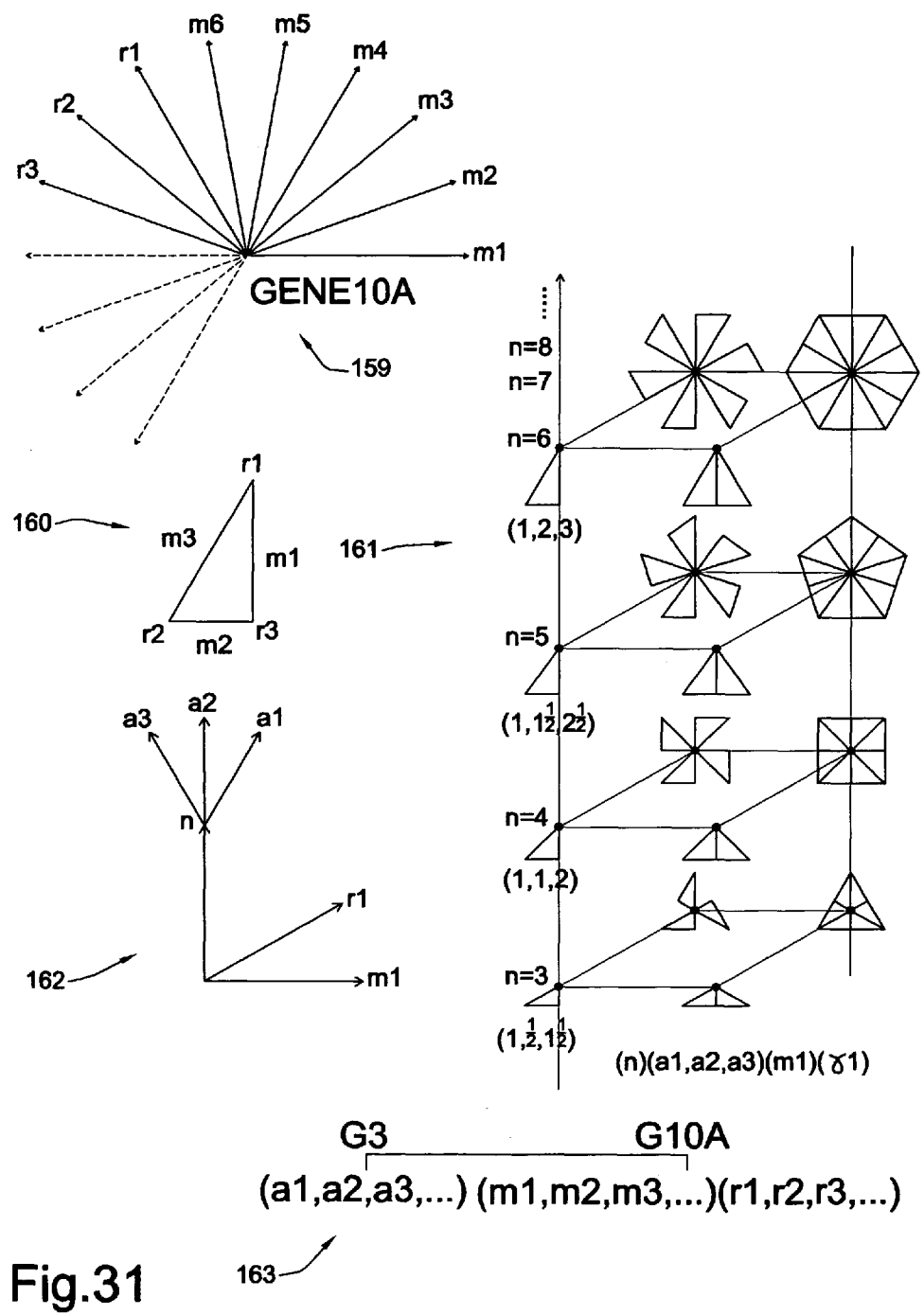
FIG. 31 shows the vector star of Gene10A and its action on Gene3 to generate mirrored and rotational symmetries around a point.

FIG. 31 shows the generating vector star 159 comprising vectors for reflection m1, m2, m3, m4, m5, m6 . . . , and vectors for rotation r1, r2, r3, r4, r5, r6, . . . . The vectors for reflection enable mirroring around a plane, m1 around mirror plane 1, m2 around mirror plane 2, and so on. The vectors of rotation enable rotation around different axes, r1 around axis 1, r2 around axis 2, and so on. When mapped as independent directions in morpho-space, these provide the generators of symmetry operations. Application to the derivation of crystallographic symmetry groups remains to be established. The symmetry operation of translation is, in part, covered by Gene4 and also generated by recursion within this gene; its position within the morph genome remains to clarified.

160 illustrates one triangle from Gene3 (n=6, 30 in FIG. 10) based on the generators a1, a2, a3. Its three sides define three different mirror planes m1, m2 and m3, and its three vertices define rotations axes r1, r2, and r3. 161 shows a table of forms using n as the vertical axis, m1 as the horizontal axis, and r1 as the inclined axis as shown in the generator vector star 162. On the vertical axis, are located different right-angled triangles having the sum of angle numbers equal to n, where the angle at the apex (marked by a dot) is always 1, the right angle is always n/2, and the acute angle is n/2−1. Moving along the horizontal axis, each triangle is mirrored around m1. Along r1 axis, each triangle is rotated n times. Combination of m1 and r1 operations leads to the regular polygons (subdivided into 2n triangles) in the rightmost column. Mirroring around the other planes, e.g the horizontal plane m4 in the examples shown, leads to double-sided polygonal symmetries.

Figure 32:
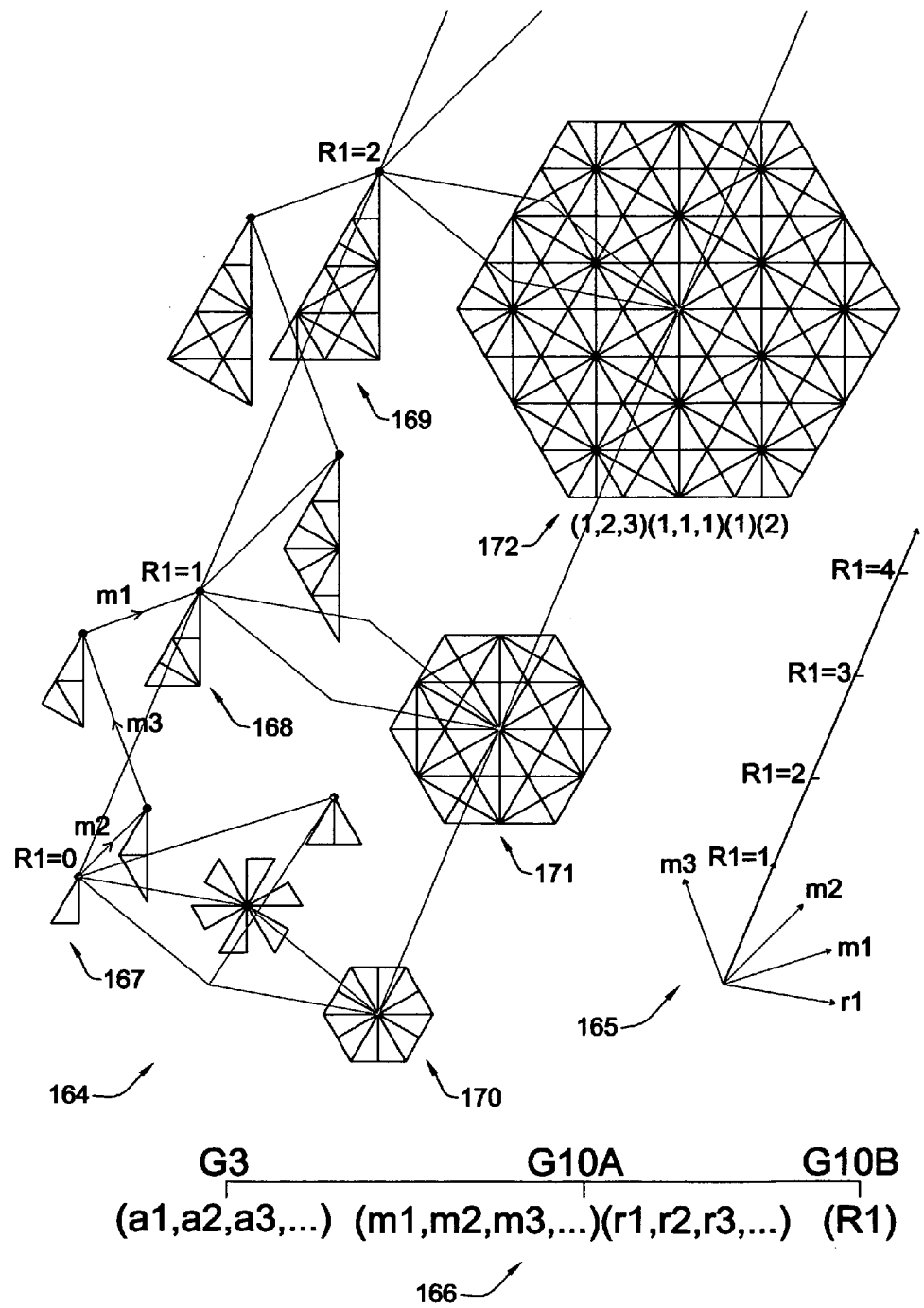
FIG. 32 shows the morpho-space of a recursive plane-filling procedure for a hexagonal net by three different reflections and a rotation and the corresponding morph-codes.

FIG. 32 shows 164, a portion of the morph-space as an example of a plane-filling procedure without translation. The vector star 165 shows the four generating vectors m1, m2, m3 and r1. A new composite operation called recursion, R1, with levels R1=1, 2, 3, 4 . . . , needs to be added and is activated by a separate morph-gene Gene10B. R1 is a composite operation m2.m3.m1, in that order, on the initial triangle (1,2,3) marked 167 in 164. The level of recursion at 167 is R1=0, applying this operation once leads to a larger but similar triangle 168 at R1=1, applying it again leads to an even larger similar triangle 169 at R1=2, and so on for any value of R1. Adding rotation r1 or these, the recursively larger self-similar triangles 170, 171 and 172 are obtained. This leads to a tiling of the initial triangle and is a way to fill the 2-dimensional plane. The generic morph-code for this family of forms is given in 166, where G10A is acting upon G3. A specific morph-code for 172, given alongside, is (1,2,3)(1,1,1)(1)(2), where the first bracket specifies the original triangle, the second bracket specifies the presence of mirror planes m1, m2, m3, the third bracket indicates the presence of n-fold rotation at the apex point of the initial triangle, and the last bracket is the level of recursion R1. Additional examples can be derived for other tilings, and space-fillings where the initial seed triangle is replaced by the fundamental region, a unit cell, or any elementary units composed of any combination of topological elements.

Figure 33:
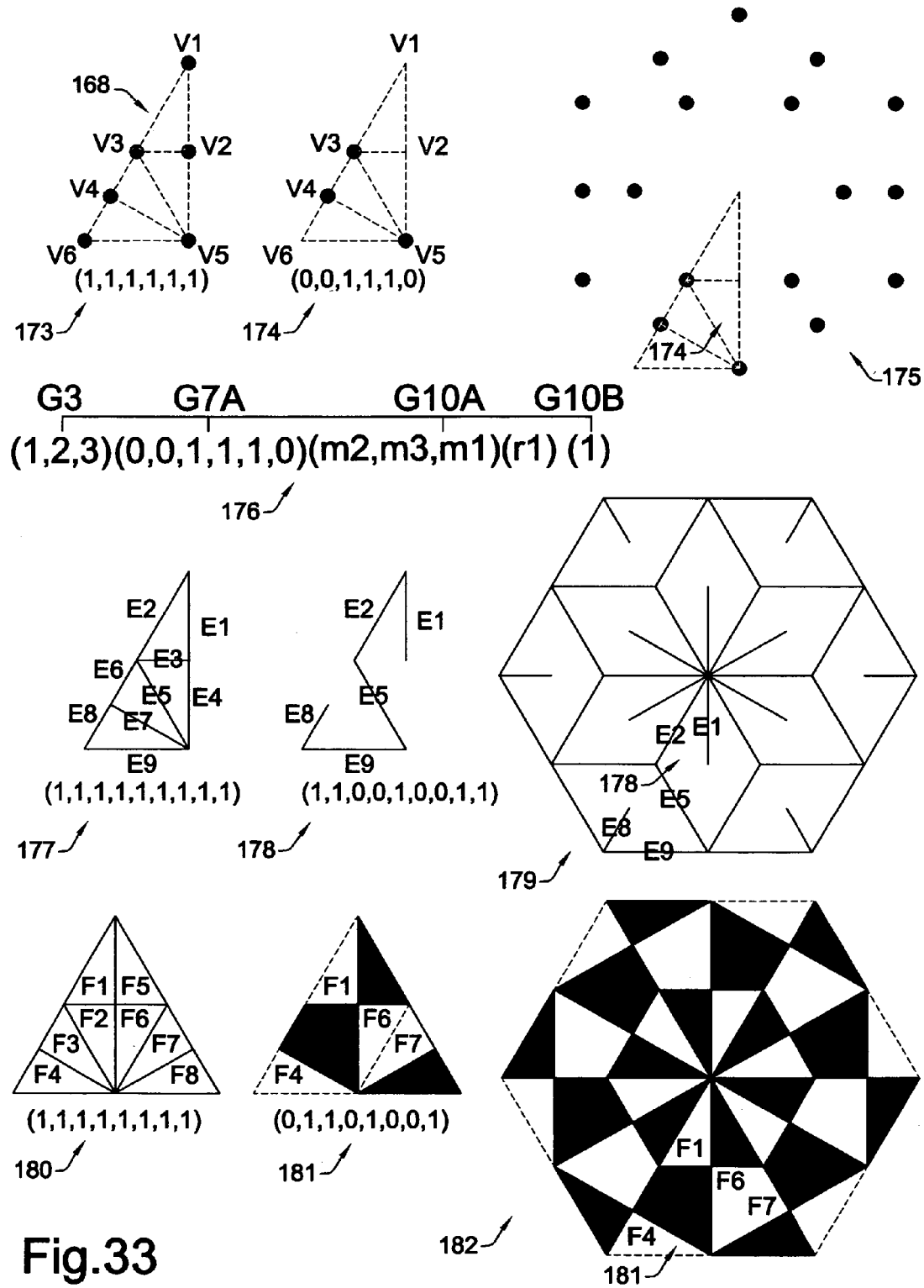
FIG. 33 shows the application of Gene10A and Gene10B to the derivation of patterns of points, lines and polygons by acting on Gene7A and Gene3.

FIG. 33 shows the application of Gene10A and Gene10B to generate a class of configurations specified by the action of Gene3 and Genes7A-C. These examples are representative and variations on the examples can be obtained by varying the 0's and 1's in the Gene10A morph-code or by changing the variables in the other associated genes. These examples lead to large families of dot patterns, atomic lattice configurations, graphic designs, and layouts of graphs from Gene 7A, and a large variety of tiling designs as seen in Islamic, Chinese, Celtic and Gothic architecture.

173 shows the R1=1 triangle 168 from FIG. 32. The activation of Gene7A enables the selection of vertices of 168 as shown in 173. The six vertices are labeled V1-V6 from which three are selected. The Gene7A code for these two patterns are (1,1,1,1,1,1) when all six vertices are present in 173, and (0,0,1,1,1,0) when vertices V1, V2 and V6 are removed as in 174. Applying the operation r1 on 174, pattern of vertices 175 is obtained. The morph-code for this family of vertex patterns is given in 176 and requires the activation of 4 genes from the genome, Genes 3, 7A, 10A and 10B.

177-179 shows the application of Gene10A and Gene10B to generate a class of configurations specified by Gene3 and Gene7B. 177 shows the R1=1 triangle corresponding to 173 and having all its nine edges E1-E9 expressed by Gene7B. Its Gene7B code is (1,1,1,1,1,1,1,1,1). In 178, edges E3, E4, E6, E7 are repressed, the remaining edges are expressed as shown; its morph-code is (1,1,0,0,1,0,0,1,1). A six-fold rotation of this edge configuration leads to the edge pattern 179 by applying rotation r1.

180-182 shows the application of Gene10A-10B to generate a class of patterns specified by Gene3 and Gene7C. 180 shows the R1=1 triangle 177 in a mirrored state and all its eight faces marked F1-F8. Its Gene7C code is (1,1,1,1,1,1,1,1). In 181, four of these faces (in black) are removed leaving behind four faces as marked. Its Gene7C morph-code is (0,1,1,0,1,0,0,1). 182 is the pattern obtained by applying r1 and rotating the pattern around the apex six times.

Figure 34:
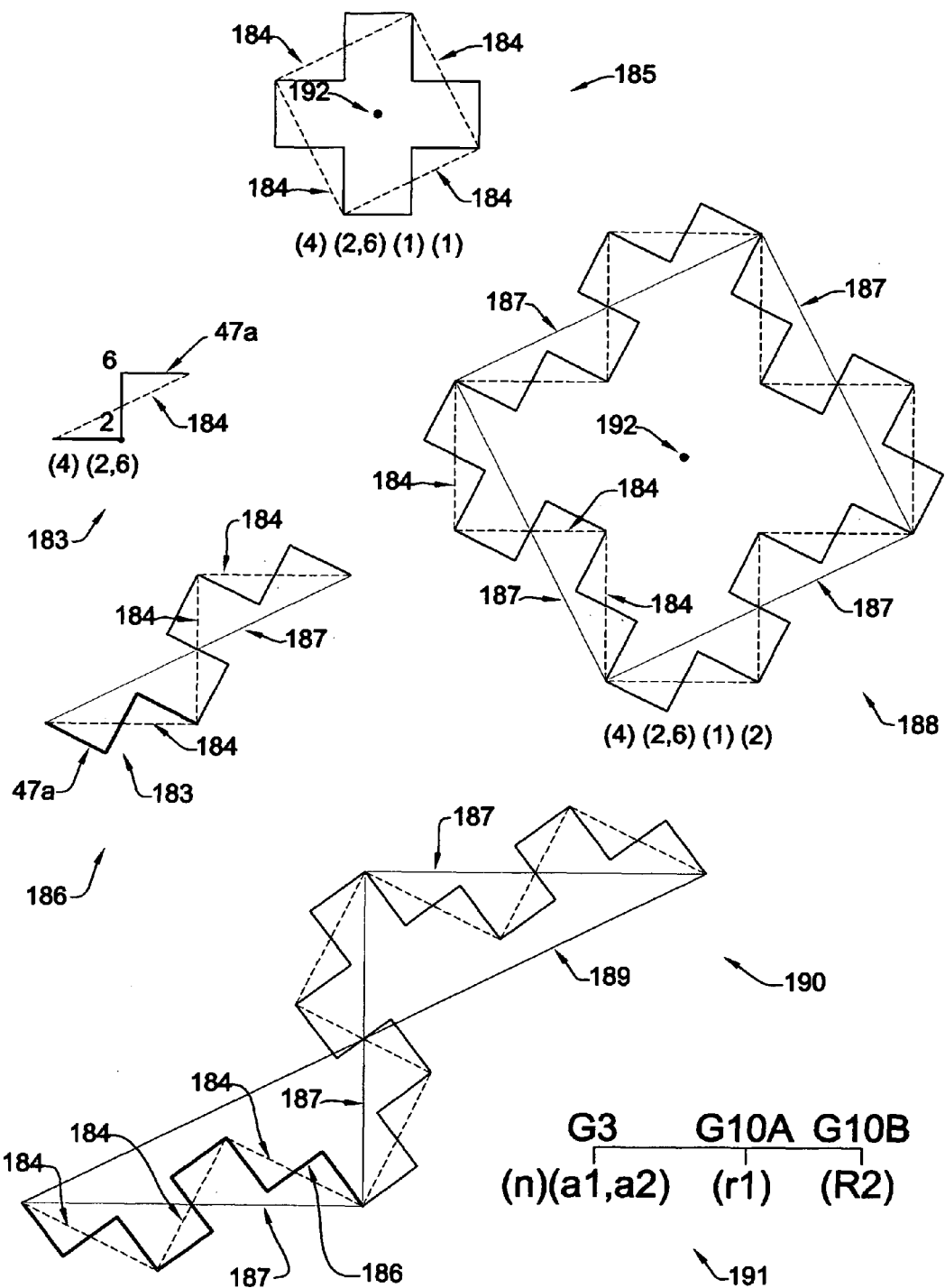
FIG. 34 shows a recursive procedure by the action of Gene10B to generate a fractal curve and its morph-code.

FIG. 34 shows the application of recursion R2, a different type of recursion specified by Gene10B. One example is shown for an initial seed element specified by Gene3 and other examples can be similarly derived. This example is a well-known fractal curve, and similar curves like Koch's snowflake curve, Hilbert's curve, Peano's curve, Cesaro's curve, etc. can be similarly derived by starting with other angle-number sequences from Gene3 and applying Gene10B. The curved versions of these can be generated by activating Gene8 in addition, and 3-dimensional fractals by starting with Gene2 and then applying Gene10B.

In FIG. 34, the initial element 184 is taken from Gene3 (47a, FIG. 13). Joining the outer vertices produces a new virtual edge 184 (shown dotted). Applying r1 from Gene10A around the point 192 rotates this element 4 times to make a square 185 having virtual edges 184. Its morph code is (4)(2, 6)(1)(1), where the first bracket specifies n, the second bracket the successive angle number 2 and 6, the third bracket specifies the presence of symmetry operation r1, and the fourth bracket specifies the level of recursion R2=1. 186 shows the edge pattern obtained at recursion level R2=2. Virtual edge 184 acts as the scaled element similar to 47a to generate a new larger virtual edge 187 which is rotated four times to generate the new edge curve 188. Its code changes the number within the fourth bracket to 2. 190 is the scaled up element at R2=3 where the virtual edge 187 has the same configuration as 47a in 183. A new virtual edge 189 is obtained which can be rotated four times to generate the next recursive level of the curve, and the procedure continued. The generic code for this class of fractals is (n)(a1,a2)(r1)(R2), where the three genes involved are G3, G10A and G10B. Applying this procedure to the edge configurations in FIG. 13 leads to a genealogy of such fractals. Changing n, leads to other genealogies, all organized in a similar manner.

FIG. 35 shows two additional examples where Gene10A and 10B are active. 192-193 show three recursive states of a pentagonal tiling using a local mirroring around the sides of the pentagon (5) from Gene2. 192 is the initial state with five sides of the pentagon marked as m1-m5. The initial state has the code (5)(0,0,0,0,0)(0), where the first bracket indicates the expression of Gene2, the second bracket is the state of Gene10A where no sides of the pentagon are reflected, the last bracket is the level of recursion R3 from Gene10B. In 193, the pentagon is reflected on all five sides to generate five more pentagons which fit within a larger virtual pentagon. Its code changes to (5)(1,1,1,1,1)(1); the 1's in the middle bracket indicate all five sides are mirrored, the 1 in the last bracket indicates R3=1. In 194, the pentagonal group 193 is mirrored around its sides and R3=2, and the process can be continued to fill the plane. A similar procedure could be applied to other polygons to derive related polygonal "snowflakes". For p greater than 6, the tiling is in hyperbolic state. 3-dimensional fractals of this kind are obtained by changing (p) to (p,q), or to (p,q,r) for the 4-dimensional cases.

195-200 shows a different procedure to fill the plane using a different recursive operation R4 which is related to R3. The example of an equilateral triangle (3) specified by Gene2 is shown and the procedure can be applied to other polygons, polyhedra and polytopes from Gene2. The R4 procedure is incremental like the previous cases, but here at each stage the local reflection is around the boundary edges of a group of tiles that keeps increasing in size. At each stage, the boundary polygon increases its number of sides by 1, and the number of triangles in the group grows by 1.

195 shows the initial state, R4=0, with the triangle having sides m1, m2, m3 as shown. Its code is (3)(0,0,0), where the second bracket indicates that there are no reflections on these sides. 196 shows the state R4=1, the initial triangle (shown with darker sides) has reflected in three different ways around each of its sides m1, m2 and m3 to generate 2 triangles in each configuration, each configuration having a 4-sided boundary polygon.

These three possibilities have the morph-codes as (0,0,0), (0,1,0) and (0,0,1). The new parallelograms have four sides, m1-m4, which provides the basis for the next generation, R4=2. In 197, one set of four possibilities is shown for the parallelogram (0,0,0) in 196. Each new configuration has 3 triangles, each new boundary polygon has sides, and the reflections are around each one of the sides m1-m4 as shown. Their morph-codes are (1,0,0,0), (0,1,0,0), (0,0,1,0) and (0,0,0,1). Each of these four lead to five possibilities, each with sides m1-m5, in the next stage R4=3. One of these sets of five is shown in 198 as the next stage of (1,0,0,0) of 197. The new configurations are obtained by reflection around each of these five sides, each leading to a 4-triangle configuration, each having a 6-sided boundary polygon. Their codes are (1,0,0,0,0), (0,1,0,0,0), (0,0,1,0,0), (0,0,0,1,0) and (0,0,0,0,1). This process can be continued for higher values of R4. The configurations of triangles obtained this way provide a bottom-up approach to their generation, and leads to a systematic derivation of triangular nets which can be folded into deltahedra, i.e. polyhedra made from triangles only. Application of Gene5 to Gene10B leads to tri-valent networks, networks having three edges meeting at a vertex. Adding one edge to each vertex leads to 4-valent networks and may have something to do with the origin of bio-molecules based on carbon which is 4-valent.

FIG. 36 shows three additional types of recursive procedures, R5, R6 and R7, encoded by Gene10B. The first example in 199-201 deals with the truncation of vertices and is shown with a polygon, a square (4) encoded by Gene2, and edges e1 encoded by Gene5. In 199, R5=0, e1 is in state 1, and the morph-code is (4)(1)(0). In 200, R5=1, the corners of the square are truncated to insert new edges e2 between e1, an operation specified by R5; the last bracket in the code changes to 1. In 201, R5=2, and the new vertices are truncated to give the code (4)(1)(2). This process can be continued and the initial square begins to approach a smooth circle. The generic code applies to any polygon specified by Gene2, edge specified by Gene5, and R5 by Gene10B as shown in 202. The procedure applies to any edge sequence specified by the angle numbers of Gene3. The procedure applies to any three-dimensional curve, tiling, polyhedron, or space-filling. The regular cases are specified by (p,q,r) of Gene2, and the edge subdivisions e1, e2, e3, e4 of Gene5 which enables these subdivisions to be applied recursively in any combinations. The generic code is shown in 203.

204-206 illustrate another type of recursion, R6, which deals with incremental changes in angle. This angle is the face angle of a polygon or edge segment, or the dihedral angle of polyhedra and folded structures. On example is shown with a heptagon (7) from Gene2, having angle numbers 5 specified by Gene3, the change in angle A specified by Gene8, and the recursion R5 by Gene10B. Its code for state R6=0 in 204 is (7)(5)(A)(0). In 205, it has changed once by increasing each face angle by A, an angle increment which can be specified in degrees of by the angle-number. In the example shown, A is kept constant, though it can change incrementally as well. In the morph=code, the last bracket changes to 1. The generic code is shown in 206 and applies to any polygon from Gene2, and polygon or line segment sequence specified by G3. In the 3-dimensional case, the angle change is in the dihedral angle.

207 illustrates a different type of recursion, R7, which deals with incremental changes in edge-lengths. This operation is acted on 205 to get 207. The edges have changed incrementally by e in a geometric proportion (e, 2e, 3e, 4e . . . ) as shown. Its morph-code is (7)(5)(A)(1,1); the successive brackets are specified by Gene2, Gene3, Gene8 and Gene10B, recursion operations R6 and R7. The generic code is shown in 208.

The seven different types of recursions, R1, R2, R3, R4, R5, R6 and R7 specified by Gene10B are not a complete set that defines different recursive and space-filling procedures. Their combinations exist in the morpho-space specified by the vector star 209 from which each different type of recursion emanates. For this set of recursions to be complete, Gene10B needs to be extended. In addition, it is not clear if this gene should be a separate gene, or if the different types of recursions qualify as independent genes.

Gene11

(FIGS. 37,38) DimensionsD1-D8, VectorsV127-135

Gene11 specifies cellular automata (CA) rules. Cellular automata are a large class of configurations that are generated by specifying neighborhood rules on a set of building cells so that they can be applied repeatedly over successive generations. The asymmetry in the rules leads to rather unexpected patterns as the rules propagate through the generations. The generated patterns range from finite, to infinite, from repetitive to non-repetitive. In the morph genome described here, these are assigned a different gene. For the purposes of illustration, Stephen Wolfram's 256 rules for one-dimensional cellular automata are shown and Use his graphic method of illustrating these rules.

A portion of the morpho-space 210 of Wolfram's 1-d rules is shown in FIG. 37. Each rule is shown as a diagram of eight boxes in a row, within each box are shown two rows of square cells, the top row showing three cells, and the bottom, one cell. The top row indicates the 8 possible neighborhood conditions of three square cells in a row, where each cell can be either black or white. The eight combinations, with a morpho-space of a cube, are (reading from left to right): black-black-lack, black-black-white, black-white-black, black-white-black, white-black-black, white-black-white, white-white-black, and white-white-white. The rule requires the specification of the bottom square cell in either black or white for each of the eight boxes. This leads to a total of 256 rules which map on the vertices of an 8-dimensional cubic morpho-space. The procedure for growth requires starting with a single row of square cells and applying one of the rules to generate the next row below, which becomes the starting point for the third row using the same rule, and so on for any number of row (generations).

In the morph-space 210, the origin of this 8-dimensional cube is located at the bottom of the diagram and has the rule where the bottom cell combination in the eight boxes are all white, leading to the morph-code (0,0,0,0,0,0,0,0). Fanning out from this origin in eight directions along the 8 vectors of the morpho-space, one black cell is placed within each one of the eight cells of the second row, i.e. one within each box, to generate eight basic rules. From these eight rules, all others are derived by combining them in different combinations by moving along the 8 vectors. In 199, starting from the right and moving counterclockwise, rule (1,0,0,0,0,0,0,0) has one black cell in the bottom row within the first box, rule (0,1,0,0,0,0,0,0) has one black cell in the bottom row within the second box, rule (0,0,1,0,0,0,0,0) has one black cell in the bottom row within the third box, and so on for each of the eight boxes. The entire 8-dimensional space can be filled with these 8 rules as the generators. As an illustration, few of the combination rules are shown. Moving from rule (0,0,0,0,1,0, 0,0) located along the vertical from the origin along the direction of rule (0,0,0,1,0,0,0,0), we get a combination rule (0,0, 0,1,1,0,0,0) with two black cells in the second row. Three different rules are shown emanating from this rule by adding one more black square in the bottom row for each leading to rules (0,0,0,1,1,0,0,1), (0,0,0,1,1,0,1,0), and (0,1,0,1,1,0,0,0). One example of rule (0,1,0,1,1,0,1,0) with four black squares in the bottom row is shown on the top right, and one with five black squares (0,1,0,1,1,0,1,1) on the top left. By combining these 0's and 1's in all combinations leads to Wolfram's 256 rules.

Wolfram's rule requires the square tiling (4,4) specified by Gene2, the number of squares in the initial row is specified by f1 of Gene4, the number of generations is specified by f2 of Gene2, the cell combinations in the first row are specified by face combinations F1, F2, F3 of Gene7A, the combinations in the second row are specified by Gene 11. Thus 4 genes are required to specify Wolfram's CA rules. For a pattern of 25 rows, 30 generations, based on a square, the morph-code for one of the rules is (4,4)(25,30)(F1,F2,F3)(0,1,0,1,1,0,0,0). The generic code for the first three brackets is (p,q)(f1,f2)(F1, F2,F3) for all regular tilings, polyhedra, plane and hyperbolic tessellations. In a higher dimension, the code for the first three brackets becomes (p,q,r)(f1.f2,f3)(C1,C2,C3,C4, . . . ). The fourth bracket is specified by Gene11 in combination with Gene7A, and the number of digits within this bracket depends on the combinations from Gene7A. The number of rules equals 2^2^F (2 raised to the power 2 raised to the power F), where F is the number of neighboring faces. In the example of Wolfram's 1-D CA rules, F=3, and the number of rules equals 2^2^3=2^8=256. F can be replaced by elements of other dimensions.

FIG. 38 shows some examples of surfaces obtained by activating Gene 11 in combination with other morph genes. Examples shown use Wolfram's rule 30 in 211 to generate a tiling pattern from which a 16×16 square portion 212 is excerpted. This is used as basis of 213, a subdivision of the surface of the cube (4,3) specified by Gene2. In 214, the same subdivision as 213 is used to surface a sphere specified by a combination of Gene2 and Gene8. 215 is a 60 degree rhombus specified by Gene12 (alternatively, this rhombus is a polygon of one of family of tilings from (6,3)). Here it is a skewed version of a square and is subdivided in a manner similar to the square 212 but in a tilted manner. Half of this rhombus generates a triangle. In 216, six triangles are tiled around a point, and by activating Gene8, the edges are curved to make a saddle polygon as shown. Eight such saddle polygons, arranged with each saddle face corresponding to the hexagonal face of a truncated octahedron generate a curved 3-dimensional module 217. This module is repeated to generate the continuous surface 218 based on the Schwarz surface specified by the combination of Genes2, Gene4, Gene5, Gene7C and Gene8.

Other structures and surfaces could be similarly derived and open up new design possibilities.

Gene12

(FIG. 39) DimensionsD1-D2, VectorsV136-V137

Gene12 is a gene for dimensional projection. It specifies the projection from higher (n-dimensional space and its i-dimensional sub-spaces) to lower dimensions (S-dimensional space). For example, when 4-dimensions (n=4) is projected to 3-dimensions or when we physically construct its 3-dimensional representation (S=3), or 3-dimensions (n=3) to 2 dimensions (S=2) when we make a drawing of a 3 dimensional object, and so on. For design purposes, S=2 and 3 are the most relevant cases.

FIG. 39 shows the morpho-genomic space 217 of Gene12. It has three generating vectors, n, i, and S, where n (=1, 2, 3, 4, 5, 6 . . . ) designates the dimension of space specified by Gene2 or Gene3, i the sub-dimensions of n (i=1, 2, 3, 4, 5, . . . ) embedded in n, and S the dimension of space of projection (S=1, 2, 3, . . . ). These are shown in the vector star 218, the generator of 217 and the generic morph-code of this space is (n)(i,S). 219 shows a table of rhombuses (i=$2_{1,2,3}$ . . . ) by projecting n dimensions to 2 (i.e. S=2). Its morph-code is (n)($2_{1,2,3}$ . . . , 2). In the table, for each value of n, the number of rhombuses is determined by the distinct pairs of angle-sum which add to n. For example, for n=5, the angle-sums 1 and 4, and 2 and 3, are the only pairs of integers that add up to 5. These are the only available n=5 tiles for tiling. This table is embedded in the table specified by Gene3. A similar rule for 3 dimensional cells, e.g. the sum of dihedral angles, should be possible.

The rhombuses in 221 are dimensional polygons with parallel edges that are obtained from projection of n-dimensions to 2-dimensional space. Similar tables of polygons having parallel edges (called zonogons) are possible for all other sides, and these polygons can be convex or non-convex. The tables of zonogons are embedded in the morpho-space specified by Gene3. In addition, tables of 3-dimensional versions of these called rhombohedra and zonohedra can be encoded by Gene12. Gene12 is also useful for encoding the infinite class of non-periodic tilings, like the Penrose tiling, when combined with a recursive procedure like R1 from Gene10B. It is also useful for encoding non-periodic space-fillings like the ones that define quasi-crystals. Gene 12 also enables the possibility of envisioning architectural, spatial and graphic designs based on 3-dimensional and 2-dimensional projections from higher dimensions.

Gene13

(FIGS. 40-42) Dimensions D1-D9, Vectors V138-V146

Gene13 is a gene for dimensional extent, essentially a size gene, that can also be used as a shaping gene. It acts on individual elements of a structure, and thus can lead to far more complex and asymmetric designs and greater changes in shape. It enables unequal changes in size along different edges of the object and is thus a versatile gene and more useful for design. It is related to Gene5 and can be applied to Gene2, Gene3 and Gene4. A portion of Gene5 is also a size gene, with the difference that Gene13 acts on individual elements in a structure while Gene5 acts on a group of elements and includes the scaling (same shape but larger or smaller size) operation. Thus Gene13 emanates from Gene5. Gene13 acts on Gene2 or in combination with Gene2 and Gene5. It is potentially a large gene, equal in extent to Gene9 since it deals with changes in individual elements.

FIG. 40 shows one example of the application of Gene13 to changes in shape of a line, square, cube and a 4-dimensional cube, and extends to all higher-dimensional cubes. The vector star 220 shows the 4 generating vectors, $e1_1$, $e1_2$, $e1_3$, $e1_4$, which represent the four edges that generate all the structures in the morpho-space 221. These four edges have the code (1,0,0,0), (0,1,0,0), (0,0,1,0) and (0,0,0,1) and they emanate from the origin (0,0,0,0), a point. Moving in this space along direction e11 (horizontal) from the origin, the point grows to the edge (1,0,0,0) in a continuum; one stage in between is shown at (0.5,0,0,0). Moving vertically from the edge (1,0,0, 0) in the direction of $e1_1$ by 0.5 units generates a rectangle at (1,0.5,0,0) which becomes a square at (1,1,0,0) by moving 1 unit. Moving along the direction $e1_3$ from the square, a cube emerges at (1,1,1,0) after 1 unit, passing through mid-stage (1,1,0.5,0); the back sides of the cube are not shown for clarity. Moving along $e1_4$ direction from the cube, the 4-d cube (1,1,1,1) emerges passing at 1 unit interval through a mid-stage (1,1,1,0.5); here too the outer faces of the 4d-cube are shown for clarity. The morpho-space extends to infinity and any four real numbers define an object in this space. An elongated rectangle at (1.4,0.5,0,0) shows an extension by 0.4 units along $e1_1$ outside the unit hyper-cube morpho-space. A similar extension from the 4d-cube (1,1,1,1) changes its proportions to (1.4,1,1,1), which changes further to (1.4,0.5,1,1) by shrinking along $e1_2$.

The generic morph-code for this family of forms is shown in 222. Gene13 acts on Gene2 and Gene5. The full numeric code for one of the forms in 221, say, (1.4,0.5,1,1) is (4,3,3) (1,0,0,0)((1.4,0.5,1,1); the first bracket specifies the (p,q,r) structure encoded by Gene2, the second bracket shows the edge subdivisions encoded by Gene5 and could be truncated to one digit for the 4d-cube shown here since all its edges are e1, and the third bracket is encoded by Gene13. The complete code requires 11 digits, making the full morpho-space 11-dimensional.

This particular example is interesting because it shows the self-similarity between the structure of the morpho-space and the forms mapped in this space. Thus this application of Gene13 also encodes the entire taxonomy of morpho-spaces used in mapping the morph genome. In addition, this example provides a way to proportion any form by using the square, cube and 4-cube as a reference framework, like a graph paper, and then morphing the graph paper in the manner of D'Arcy Thompson's method of grid transformations. A biological form overlaid on, say, a square grid, can be morphed by morphing the square grid which morphs the biological form correspondingly.

FIG. 41 shows an application of Gene13 that requires the action of Gene4 in addition to Gene2 and Gene5. 223 shows a portion of a unit 4-cube lattice with only its outer shell shown. It has a frequency (f1,f2,f3,f4) specified by Gene4, where these define corresponding subdivisions along the four different directions of edges; here f1=3, f2=2. f3=3, f4=1, and its frequency has the code (3,2,3,1). The edge-lengths along the four directions are 1 unit and the Gene13 code is (1,1,1,1). The composite code is (3,2,3,1)(1,1,1,1). In 224, the subdivision along direction $e1_1$ has changed from 1 unit to 1.5 units along this edge, changing the Gene13 code to (1.5,1,1,1). This shows the extension of the morpho-space 221 of FIG. 40 to include hyper-cubic lattices and their edge transformations. The entire space becomes 8-dimensional. The generic code is shown in 225 and specifies the action of four genes. The numeric code for 224 is (4,3,3)(3,2,3,2)(1,0,0,0)(1.5,1,1,1), a 15-dimensional address in the morpho-space; it requires 15 numbers to specify it completely. The third bracket, based on G5, indicates that the structure (4,3,3) requires only e1 to encode it.

Illustrations 226-231 show a different application of Gene13. Here too it acts on three morph genes, Gene2, Gene4 and Gene5. The generating vector star is shown in 226 with eight vectors $e1_{1-4}$ and $e2_{1-4}$ based on 227-230. This particular example shows how a regular grid can be morphed to an asymmetric grid. The example is simple, but shows the application of Gene13 to generate asymmetry from asymmetry. Such asymmetric grids are useful starting point for designing architectural plans, e.g. room layouts. They also generate some of the grid transformations used by D'Arcy Thompson for show biological form transformations, or the grid method used by the Renaissance artist Albrecht Durer to make drawings of human figures.

227 shows the starting symmetrical 4×4 square grid with two types of edges, e1, and e2, each in four states indicated by a suffix. Its Gene13 code is (1,1,1,1)(1,1,1,1) since all edges are of unit lengths to start with. In 228, e11 has changed to 0.5 and the code changes accordingly to (1,0.5,1,1)(1,1,1,1). In 229, $e1_2$ changes to 0.75 and $e1_3$ changes to 1.37. The code changes to (1,0.5,0.75,1.37)(1,1,1,1). In 230, three of the vertical edges have changed to 0.4, 0.2, 2.1, and the code changes to (1,0.5,0.75,1.37)(1,0.4,0.2,2.1). With a larger number of grid lines and more changes, extremely irregular grids can be generated. When acted on by a recursive operation R7 of Gene10B, the grids transformations can be graded in different ways. The generic code is shown in 231. The numeric code for 230 is (4,4)(4,4)(1,1)(1,0.5, 0.75,1.37)(1, 0.4,0.2,2.1), a 14-dimensional number sequence in a 14-d morpho-space. Changing these numbers generates new grid transformations.

FIG. 42 shows a different application of Gene13 to generate a complex form from a simple one. It is related to the grid transformation, but generates a polygon with right angle bends as one example to create complex envelopes from a simple starting point. The vector star 232 specifies the vectors needed in generating the sequence of development from the square 233 to the final form 236. It begins with two edges, $e1_1$ and $e2_1$ with the numeric code (1)(1) and a symbolic code $(e1_1)(e2_1)$. In 234, edge $e1_1$ expands to $e1_2$ and a new rectangular protrusion with a height $e2_2$ is generated. The code changes from a 2-d code to a 4d code as two new edges are added as shown. The numeric code now becomes (1,0.6)(1, 0.3) corresponding to the new edge-lengths that are added, with the symbolic code changing to $(e1_1,e1_2)(e2_1,e2_2)$. In 235, another rectangular offset is produced on the top end with the introduction of edges $e1_3$ and $e2_3$ as shown. The code adds two more digits representing the two new edges to become a 6-d numeric code (1,0.6,0.8)(1,0.3,0.25) and corresponding to the symbolic code $(e1_1, e1_2,e1_3)(e2_1,e2_2,e2_3)$. In 236, another rectangular offset is produced on the first offset on the lower right, adding two more variables. The numeric code changes to (1,0.6,0.8,0.4)(1,0.3,0.25,0.2) and the symbolic code to $(e1_1,e1_2,e1_3,e1_4)(e2_1,e2_2,e2_3,e2_4)$.

It is clear that one can keep adding offsets or continually modify the form till a satisfactory design is obtained. This example demonstrates the process of continually modifying a form as new morphological transformations and features are added to an existing design. This could be useful for designing architectural layouts and shaping spaces according to function as the design evolves from simple to complex as finer functions are added. For example, a generic living room 233 could acquire an addition (lower right space in 234) which could become a study (lower right space in 236) and also add an alcove on the top (in 235). The morph-code enables the derivation and manipulation of such forms from any starting figure and applying this technique in a step-by-step manner. The code can be altered to get variations, and the design possibilities mapped within a morpho-space which can be traversed to find alternative designs. This code, which specifies lengths, can be combined with Gene3 which specifies angle-bends to generate a larger range of alternatives.

Gene14

(FIG. 43) Dimensions D1-D4, Vectors V147-V150

Gene14 specifies Boolean operations like unions, intersections, difference, etc., in logic or AND, OR, NOT, NOR in logic. In the context of the morphological genome, it involves the interaction of two or more forms. When two different forms interact, for example a square and a circle within a space like a rectangle, 16 Boolean operations are possible. These can be mapped on the vertices of a 4-dimensional cube as shown in FIG. 40. The four generators, B1, B2, B3, B4 in the vector-star 242 are shown graphically in 237-240 and respectively indexed in the 4-d co-ordinates as (1,0,0,0), (0,1, 0,0), (0,0,1,0) and (0,0,0,1). In 241, these four emanate from the origin (0,0,0,0) which indicates the null or empty form, and all others are combinations of these four along the four directions indicated by arrows at the origin. (1,1,1,1) is the full set, the complement of null.

In 241, (0,1,0,0) is the 'intersection' in set theory or AND in logic and (1,0,1,1) is its complement or NAND in logic; (0,1,0,0) and (0,0,1,0) are two examples of 'difference' in set theory or NOT in logic; their complements are (1,0,1,1) and (1,1,0,1) or XNOT in logic, though the latter term is not used in logic; (1,1,1,0) is the 'union' in set theory or OR in logic; (0,0,0,1) is its complement or NOR in logic; (1,0,1,0) is the difference sum or XOR in logic; its complement is (0,1,0,1) or XNOR in logic; (1,1,0,0) is the square, one of the two forms being combined; (0,0,1,1) is its complement; (0,1,1,0) is the circle, the other form being combined; (1,0,0,1) is its complement.

This 4-dimensional cube shows the underlying structure of set and logic operations. In the context of form-generation, it shows all the interaction of a circle and a square within a space. The circle and square could be two different architectural spaces or functions, within a larger perambulatory space. The two shapes could be replaced by any two shapes, 2-dimensional or 3-dimensional, from any combinations of morph-genes described earlier. The idea could be extended to interaction of 3 or more different shapes in more complex designs where many different entities are interacting with one another. When 3 different forms interact, the total number of combinations equal 128 which can be mapped on the vertices of a 7-dimensional cube. With 4 different entities, a 13-dimensional morph-space is required. Gene13 enables the systematic encoding of such spaces which can be systematically generated and processed by the designer or a machine to review the design relevant to a particular design problem. In addition, these morpho-spaces can be mapped as a continuum where these interactions can morph continuously from one to another. This leads to the use of a continuous version of Boolean logic and set theory. In design, this means that the entities and their interactions begin to occur in variably controlled states as we move from one vertex of the hyper-cube to another along the edge, face or cell of the hyper-cube.

Gene15

(FIG. 44) Dimensions D1-D3, Vectors V151-V153

Gene15 is a position gene that specifies the position of an object in space with respect to a fixed (origin) or relative point of reference like another object. It is described in terms of distances or lengths from this point of reference along different axes of the space the object is in. The generating vector star of Gene15 is shown in 243 in FIG. 44. Its vectors d1, d2, d3, d4, ... correspond to distances along a virtual vector space defined by these vectors. This is similar to using Gene13 (FIG. 40) to generate a virtual space, but with the difference that Gene15 defines movements or distances between objects in this virtual space and not the space itself. For 3-dimensional space, three vectors (same as x, y, z axes) are sufficient to encode all position in 3d space.

Figure 45:
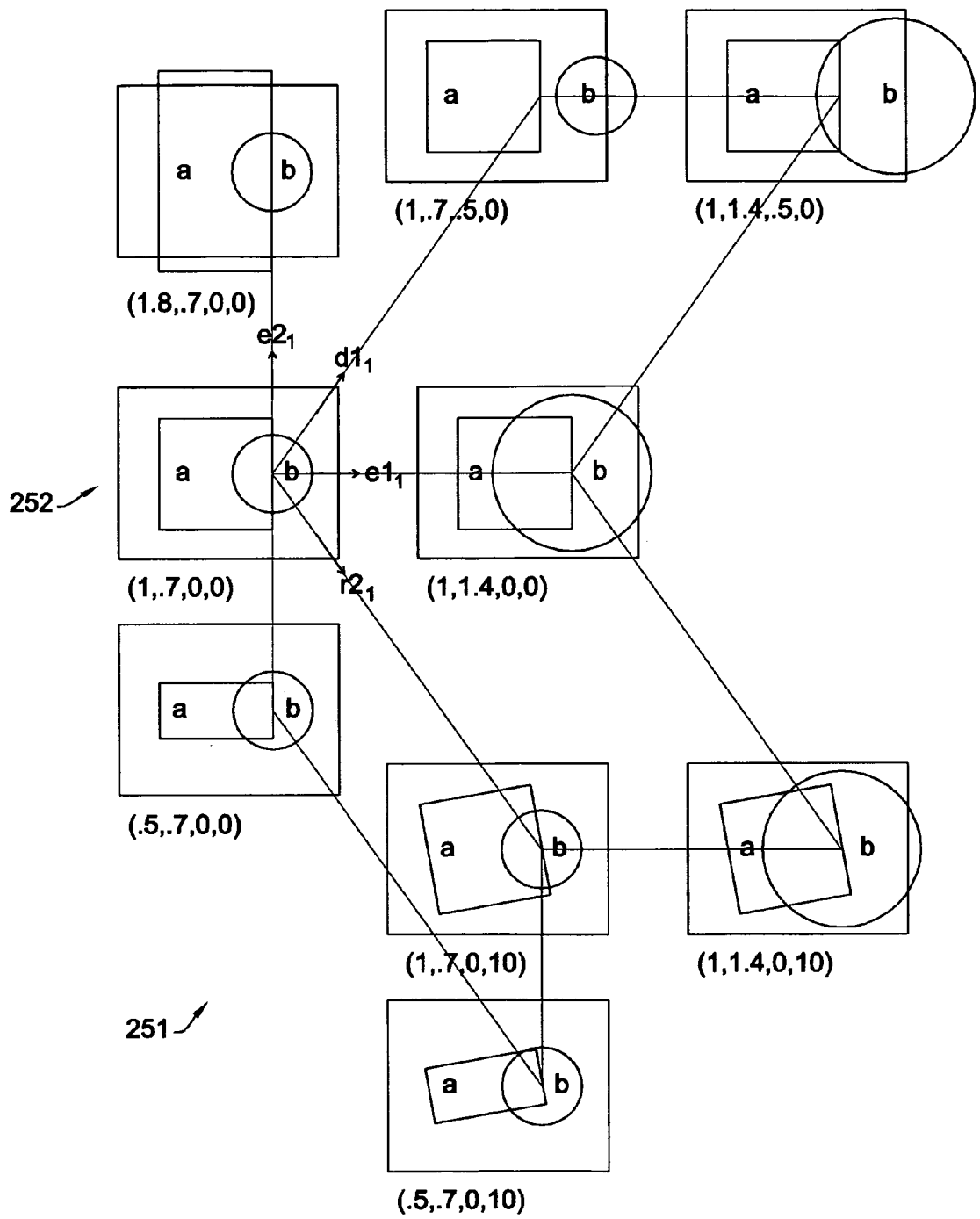
FIG. 45 shows the morpho-space of the example in FIG. 44 showing the evolution possibilities of a design.

The application of this morph gene to form-generation is shown in 244-247 and continued in FIG. 45. The composition of a circle and a square in FIG. 43 is used here as a starting point and a few different genes are combined to act on this composition to generate different designs. 244 in FIG. 44 is the generating star for this example with vectors $e1_1$, $e2_1$, $d1_1$ and $r2_1$. It has four generators from three different genes acting on the two forms, circle (∞) and square (4) specified by Gene2, rotation $r2_1$ specified by Gene10A, edge-lengths $e1_1$ and $e2_1$ specified by Gene13, and distance $d1_1$ specified by Gene15. In 245, the parameters $e1_1$ and $e2_1$ designate the diameter of the circle and the vertical dimension of the square, respectively, as shown. In 246, the circle has been moved to the right by a distance $d1_1$. In 247, the square has been rotated by an angle $r2_1$. The generic code for the two shapes is illustrated in 248, where the upper row of symbols 249 indicates the code for the square and the lower row is the code for the circle.

FIG. 45 shows a portion of the morpho-space 251 which generates the design variations by the action of Gene10A, Gene13 and Gene15 on the circle-square composition. This space is size-position-orientation morpho-space of the form composition comprising two shapes, circle and square. The original composition 252, acts as the local origin of this design space. The four directions emanating from this are the same as the vector star 244 in FIG. 44. The morph code for each composition is given alongside each in a simplified code in 4-dimensional co-ordinates ($e1_1$, $e2_1$, $d1_1$, $r2_1$). This co-ordinate description removes the separation between the two forms but is easier to read. By changing these four variables, and by adding additional variables, the design palette of the designer is considerably enlarged.

An alternative representation of the composite morph code for the interaction of two forms is [form1][form2]. It can be extended to any number of forms by adding additional morph codes between additional square brackets, one square bracket for each form, to become [form1][form2][form3][form4][ ] [ ] .... The generic morph code for the interaction of the two simple polygonal forms using these four variables as shown in the example of the circle and the square is [(p)($r1_1$)($e1_1$)($d1_1$)][(p)($r2_1$)($e2_1$)($d2_1$)], where the first bracket contains the morph-code of the first form, and the second bracket is the code for the second form. The generic code for the size-orientation-position of a single shape is ($e1_1$, $e1_2$, $e1_3$)(r1,r2,r3)(d1,d2,d3), a 9-dimensional code, since each of these three morphological transformations can be specified by 3 parameters: the three lengths along x, y and z axes, the three rotations around these axes, and the three displacements along these axes. It doubles for two objects, and the dimension of space multiplies as more and more objects interact in a design.

When two or complex structures interact, with each having a group of interacting forms, the morph genome takes on the representation {Genome of Structure1}{Genome of Structure2}{ ... }{ ... }{ ... }{ }{ } ..., wherein each Genome of Structure comprises {[Form1][Form2][Form3][ ... ][ ... ] [ ][ ] ... }, wherein each Form comprises [(Gene1)(Gene2)(Gene30( ... )( ... )( )( ) ... ], wherein each Gene comprises (Parameter1, Parameter2, Parameter3 . . . ), wherein each Parameter is independent of all other parameters in the genome.

Figure 46:
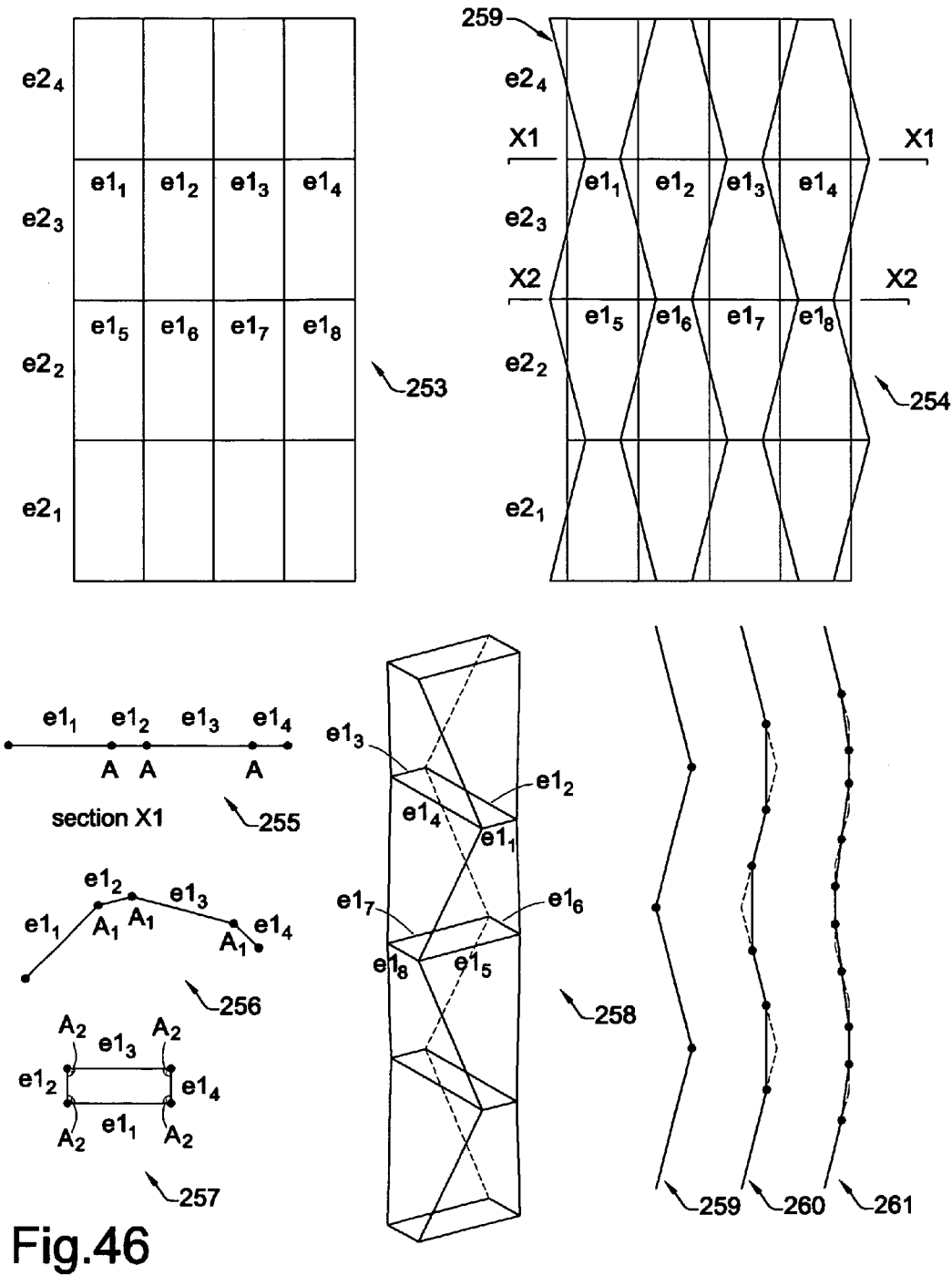
FIG. 46 shows an example of a folded structure encoded by Gene3 and Gene13.
Figure 47:
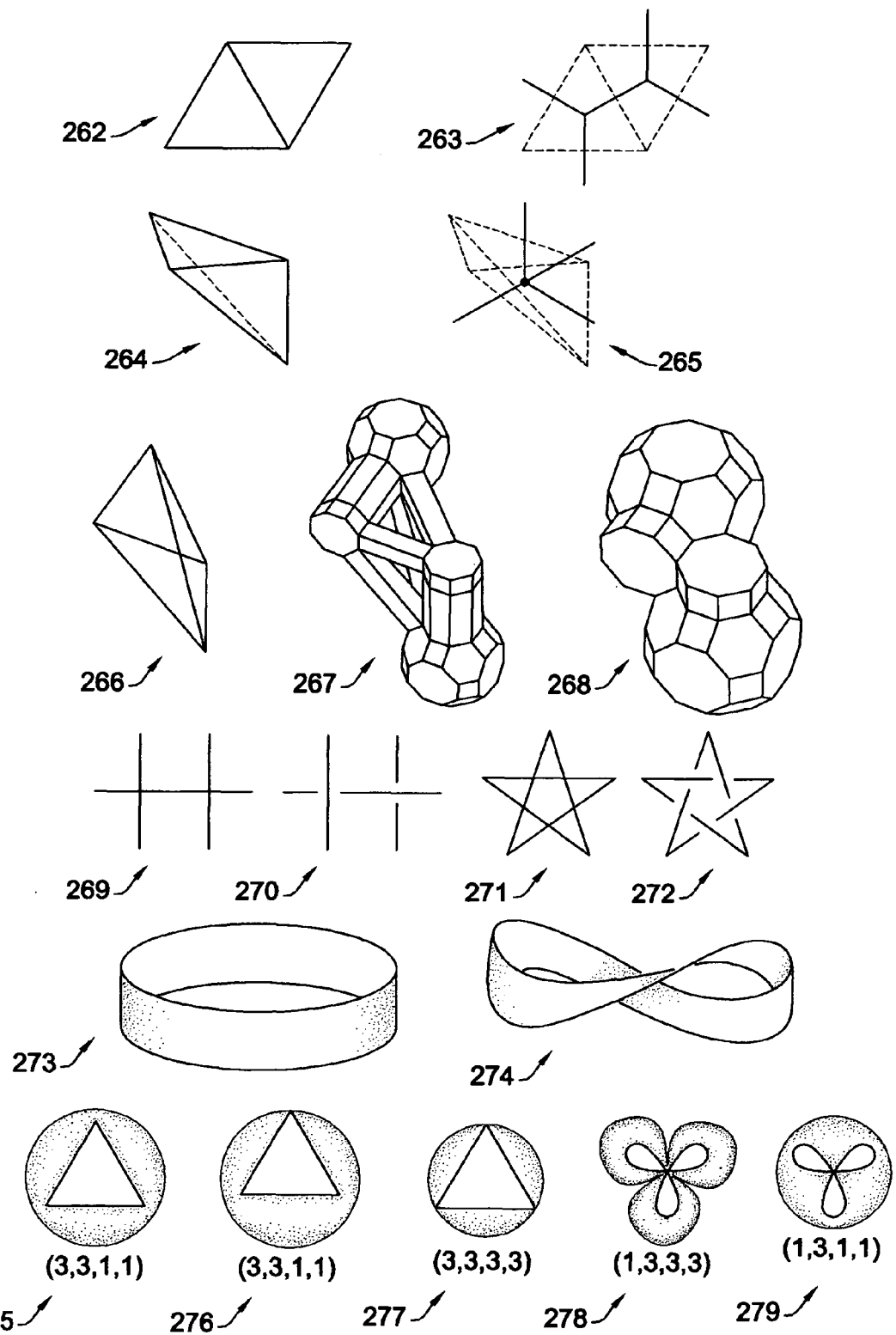
FIG. 47 shows examples of topological structures displaying morphological transformations which may require additional genes
Figure 48:
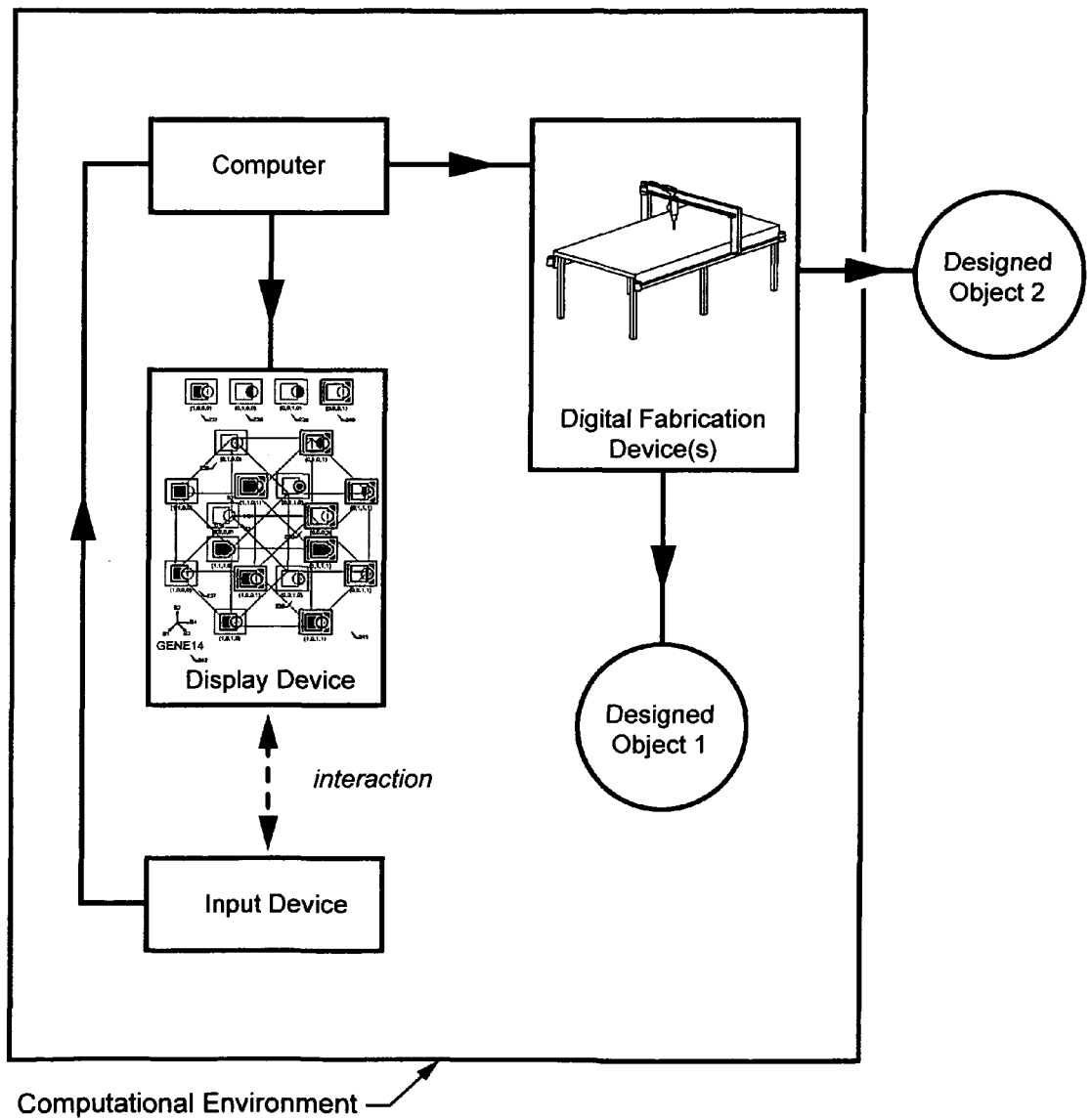
FIG. 48 illustrates the link of the morphological genome to an interactive "computational environment" comprising a computer linked to a "display device" through an "input device" and further linked to a "digital fabrication device".

Described below, and illustrated in FIGS. 46 and 47, is a group of potential morph-genes. At this point, it is unclear if some or all of these morphological transformations qualify as independent genes or are by-products of the genes described above.

Additional Genes (FIGS. 46.47)

1. A morph-gene for Folding: FIG. 46 shows the derivation of one folded structure 258 starting from a flat surface 253 and activating some of the genes described herein. In 253, the edges are marked in the same way as 227 in FIG. 41. The action of Gene13 enables the alteration of lengths $e1_{1-8}$ as shown in 254. This alteration is shown in a symmetric manner for demonstration only; $e1_1$, $e1_3$, $e1_6$ and $e1_8$ are shown as shrinking identically, though they could do so without this symmetry. In 255-257 is shown the folding process. 255 is a section of the surface at X1 where the four edges are shown along with the dihedral angles A between the edges; here A=180 degrees. In 256, angle A changes to an intermediate angle A1, and eventually to the final angle A2 (90 degrees) as the folding process is continued. A reversed rectangle, at right angles to the first, is generated at level X2. The 3-dimensional form is shown in 258. The changes in angle A can be specified by Gene3 which deals with angle-numbers, and could specify non-convex and irregular profiles for these folds. In the example show, when the lengths change unequally, the folding into a closed rectangle is not guaranteed. This simple example shows the derivation of a folded surface from a flat sheet by Gene13 and Gene3. Though this example shows that no new gene is needed, it is unclear if all folded and origami structures can be derived with the actions of the genes described.

A curved version of this, and other folded structures like this one, can be generated by the recursive operation R5 in FIG. 36 by activating Gene10B. This is shown in 259-261 for a single folded edge of 258. In 260, the vertices of the curve are truncated and in doing so the surface acquires more facets. This process is continued in 261 and beyond till a smooth curve is obtained. The surface becomes more and more facetted till it becomes a smooth surface.

2. A morph-gene for Duality: This is a fundamental topological operation that converts a structure to its topological dual. In 2-dimensions, it reciprocates (interchanges) vertices with faces and flips edges at right angles. In 3 dimensions, it reciprocates vertices with cells and edges with faces perpendicular to them. In FIG. 47, 262 and 263 show the 2-dimensional duality operation with an example of two triangles specified by Gene10B (196 in FIG. 35). Duality converts each triangle into a 3-edge star emanating from the center of triangular face. This operation is also built-in the edge transformations encoded by Gene5.

An example of a 3-dimensional case is shown with the tetrahedron 264. Its dual network is shown in 265 where the dual edges emanate from the center of the tetrahedron orthogonally to the faces of the tetrahedron. In addition, each edge of the tetrahedron is converted into a face perpendicular to this edge. A continuous process called explosion-implosion is used to transform the tetrahedron network 266 to a packing of cells 268 is shown via an intermediate stage 267. We could apply the same process to the edges of 268 to get its dual cells. This transformation is encoded by Gene5.

Though the two examples shown can be derived from Gene5, not all dual structures can be derived that way, especially when we get to the less regular cases (e.g. semi-regular cases). This needs to be clarified. Also, duality can be applied recursively. For example, the intermediate structure 267 will have its own dual, and if that were exploded, the exploded state would have its dual, and so on. The exploded state 267 also provides a way to generate space labyrinths which divide space into two parts, inside and outside as shown earlier in FIGS. 24 and 25. These labyrinths can also be derived recursively. This may require a new recursive gene, R8, to be added to Gene10B.

3. A morph-gene for Knots and Link: Knots, links, and weaving are interesting topological structures used in many applications. The process begins with two adjacent 4-valent vertex conditions as shown in 269, and converting these onto cross-over vertices in an alternating "up" and "down" sequence in 270 (note the horizontal line goes under then over the two vertical lines. This is the beginning of a knot, a link and a weave. A distinct knot is shown in 272 and derived from 271 by alternating the over and under condition over each vertex. These and other knots are not specified by the morph-genes described herein and would require an independent gene.

4. A morph-gene for Orientability: Topological orientability is a feature of surfaces that do not have a distinct inside or outside. Well-known examples include the Mobius trip and the Klein bottle. The cylindrical strip 273 is transformed into a Mobius surface 274 by a single twist before the ends of the strip are joined together. It is unclear if this will require an independent gene and the twists can be described by rotations.

5. A morph-gene for Genus: A genus is a distinct property of a topological surface having holes and equals the number of holes. In 275-279 are shown different examples of surfaces and their V,E,F,C codes from Gene1. For example, 275 is like a donut with a triangular hole; it has 3 vertices, 3 edges, 1 face and 1 cell leading to the code (3,3,1,1)—in the illustration, the codes are given in their compressed form without commas and bracket. In 276, the outer face has collapsed at one point but the code remains unchanged. In 277, the outer face has collapsed at three points leading to a structure with 3 vertices, 3 edges, 3 faces and 3 cells; its code is (3,3,3,3). In 278, the three vertices of 277 have collapsed into one leading to a structure with 1 vertex, 3 edges, 3 faces and 3 cells and a code (1,3,3,3). In 279, the vertices of 275 have collapsed into one leading to a structure having 1 vertex, 3 edges, 1 face and 1 cell and a code (1,3,1,1). Though these structures can be indexed in V,E,F,C co-ordinates, these are additional examples on non-Eulerian structures. It is unclear of genus is an independent property, hence an independent morph-gene, or a by-product of Gene1 a shown with these examples, or generated by the action of Gene7C on Gene5 and Gene2 as shown in FIGS. 24 and 25.

Additional genes may need to be added for D'Arcy Thompson-type grid transformations, asymmetric curves, and irregular geometries other than those specified already. In addition, if the observer is added to form as an essential ingredient in the visual and spatial arts, then genes that generate the Observer Space will need to be added. These require including the eye, its distance from the object, rotation of the eye, perspective, acuity, angle of vision. In addition, it will require adding the position of observer, orientation of observer, movement of the observer (change in position and direction), speed of movement of observer, and so on. Additional genes will be required to map the universe of structural morphologies including tensegrity structures, tension and pneumatic structures, deployable and kinetic structures of various kinds, folded structures, shells and membrane structures, trusses and hybrid frame-cable systems, and so on.

The morpho-genomic method used here to map increasingly complex families of form applies to other fields of knowledge, both as a bottom-up taxonomic device to organize existing knowledge (information) and to create new knowledge (information). The organization of the number system (especially, the decimal system) itself by the same method is already disclosed in FIG. 3 for integers, FIG. 4 for fractions or rational numbers, and suggested for negative numbers and real numbers. Imaginary numbers, powers and roots can be added by introducing additional axes to the morpho-space of numbers. A similar method could be applied to algebra (algebraic equations) and algebraic geometry that ties in with the morph-genome disclosed here. The morpho-genomic method could be applied to entire software environment of the computer including data organization, information taxonomies, visual databases, and knowledge bases.

The morphological genome as disclosed herein can be used in various ways by a designer. The morpho-spaces could be represented in various ways. They could be represented visually on the computer screen or any electronic display device. The designer could navigate through these morpho-spaces in an interactive manner through an input device. These input devices include a keyboard, a mouse, a graphic tablet, a light pen, a joystick, a touch screen or touch pad, data gloves, dials, counters, etc. or new devices could be invented to match the morpho-genomic concept. The input devices could be programmed so they (or their parts) can be tied to any group of selected independent parameters and manipulated. This manipulation could include changing the morph-code to change the form on the screen interactively. Each movement of the device, or movement of its different parts, could control the parameters interactively and all their combinations. In addition, these devices could permit entering the morpho-spaces one after another and navigating through each gene and each parameter, one at a time, or a group at a time.

The morpho-spaces could be represented graphically in print, and visually (by the eye) scanned to explore design options. The prints could be long scrolls or drum plots from a computer to display the design possibilities visually over a large area compared with a computer screen. They could also be represented in mechanical devices, like overlapping planar wheels (as used in color wheels, for example), and by turning the wheels, appropriate options and combinations appear as design options.

The power of the morphological genome will be fully realized if the entire system, after its completion, is modeled as an integrated software environment which could be used by designers, explorers, inventors and discoverers in different fields of arts and science to generate and process form. This will also require integrating the software with new types of input devices which are linked to display and output devices.

The higher-dimensional morpho-spaces of the morph genome are difficult to visualize when the number of dimensions increases beyond a few, and especially when hyper-cubic lattices are involved. This requires new ways to navigate through the morphological universe. One simple way is to do a few dimensions at a time, say, you look at 3 to 6 dimensions at a time and scroll through the space in small increments at a time. Another way is to change the scale of viewing space beyond the desktop computer screen to larger wall-size screens. Another way is to visualize these spaces as higher-dimensional in room-sized 3-d virtual reality environments, where the morpho-spaces can be traveled through and morphological possibilities experienced with perception enhancing devices like special goggles, etc.

The morph-code could be embedded in visual devices like cameras, scanners and other optic devices so it can index by decoding the forms being recorded. Each form, each image, can be accurately indexed by a unified morph-code which uniquely describes it. With the generative power of the morph-code, this code could be altered to yield different designs. The morph-code could be tied to digital fabrication devices which could deliver variations of a design by altering a code, thereby altering the form, without altering the fabrication process. This will bring about a change in industrial production from standardized parts to mass-customized deigns. The morph-code is the key missing software component in achieving mass customization and universality in design, similar to DNA which generates the wide variety of biological forms in nature. The morph-code, in principle, has the same potential, if tied to encoded, integrated, flexible and variable fabrication processes which, at present, are missing.

What is claimed is the following:

1. A morphological genome of form for design applications, wherein
    said genome comprising a plurality of morphological genes, each said gene specifying an independent group of morphological transformations and said form utilizing a select combination of said genes termed active genes,
    each said group of morphological transformations being governed by a plurality of related parameters, each said parameter being independent of other said parameters and each said parameter being represented by numbers,
    said numbers corresponding to each said parameter being calibrated along an independent vector in higher-dimensional space, wherein plurality of said vectors in said space generates a higher-dimensional cubic lattice specific to said gene, said lattice having a plurality of vertices joined by a plurality of edges and wherein all said edges are parallel to said vectors,
    said vertices being specified by higher-dimensional Cartesian co-ordinates wherein said co-ordinates correspond to different combinations of said numbers associated with said parameters such that each said vertex of said lattice represents a unique combination of said numbers that specifies a unique form associated with said vertex, wherein
    said plurality of said genes, requiring a plurality of said higher-dimensional lattices such that said vectors of one said gene are distinct from said vectors of another said gene, wherein
    said Cartesian co-ordinates of said vertex define the morphological genetic code of said form, wherein
    said enabling means requires interactive navigation in a graphic representation of said higher-dimensional space, and wherein
    said graphic representation is achieved in a display device linked to a computer and said navigation is enabled through an input device also linked to a computer.

2. A morphological genome of form according to claim 1, wherein
    said numbers associated with said parameters are selected from the group comprising:
    integers,
    rational numbers,
    real numbers,
    symbolic numbers,
    or any combination of above.

3. A morphological genome of form according to claim 2, wherein
    said symbolic numbers comprise binary numbers 0's and 1's.

4. A morphological genome of form according to claim 1, wherein
    said enabling means requires an interactive alteration of said code.

5. A morphological genome of form according to claim 1, wherein
    said graphic representation is achieved in a physical device.

6. A method for generating form for design applications, wherein
    said method is based on manipulating a morphological genome, wherein
    said genome comprises a plurality of morphological genes, wherein each said gene specifies an independent group of morphological transformations and wherein said form utilizes a select combination of said genes termed active genes, wherein
    each said group of morphological transformations is governed by a plurality of related parameters, each said parameter being independent of other said parameters and each said parameter being represented by numbers, wherein
    said numbers corresponding to each said parameter are calibrated along an independent vector in higher-dimensional space, wherein plurality of said vectors in said space generates a higher-dimensional cubic lattice specific to said gene, said lattice having a plurality of vertices joined by a plurality of edges and wherein all said edges are parallel to said vectors, wherein
    said vertices are specified by higher-dimensional Cartesian co-ordinates wherein said co-ordinates correspond to different combinations of said numbers associated with said parameters such that each said vertex of said lattice represents a unique combination of said numbers that specifies a unique form associated with said vertex, wherein said plurality of said genes requiring a plurality of said higher-dimensional lattices such that said vectors of one said gene are distinct from said vectors of another said gene, wherein said Cartesian co-ordinates of said vertex define the morphological genetic code of said form, wherein said code provides an enabling means for changing said form by a method selected from the group comprising:
- a first method step,
- a second method step,
- a combination of above, wherein said first method step is selected from the group comprising:
- adding at least one new said gene to said active genes,
- removing at least one said gene from said active genes,
- combination of above, and wherein said second method step is selected from the group comprising:
- altering at least one said number associated with at least one said parameter within at least one said active gene,
- altering at least one said number associated with at least one said parameter within said new gene, wherein said enabling means requires interactive navigation in a graphic representation of said higher-dimensional space, and said graphic representation is achieved in a display device linked to a computer, and said navigation is enabled through an input device also linked to a computer, and wherein said form is converted into a physical object using a digital fabrication device.

7. A method for generating form for design applications according to claim 6, wherein
said numbers associated with said parameters are selected from the group comprising:
- integers,
- rational numbers,
- real numbers,
- symbolic numbers,
- or any combination of above.

8. A method for generating form for design applications according to claim 7, wherein
said symbolic numbers comprise binary numbers 0's and 1's.

9. A method for generating form for design applications according to claim 6, wherein
said enabling means requires an interactive alteration of said code.

10. A method for generating form for design applications according to claim 6, wherein
said graphic representation is achieved in a physical device.

* * * * *